US007653600B2

(12) United States Patent
Gustin et al.

(10) Patent No.: US 7,653,600 B2
(45) Date of Patent: Jan. 26, 2010

(54) AUTOMATED DOCUMENT CASHING SYSTEM

(75) Inventors: Robin Haley Gustin, Chicago, IL (US); Troy W. Livingston, Northbrook, IL (US); Namsoo Park, Schaumburg, IL (US); Nabil Shekoory, Chicago, IL (US)

(73) Assignee: Capital Security Systems, Inc., Hawthornwoods, IL (US)

(*) Notice: Subject to any disclaimer, the term of this patent is extended or adjusted under 35 U.S.C. 154(b) by 838 days.

(21) Appl. No.: 10/889,453

(22) Filed: Jul. 12, 2004

(65) Prior Publication Data

US 2005/0035193 A1 Feb. 17, 2005

Related U.S. Application Data

(63) Continuation of application No. 09/113,913, filed on Jul. 10, 1998, now abandoned, which is a continuation-in-part of application No. 08/866,139, filed on May 30, 1997, now Pat. No. 5,897,625.

(51) Int. Cl.
*G06Q 40/00* (2006.01)

(52) U.S. Cl. .......................................... 705/43; 705/39

(58) Field of Classification Search .................. 705/43, 705/39, 30, 35, 24; 235/379, 375; 379/192
See application file for complete search history.

(56) References Cited

U.S. PATENT DOCUMENTS 3,648,020 A 3/1972 Tateisi et al.

(Continued)

FOREIGN PATENT DOCUMENTS

AU 750152 1/1999
AU 762137 2/2000

(Continued)

OTHER PUBLICATIONS

Soteriou et al. "Operations, Quality and Profitablility in the Provision of Banking Services" Sep. 1999, Management Science, vol. 45, No. 9, pp. 1221-1238.*

(Continued)

*Primary Examiner*—Kelly Campen
(74) *Attorney, Agent, or Firm*—Hershkovitz & Associates, LLC; Abraham Hershkovitz

(57) ABSTRACT

An automated document cashing system is provided with an automated machine that cashes monetary transaction documents such as checks, money orders, and that makes deposit entries into the bank account of the user after validation of the user and monetary transaction document, without the aid of a bank teller. Validation of the identity of the user is performed with the use of a card associated with intelligence that identifies the user. A biometric device also may be used in identifying the validity of the user. Validation of the document involves one or more of: validating the presence of a signature; validating the amount of the monetary transaction document including a manual entry of the amount by the user; validating CAR against the LAR; and validating the banking system parameters and rules for the customer and/or the transaction. To assist in the automatic analysis of data on monetary transactional documents or on remittance documents, the user is prompted to provide a bounding box about the data. An image touch screen may be touched by the user to locate the bounding box and the user may magnify the data to fill the boundary box to exclude other data from this analysis. After document and person validation, the system will dispense money or transfer monies to a savings account, a checking account, a smart card, or the like. The system will also write money orders or wire transfer money. By supplying monies in the form of cash, credit card authorization, smart card balance, or the like to the machine, the user can pay bills such as a utility bill through the system or purchase items dispensed by the system.

8 Claims, 71 Drawing Sheets

INSERT CARD AND VERIFY SCREEN 300
IS CARD IN CARD READER ? 302
YES
NO
304 INSERT CARD THROUGH CARD SLOT
CANCEL
306 CARD READER TAKES CARD IN READS DATA
308 ENTER PASSWORD
CANCEL
DISPLAY "INCORRECT PASSWORD MESSAGE"
314
310 VERIFY PASSWORD WITH BANKING NETWORK ?
YES
NO
ENTERED MORE THAN 3 TIMES ? 312
CORRECT
330 RETAIN CARD BY EJECTING FROM REAR INTO RETAINED CARDS BIN
332 DISPLAY "RETAINED CARD MESSAGE"
320 OTHER TRANSACTION ?
324 IS CARD IN CARD READER ?
316 PROCEED WITH TRANSACTION
326 TO WELCOME SCREEN
328 EJECT CARD BACK TO CUSTOMER
322 SERVICE OPTIONS SCREEN

U.S. PATENT DOCUMENTS

| | | | | | |
|---|---|---|---|---|---|
| 3,675,816 | A | | 7/1972 | Bourke, II et al. | |
| 3,826,344 | A | | 7/1974 | Wahlberg | |
| 3,943,335 | A | | 3/1976 | Kinker et al. | |
| 4,023,013 | A | | 5/1977 | Kinker | |
| 4,085,687 | A | | 4/1978 | Beck et al. | |
| 4,134,537 | A | | 1/1979 | Glaser et al. | |
| 4,179,723 | A | | 12/1979 | Spencer | |
| 4,249,163 | A | | 2/1981 | Maurer et al. | |
| 4,314,352 | A | | 2/1982 | Fought | |
| 4,430,562 | A | | 2/1984 | Lundblad | |
| 4,434,359 | A | | 2/1984 | Watanabe | |
| 4,497,261 | A | | 2/1985 | Ferris et al. | |
| 4,516,015 | A | | 5/1985 | Uchida et al. | |
| 4,585,928 | A | | 4/1986 | Watanabe | |
| 4,600,828 | A | | 7/1986 | Nogami et al. | |
| 4,602,149 | A | | 7/1986 | Tateisi et al. | |
| 4,617,457 | A | | 10/1986 | Granzow et al. | |
| 4,628,532 | A | * | 12/1986 | Stone et al. | 382/197 |
| 4,634,845 | A | | 1/1987 | Hale et al. | |
| 4,649,832 | A | | 3/1987 | Hain et al. | |
| 4,650,978 | A | | 3/1987 | Hudson et al. | |
| 4,680,728 | A | | 7/1987 | Davis, II et al. | |
| 4,689,478 | A | | 8/1987 | Hale et al. | |
| 4,701,747 | A | | 10/1987 | Isherwood et al. | |
| 4,719,338 | A | | 1/1988 | Avery et al. | |
| 4,729,128 | A | | 3/1988 | Grimes et al. | |
| 4,733,060 | A | | 3/1988 | Dono et al. | |
| 4,733,765 | A | | 3/1988 | Watanabe | |
| 4,743,743 | A | | 5/1988 | Fukatsu | |
| 4,754,126 | A | | 6/1988 | Caldwell | |
| 4,758,713 | A | | 7/1988 | Matsukawa | |
| 4,926,173 | A | | 5/1990 | Frielink | |
| 4,936,564 | A | | 6/1990 | Hain | |
| 4,989,520 | A | | 2/1991 | Hain | |
| 4,997,176 | A | | 3/1991 | Hain | |
| 5,013,896 | A | | 5/1991 | Ono et al. | |
| 5,018,720 | A | | 5/1991 | Whittaker et al. | |
| 5,023,782 | A | | 6/1991 | Lutz et al. | |
| 5,042,073 | A | | 8/1991 | Collot et al. | |
| 5,099,423 | A | | 3/1992 | Graef et al. | |
| 5,136,144 | A | | 8/1992 | Swinton et al. | |
| 5,146,512 | A | | 9/1992 | Weideman et al. | |
| 5,150,420 | A | | 9/1992 | Haraguchi | |
| 5,233,547 | A | | 8/1993 | Kapp et al. | |
| 5,238,143 | A | | 8/1993 | Crighton | |
| 5,271,613 | A | | 12/1993 | Hain | |
| 5,297,030 | A | | 3/1994 | Vassigh et al. | |
| 5,302,811 | A | | 4/1994 | Fukatsu | |
| 5,335,484 | A | | 8/1994 | Hain | |
| 5,341,428 | A | | 8/1994 | Schatz | |
| 5,386,104 | A | | 1/1995 | Sime | |
| 5,389,773 | A | | 2/1995 | Coutts et al. | |
| 5,408,417 | A | | 4/1995 | Wilder | |
| 5,412,189 | A | | 5/1995 | Cragun | |
| 5,428,684 | A | | 6/1995 | Akiyama et al. | |
| 5,457,306 | A | | 10/1995 | Lucero | |
| 5,459,957 | A | | 10/1995 | Winer | |
| 5,465,206 | A | | 11/1995 | Hilt et al. | |
| 5,506,691 | A | * | 4/1996 | Bednar et al. | 235/379 |
| 5,546,523 | A | | 8/1996 | Gatto | |
| 5,566,807 | A | | 10/1996 | Morun | |
| 5,592,377 | A | | 1/1997 | Lipkin | |
| 5,616,902 | A | | 4/1997 | Cooley et al. | |
| 5,621,640 | A | | 4/1997 | Burke | |
| 5,641,050 | A | | 6/1997 | Smith et al. | |
| 5,650,604 | A | | 7/1997 | Marcous et al. | |
| 5,679,938 | A | | 10/1997 | Templeton et al. | |
| 5,679,940 | A | | 10/1997 | Templeton et al. | |
| 5,686,713 | A | | 11/1997 | Rivera | |
| 5,705,798 | A | | 1/1998 | Tarbox | |
| 5,751,842 | A | * | 5/1998 | Riach et al. | 235/379 |
| 5,825,003 | A | | 10/1998 | Jennings et al. | |
| 5,854,581 | A | | 12/1998 | Mori et al. | |
| 5,897,625 | A | * | 4/1999 | Gustin et al. | 705/43 |
| 5,930,380 | A | | 7/1999 | Kashi et al. | |
| 5,937,084 | A | * | 8/1999 | Crabtree et al. | 382/190 |
| 5,937,396 | A | | 8/1999 | Konya | |
| 5,952,639 | A | * | 9/1999 | Ohki et al. | 235/379 |
| 5,987,439 | A | * | 11/1999 | Gustin et al. | 705/43 |
| 6,010,067 | A | | 1/2000 | Elbaum | |
| 6,012,048 | A | * | 1/2000 | Gustin et al. | 705/39 |
| 6,129,273 | A | * | 10/2000 | Shah | 235/380 |
| 6,149,056 | A | * | 11/2000 | Stinson et al. | 235/379 |
| 6,181,837 | B1 | | 1/2001 | Cahill et al. | |
| 6,575,362 | B1 | | 6/2003 | Bator et al. | |
| 2005/0091161 | A1 | | 4/2005 | Gustin et al. | |

FOREIGN PATENT DOCUMENTS

| | | | | |
|---|---|---|---|---|
| CA | 2292588 | | | 12/1998 |
| CA | 2337028 | | | 3/2000 |
| DE | 4135450 | | | 4/1993 |
| EP | 0616296 | | | 9/1994 |
| EP | 0632415 | | | 1/1995 |
| EP | 0984410 | A1 | * | 3/2000 |
| FR | 2508678 | | | 12/1982 |
| GB | 1410723 | | | 10/1975 |
| JP | 59-168595 | | | 9/1984 |
| JP | 61-226892 | | | 10/1986 |
| JP | 63-172365 | | | 7/1988 |
| JP | 4-243497 | | | 8/1992 |
| JP | 04-314170 | | | 11/1992 |
| JP | 04-336668 | | | 11/1992 |
| JP | 07-110841 | | | 4/1995 |
| JP | 2-268373 | | | 11/1999 |
| JP | 2007-303728 | | | 11/2007 |
| WO | WO 84/02212 | | | 6/1984 |
| WO | WO 96/08797 | | | 3/1996 |
| WO | WO 98/07119 | | | 2/1998 |
| WO | WO 98/59308 | | | 12/1998 |
| WO | WO 00/05667 | | | 2/2000 |

OTHER PUBLICATIONS

Hansen et al. "Control and Audit of Electronic Data Interchange" Dec. 1989, MIS Quarterly, vol. 13, No. 4, pp. 403-413.*

Vartanian et al. "Digital Certification; New Wrinkles in Manageing Risk" July 1, 1997, American Banker V162P12.*

Anonymous "UBP Offers New Signature Verification" Oct. 1, 1997,Business World (Phillipines).*

Anonymous "Mitek Systems Inc Ships Checkscript, A Revolutionary Financial Document Processing Software Solution" Nov. 20, 1997 Business Wire P11200013.*

Official Notice of Rejection mailed on May 22, 2007 for Japanese Patent Application 503,389/1999.

Argument submitted in response to the Official Notice of Rejection mailed on May 22, 2007 for Japanese Patent Application 503,389/1999, Feb. 4, 2008.

"Once-Reserved Fed Leads the Charge for Change", Checks and Checking, Bank Technology News, pp. 14-15, Apr. 1996.

R. Weatherington, EBT Exploding, But Savings May be Myth; Checklist, pp. 12, 14, 16, Winter 1996.

M. Roberttson, "Stem the Tide of Internal Theft," Checklist, pp. 24, 26, Spring 1996.

H. Shyne, "ATM Surcharges Target of Controlling Acts," Checklist, p. 32, Summer 1996.

"New ATM Fees Have Spread Fast," Money, p. 56, Dec. 1996.
J. Schmeltzer, "Currency Exchanges Move into New Territory," Sec. 5, Chicago Tribune, Dec. 15, 1996.
"More ATMs Levy Fees on Customers From Other Banks," Wall Street Journal, Section B, p. 11B, Oct. 4, 1996.
Iversen, W.R., "How ATMs Fit Into An On-Line World", Financial Service On-Line, pp. 39-48, Sep./Oct. 1996.
Anonymous: "Bill Payment Transfer System", Oct. 1976.
IBM Technical Disclosure Bulletin, vol. 19, No. 5, Oct. 1976, New York, US.
Jackel, L. D. et al, "Optical Character Recognition for Self-Service Banking", AT&T Technical Journal, vol. 74, No. 4, Jul. 1995, pp. 16-24.
International Search Report, WO 00/05667, Apr. 27, 2000.
Supplemental European Search Report, EP 99 93 2355, Oct. 4, 2004.
Supplemental European Search Report, EP 98 924 920, Nov. 16, 2005.

* cited by examiner 58
60
114
112
110
105
101
100
103A
111
106
108
102
103
55
126
125
136
130
132
148
151
134A
131
134C
134B
134D
142
141
140D
140C
140B
140A
150
66

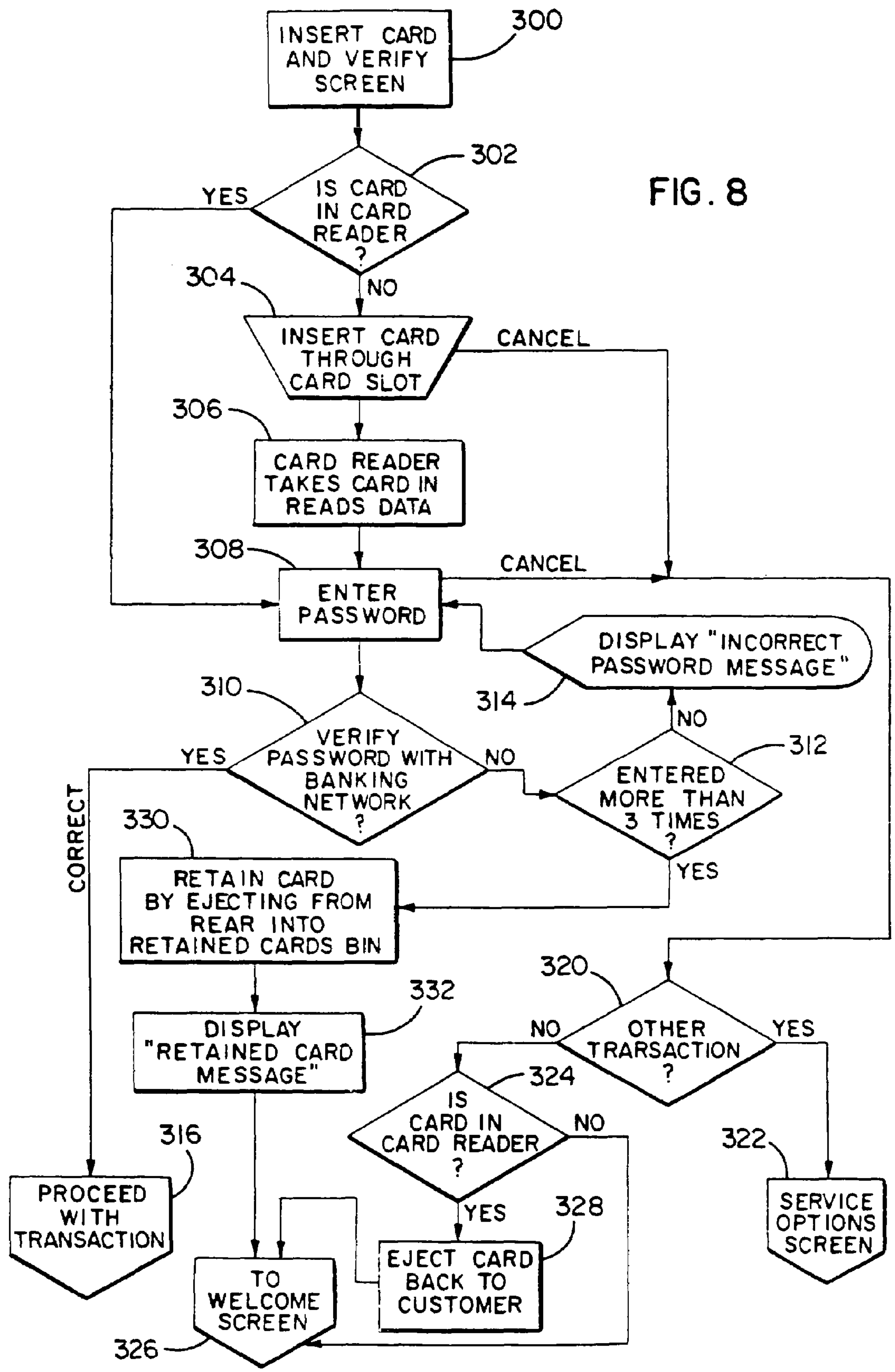
INSERT CARD AND VERIFY SCREEN
300
IS CARD IN CARD READER ?
302
YES
NO
FIG. 8
304
INSERT CARD THROUGH CARD SLOT
CANCEL
306
CARD READER TAKES CARD IN READS DATA
308
CANCEL
ENTER PASSWORD
DISPLAY "INCORRECT PASSWORD MESSAGE"
314
310
NO
VERIFY PASSWORD WITH BANKING NETWORK ?
YES
NO
312
ENTERED MORE THAN 3 TIMES ?
YES
CORRECT
330
RETAIN CARD BY EJECTING FROM REAR INTO RETAINED CARDS BIN
320
332
DISPLAY "RETAINED CARD MESSAGE"
NO
OTHER TRARSACTION ?
YES
324
IS CARD IN CARD READER ?
NO
316
322
PROCEED WITH TRANSACTION
YES
328
SERVICE OPTIONS SCREEN
EJECT CARD BACK TO CUSTOMER
TO WELCOME SCREEN
326

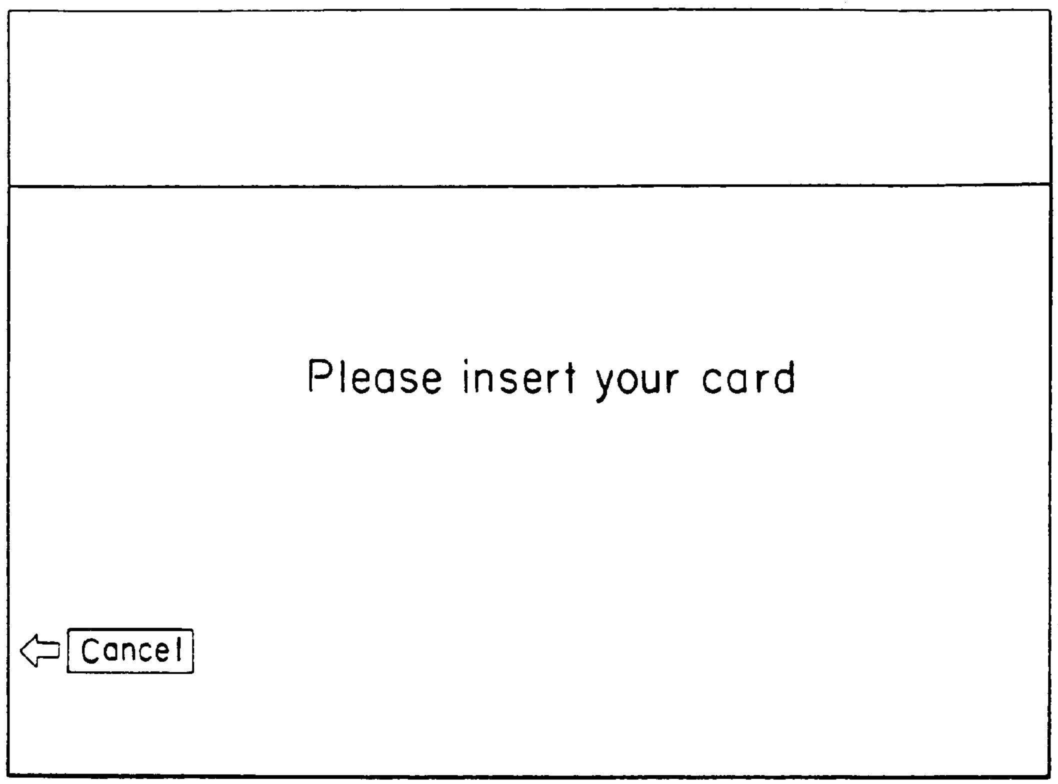
FIG. 8A
FIG. 8B
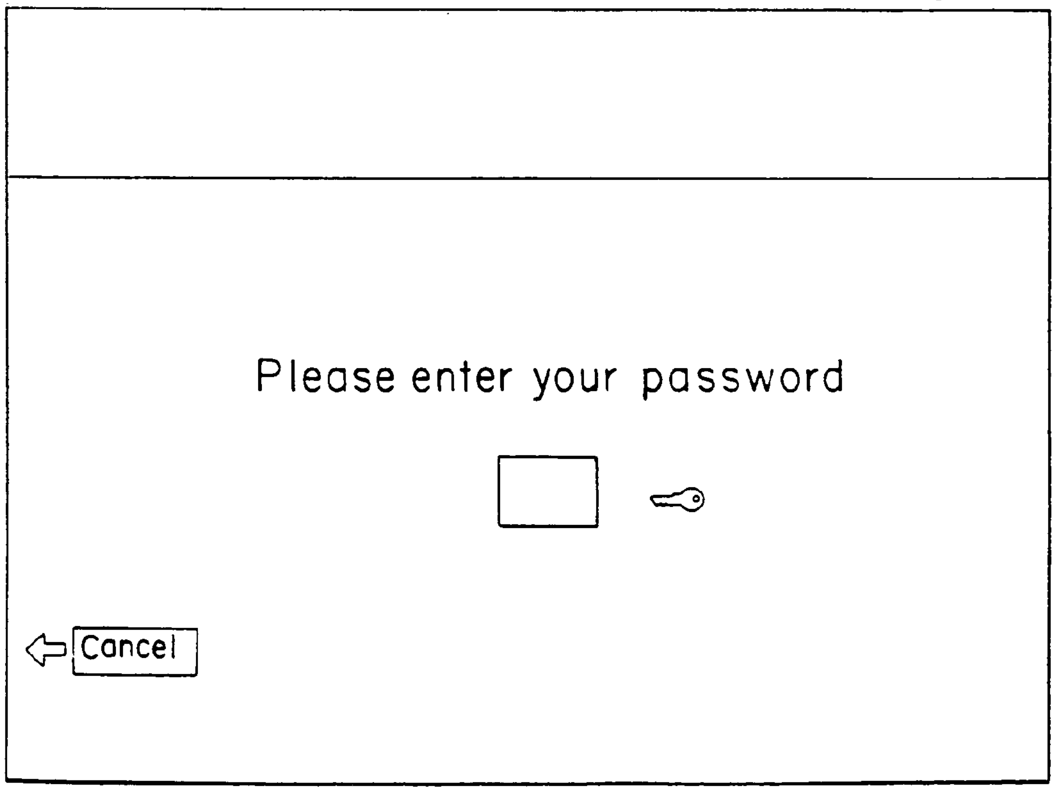

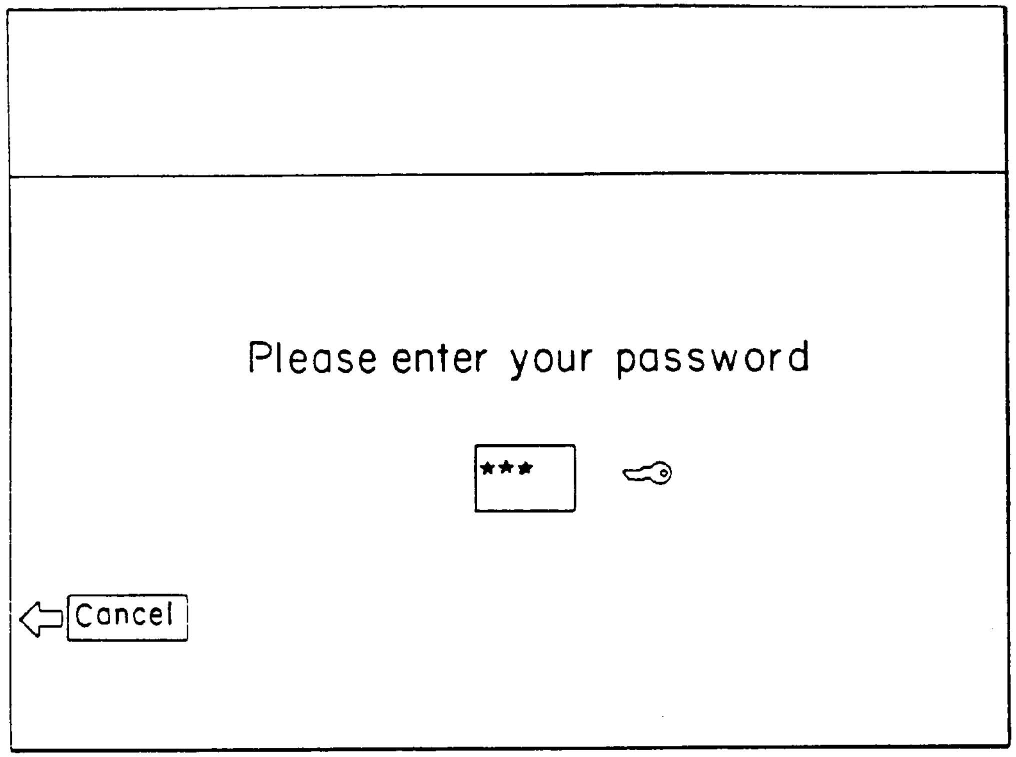
FIG. 8C
FIG. 8D
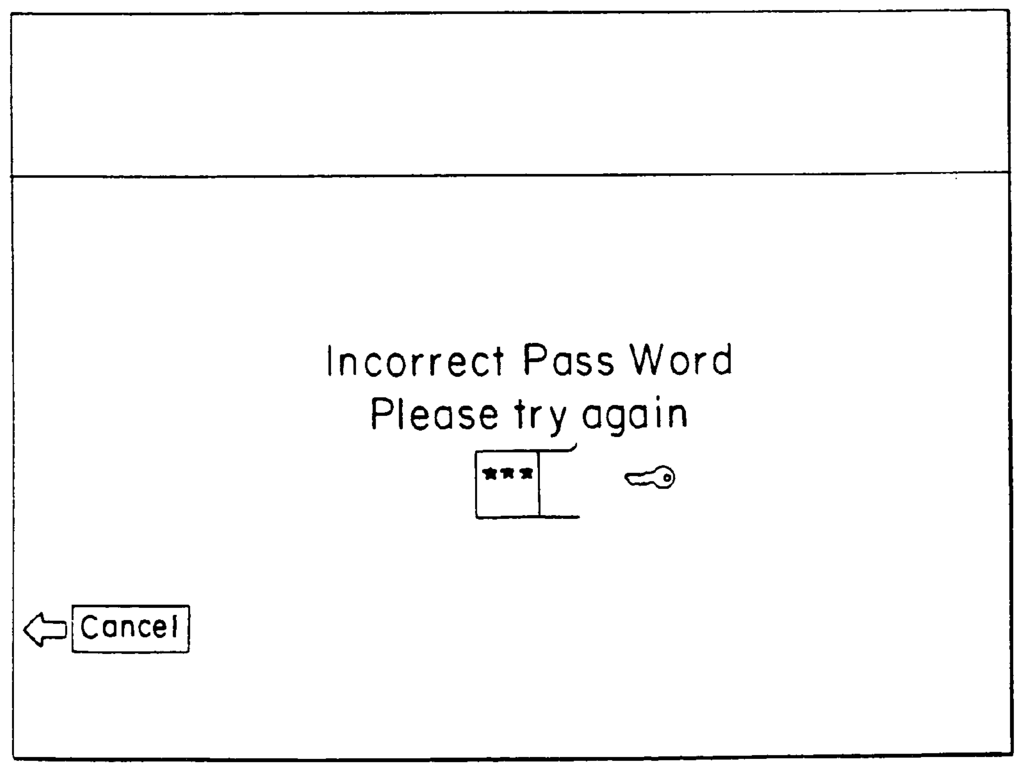

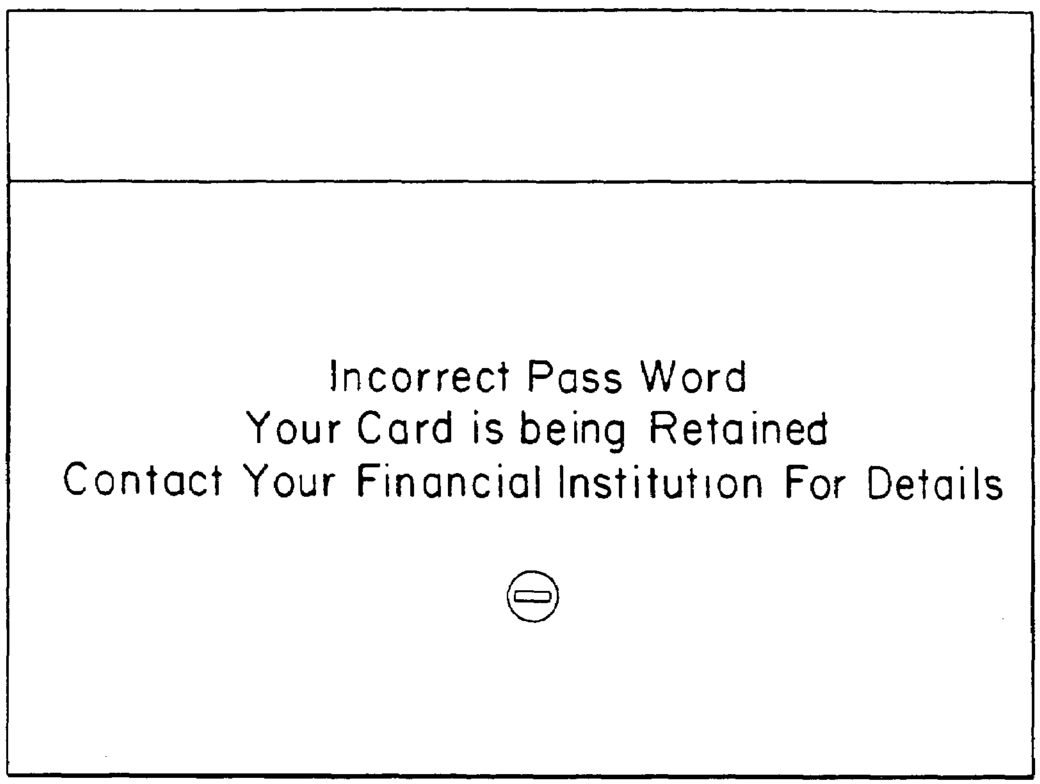
FIG. 8E
FIG. 8F
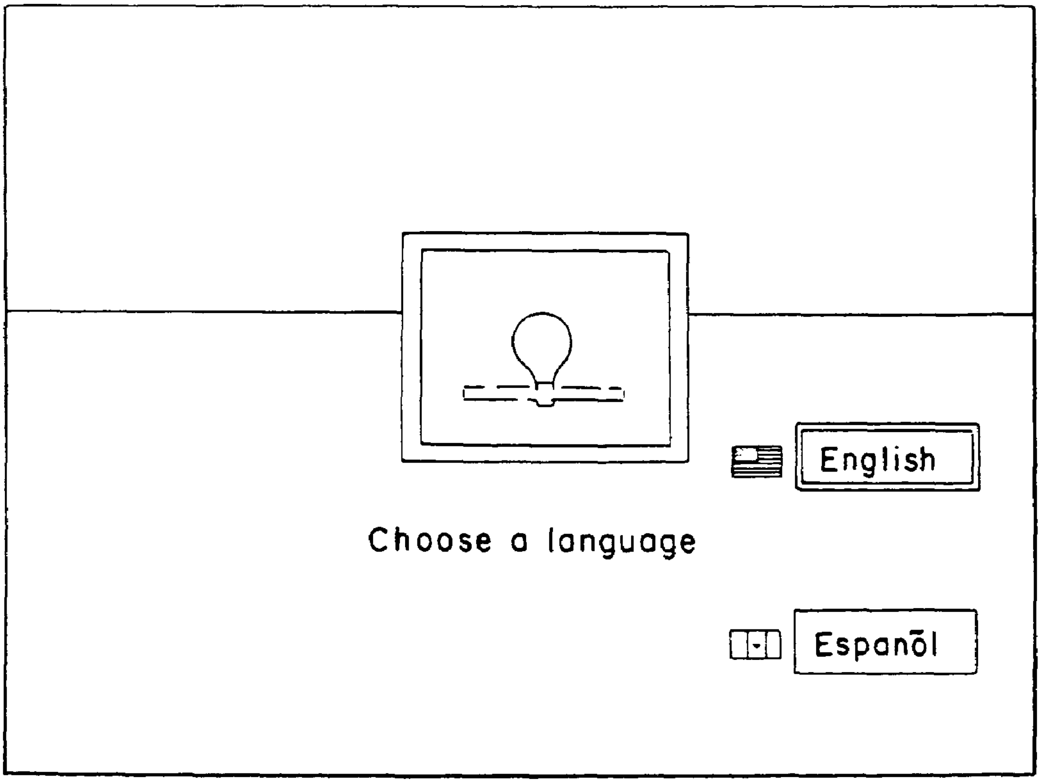

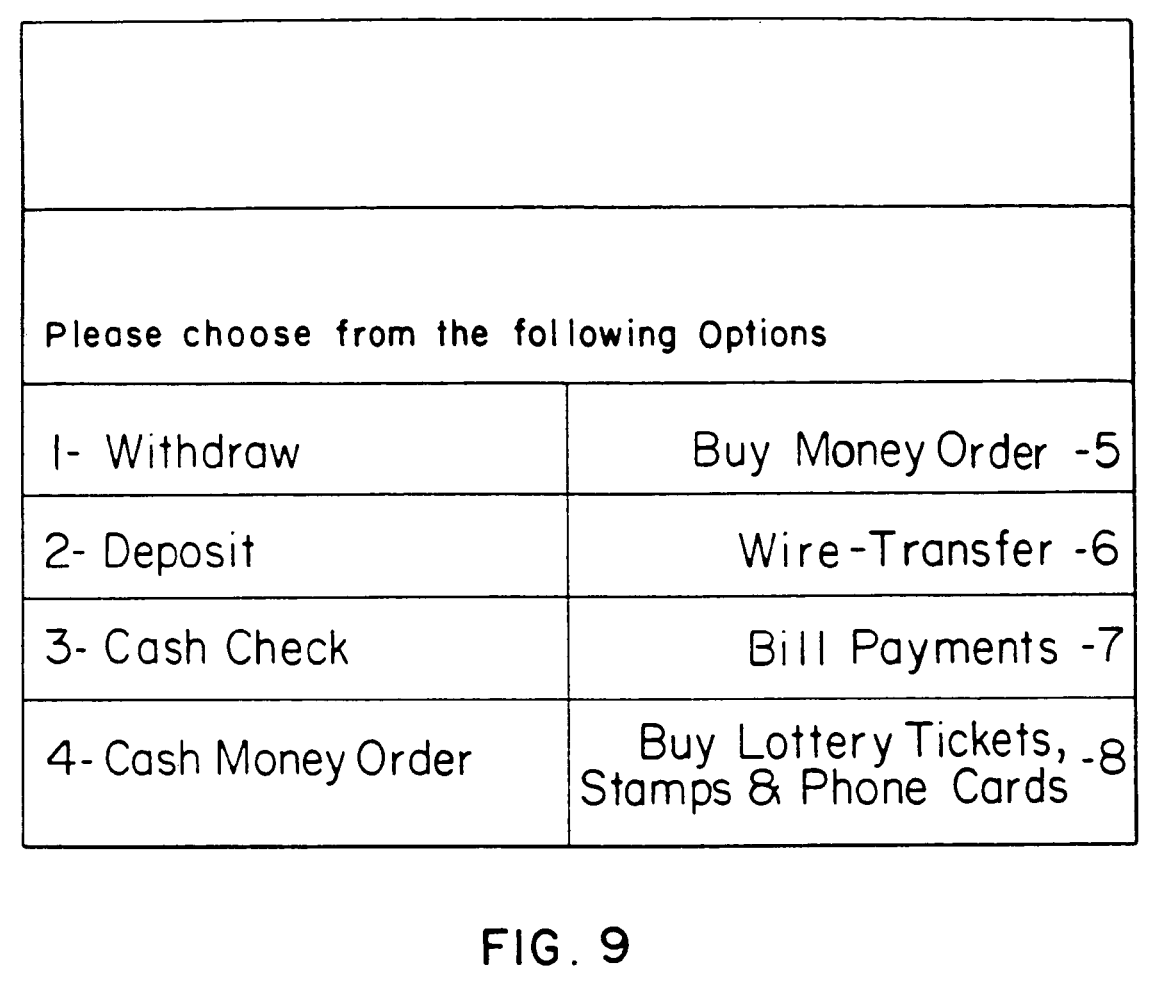

| Please choose from the following Options | |
|---|---|
| 1- Withdraw | Buy Money Order -5 |
| 2- Deposit | Wire-Transfer -6 |
| 3- Cash Check | Bill Payments -7 |
| 4- Cash Money Order | Buy Lottery Tickets, Stamps & Phone Cards -8 |

FIG. 9

WELCOME SCREEN
220
INITIALIZE ALL HARDWARE AND SOFTWARE PARAMETERS
222
SERVICE OPTIONS SCREEN
224
WITHDRAW SCREEN
226
DEPOSIT SCREEN
228
CASH CHECK SCREEN
230
CASH MONEY ORDER SCREEN
232
BUY MONEY ORDER SCREEN
234
WIRE TRANSFER SCREEN
236
BILL PAYMENT SCREEN
238
PURCHASES SCREEN
240

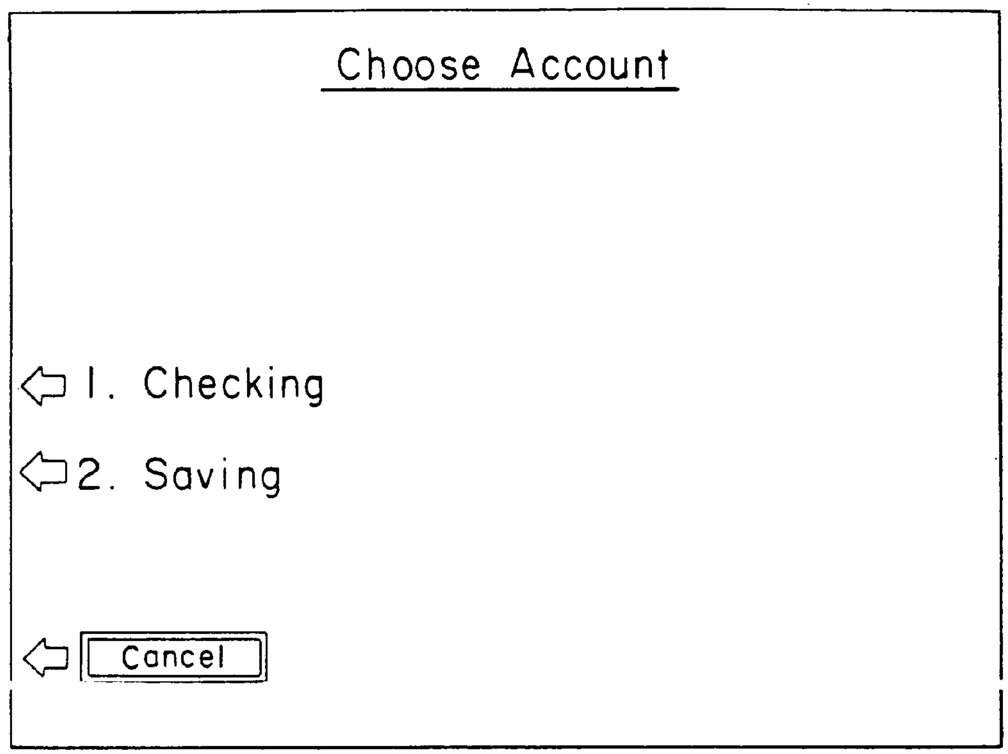
FIG. 10
FIG. 11
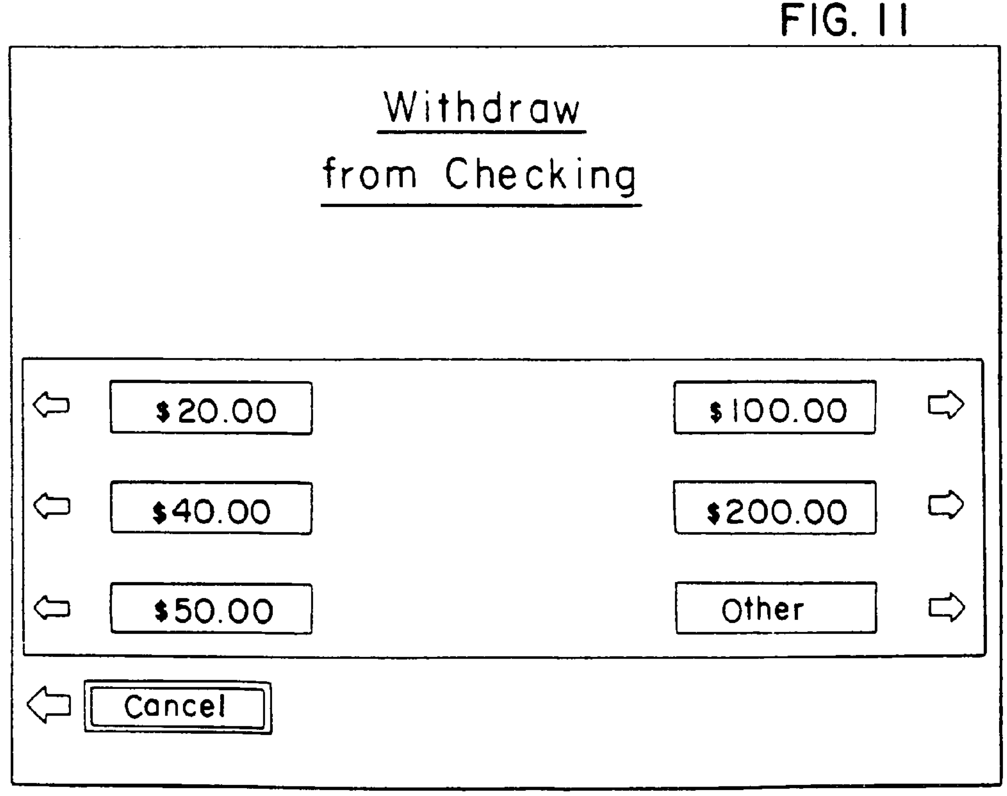

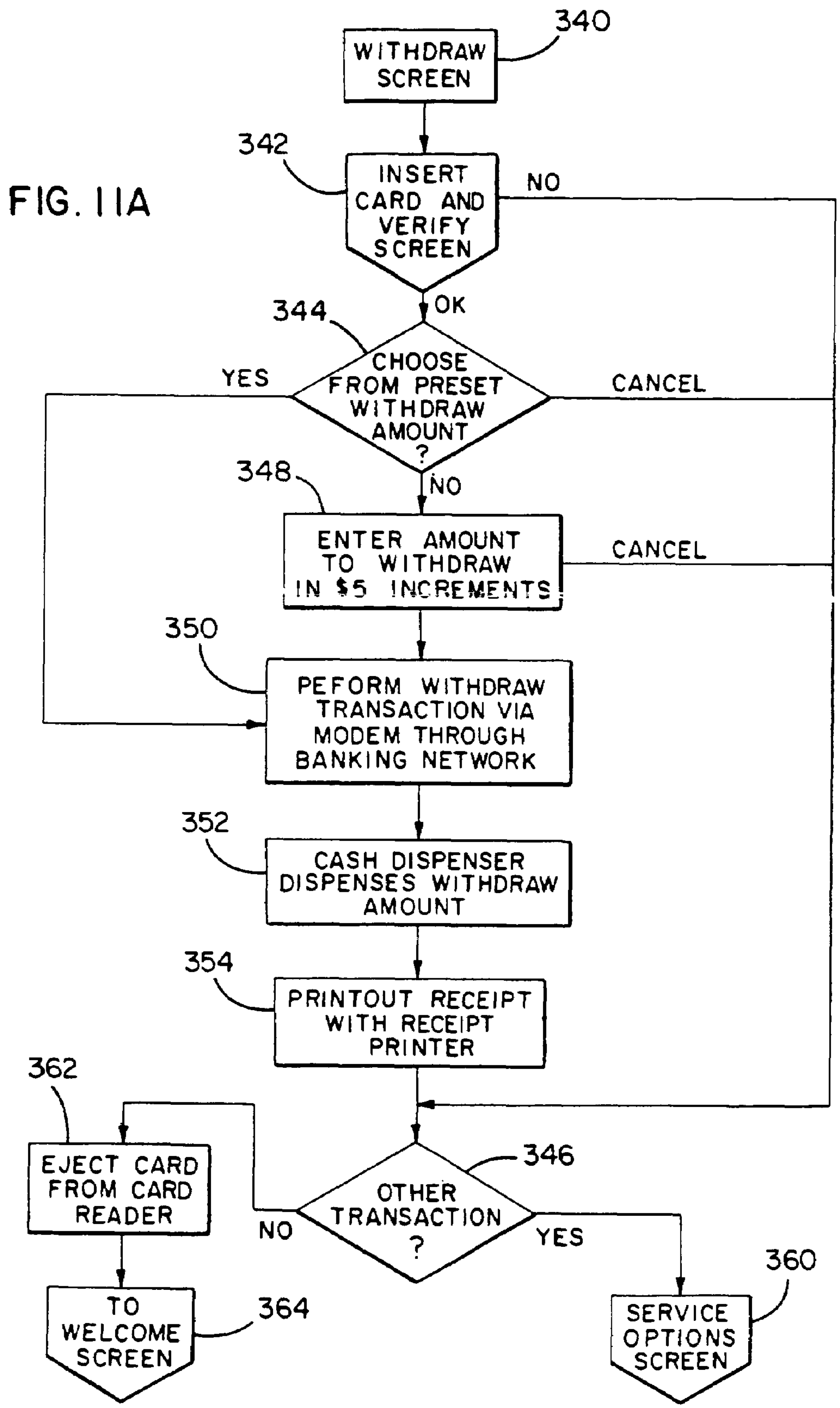

FIG. 11A
340
WITHDRAW SCREEN
342
INSERT CARD AND VERIFY SCREEN
NO
OK
344
CHOOSE FROM PRESET WITHDRAW AMOUNT ?
YES
CANCEL
NO
348
ENTER AMOUNT TO WITHDRAW IN $5 INCREMENTS
CANCEL
350
PEFORM WITHDRAW TRANSACTION VIA MODEM THROUGH BANKING NETWORK
352
CASH DISPENSER DISPENSES WITHDRAW AMOUNT
354
PRINTOUT RECEIPT WITH RECEIPT PRINTER
362
EJECT CARD FROM CARD READER
346
OTHER TRANSACTION ?
NO
YES
360
TO WELCOME SCREEN
364
SERVICE OPTIONS SCREEN

380
DEPOSIT SCREEN
382
INSERT CARD AND VERIFY SCREEN
NO
OK
392
WHAT DO YOU WANT TO DEPOSIT
CANCEL
394
CASH DEPOSIT SCREEN
CHECK DEPOSIT SCREEN
396
MONEY ORDER DEPOSIT SCREEN
398
PERFORM DEPOSIT TRANSACTION VIA MODEM THROUGH BANKING NETWORK
400
PRINTOUT RECEIPT WITH RECEIPT PRINTER
402
384
OTHER TRANSACTION ?
NO
YES
EJECT CARD FROM CARD READER
388
TO WELCOME SCREEN
390
SERVICE OPTIONS SCREEN
386

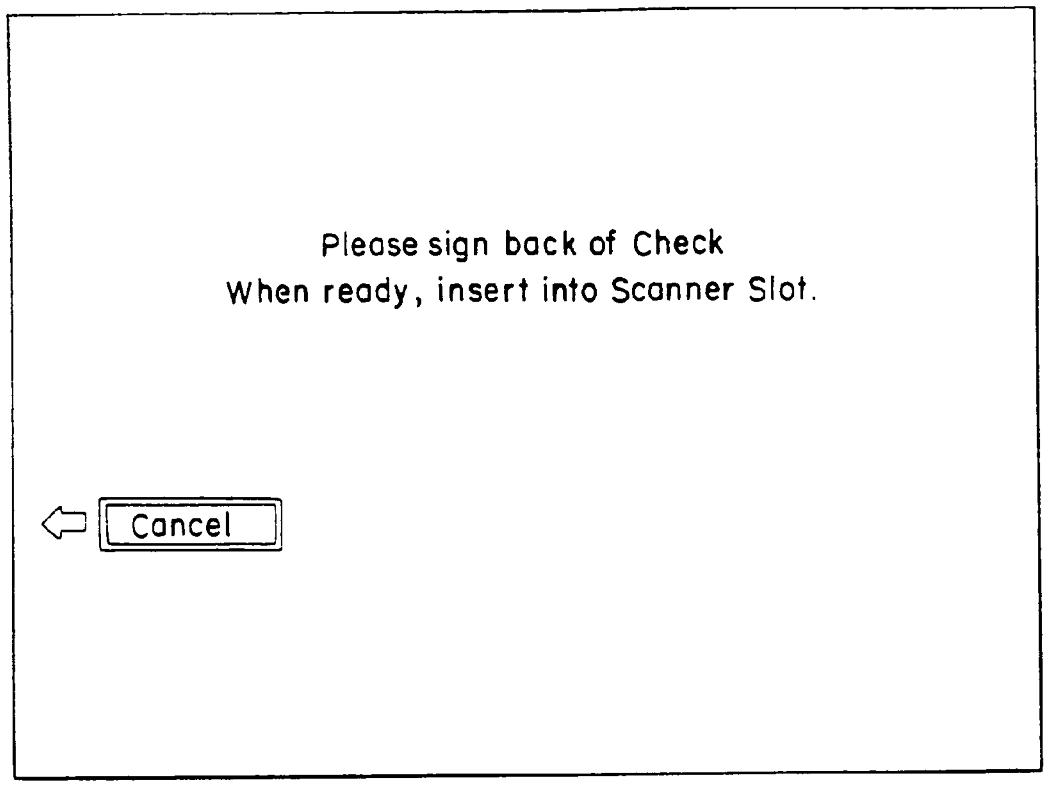
FIG. 13C
FIG. 13D
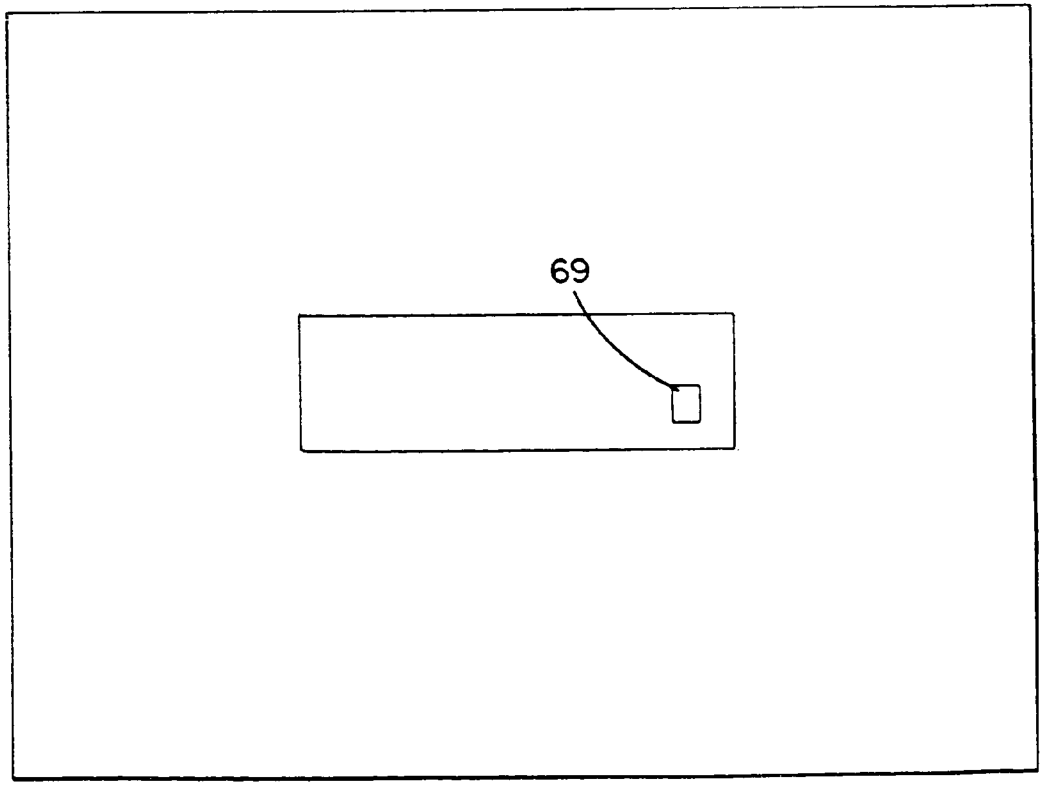

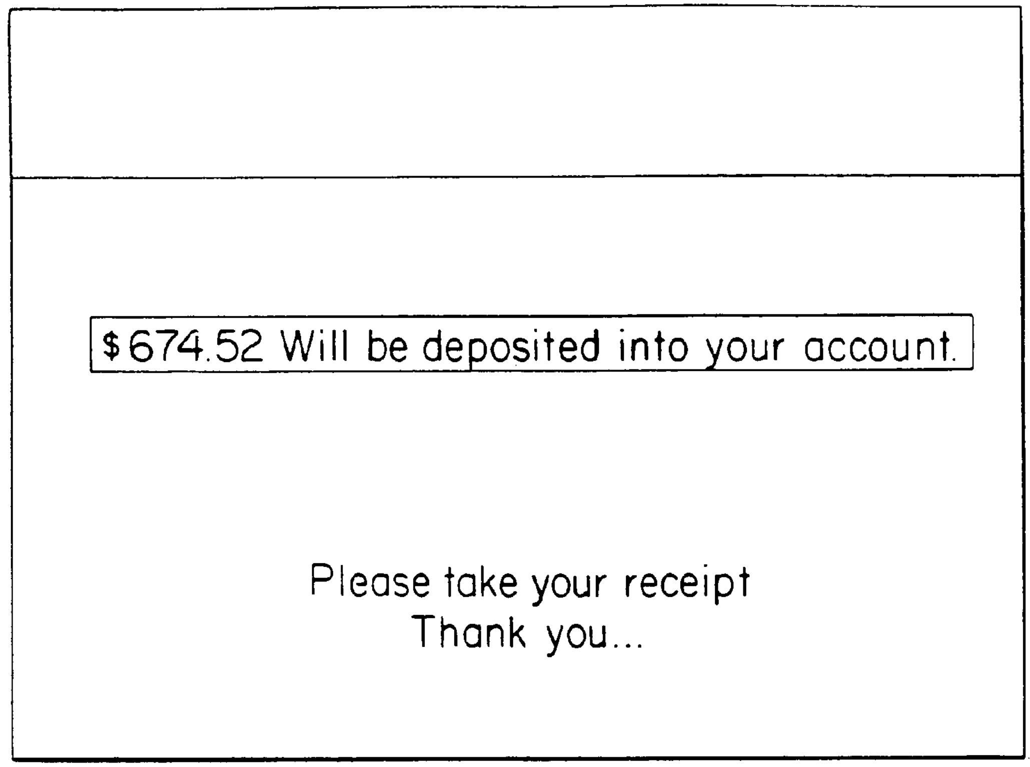
FIG. 13E
FIG. 13F
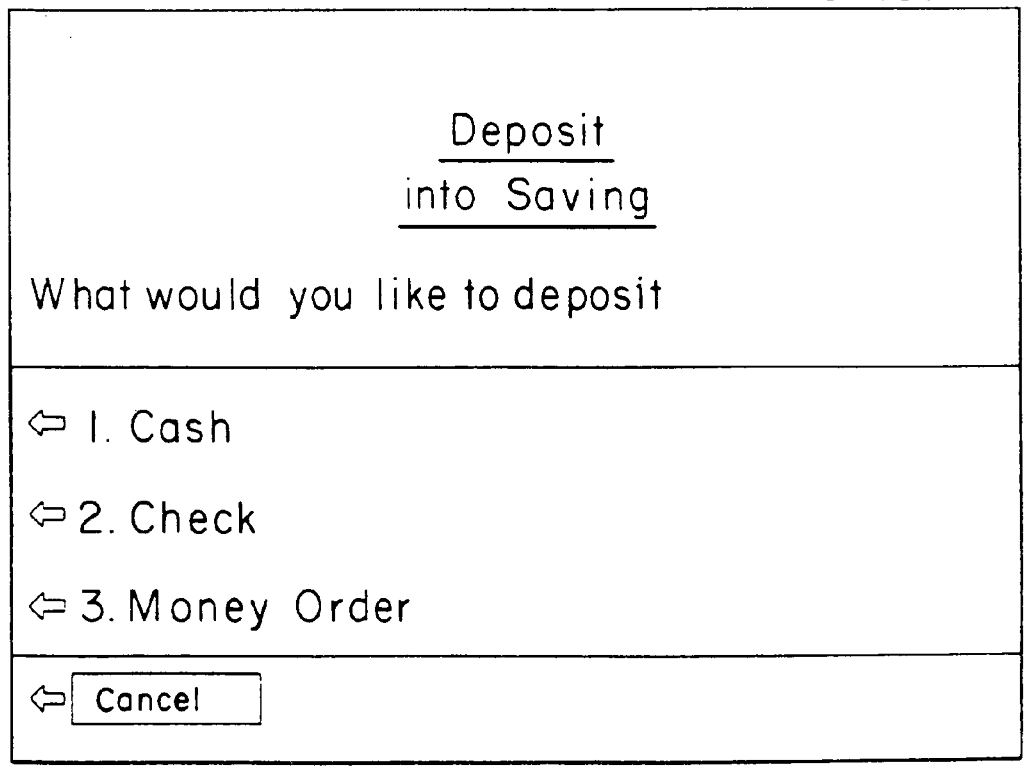

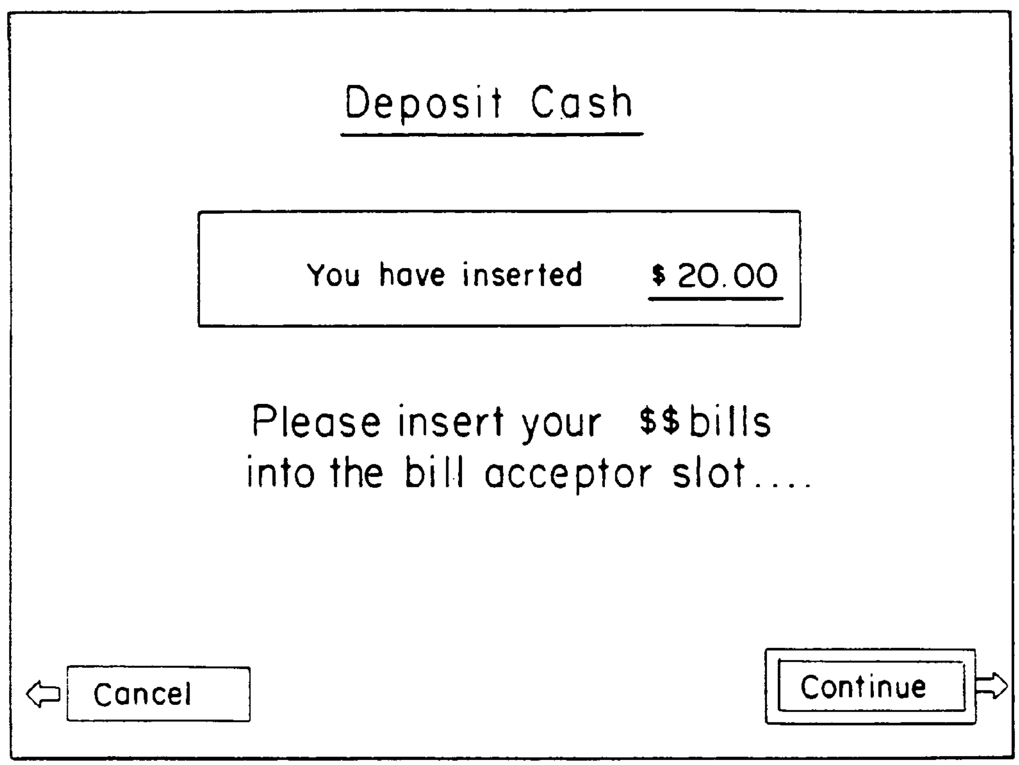
FIG. 13I
FIG. 13J
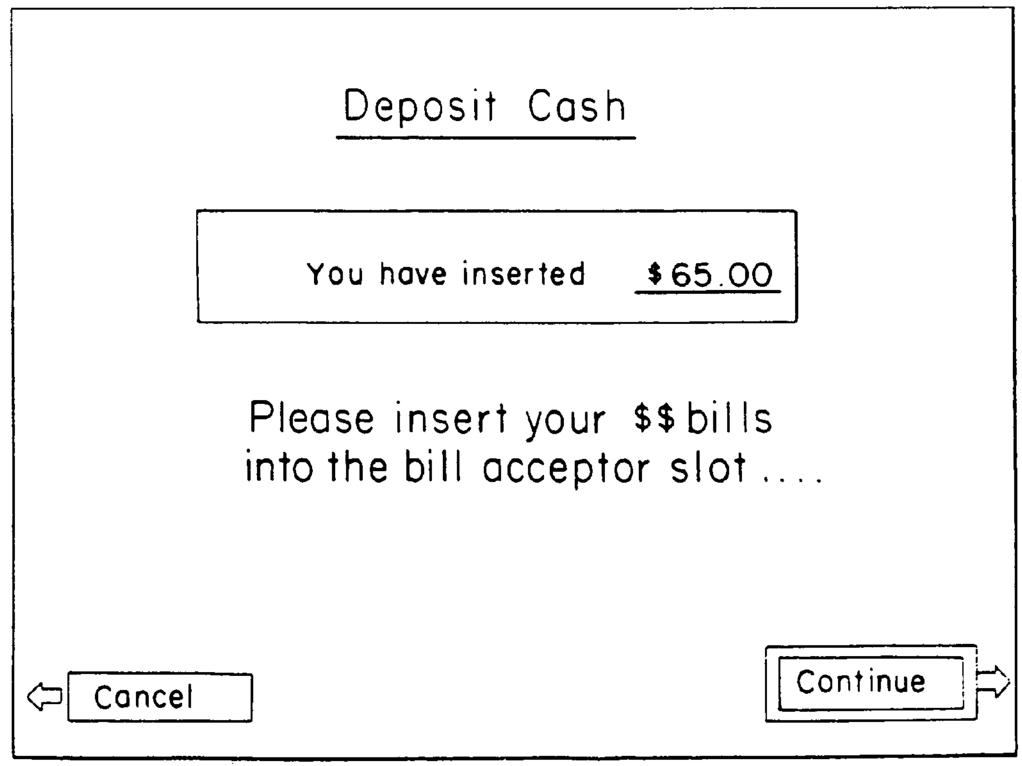

$ 65.00 Will be deposited into your account.

Please take your receipt
Thank you....

FIG. 13K

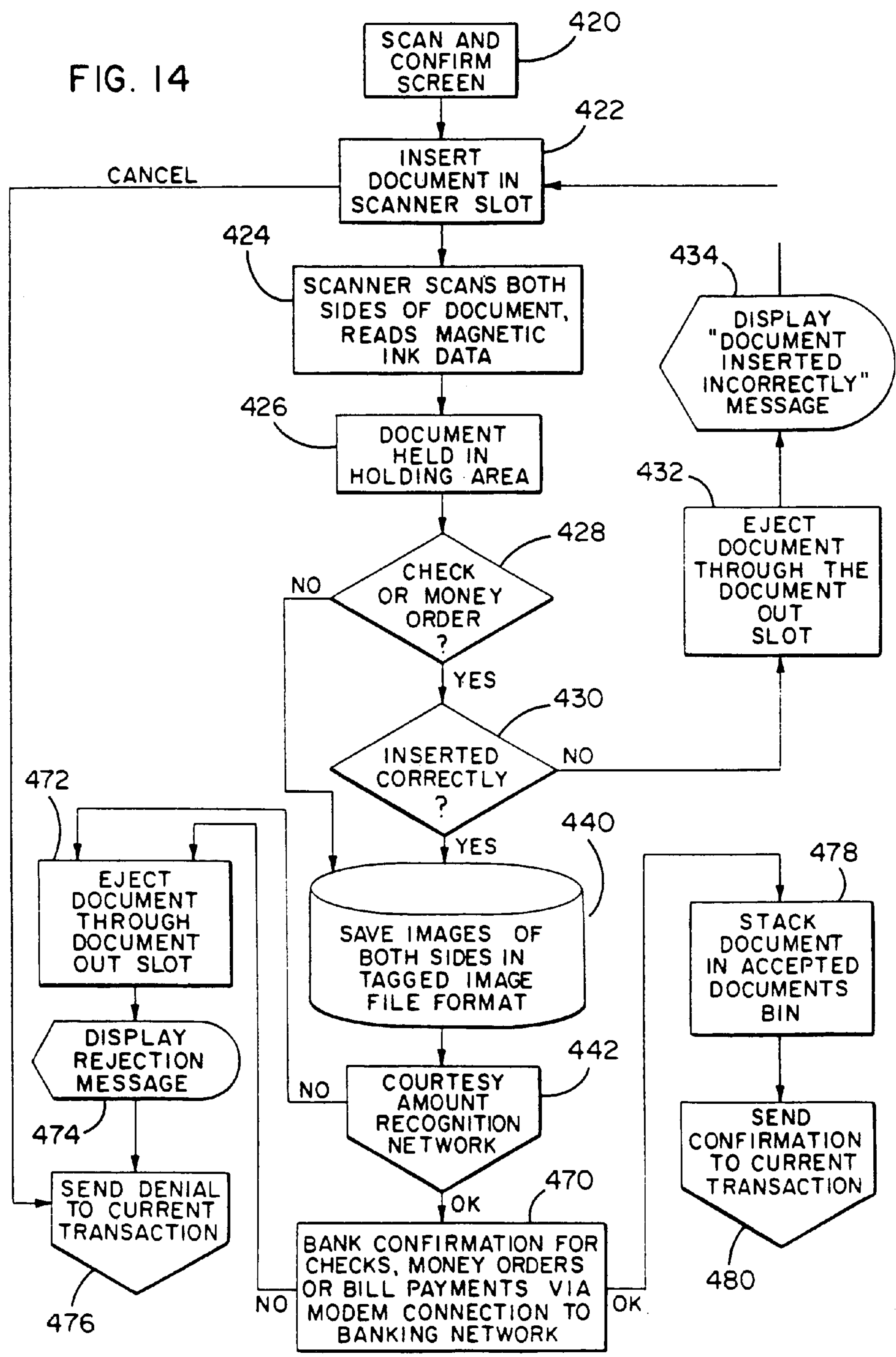

FIG. 14
SCAN AND CONFIRM SCREEN
420
INSERT DOCUMENT IN SCANNER SLOT
422
CANCEL
424
SCANNER SCANS BOTH SIDES OF DOCUMENT, READS MAGNETIC INK DATA
426
DOCUMENT HELD IN HOLDING AREA
428
CHECK OR MONEY ORDER ?
NO
YES
430
INSERTED CORRECTLY ?
NO
YES
432
EJECT DOCUMENT THROUGH THE DOCUMENT OUT SLOT
434
DISPLAY "DOCUMENT INSERTED INCORRECTLY" MESSAGE
440
SAVE IMAGES OF BOTH SIDES IN TAGGED IMAGE FILE FORMAT
442
COURTESY AMOUNT RECOGNITION NETWORK
NO
OK
470
BANK CONFIRMATION FOR CHECKS, MONEY ORDERS OR BILL PAYMENTS VIA MODEM CONNECTION TO BANKING NETWORK
NO
OK
472
EJECT DOCUMENT THROUGH DOCUMENT OUT SLOT
DISPLAY REJECTION MESSAGE
474
SEND DENIAL TO CURRENT TRANSACTION
476
478
STACK DOCUMENT IN ACCEPTED DOCUMENTS BIN
SEND CONFIRMATION TO CURRENT TRANSACTION
480

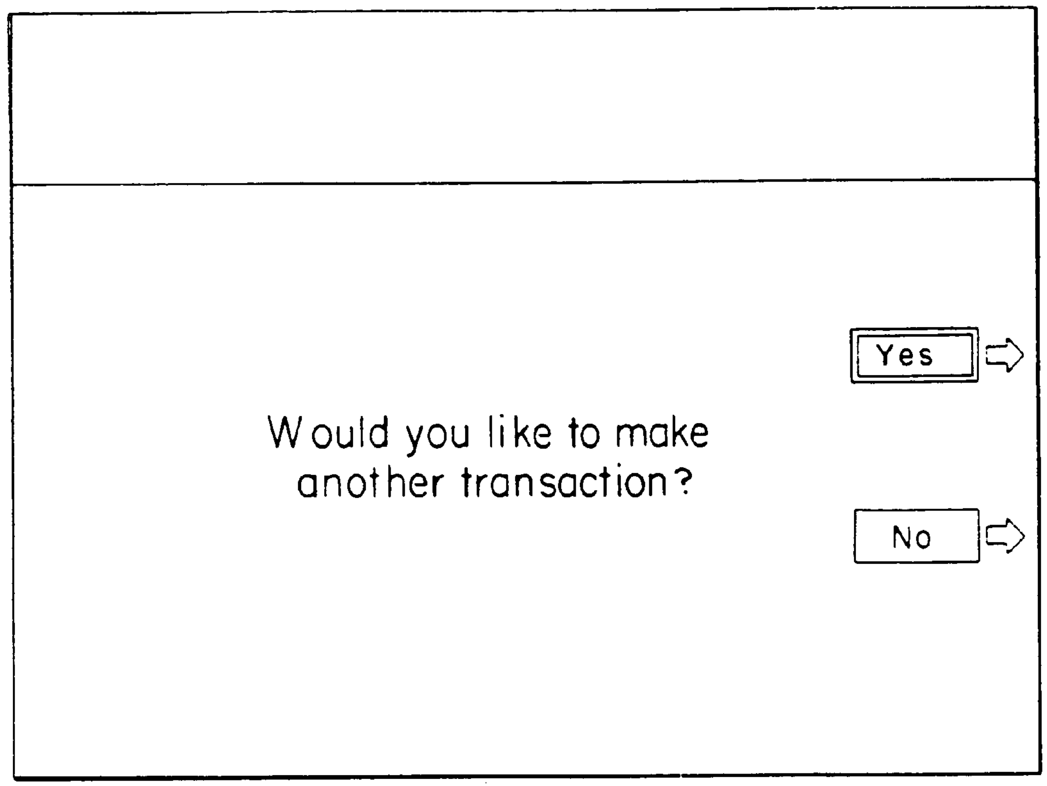
FIG. 15A
FIG. 15B
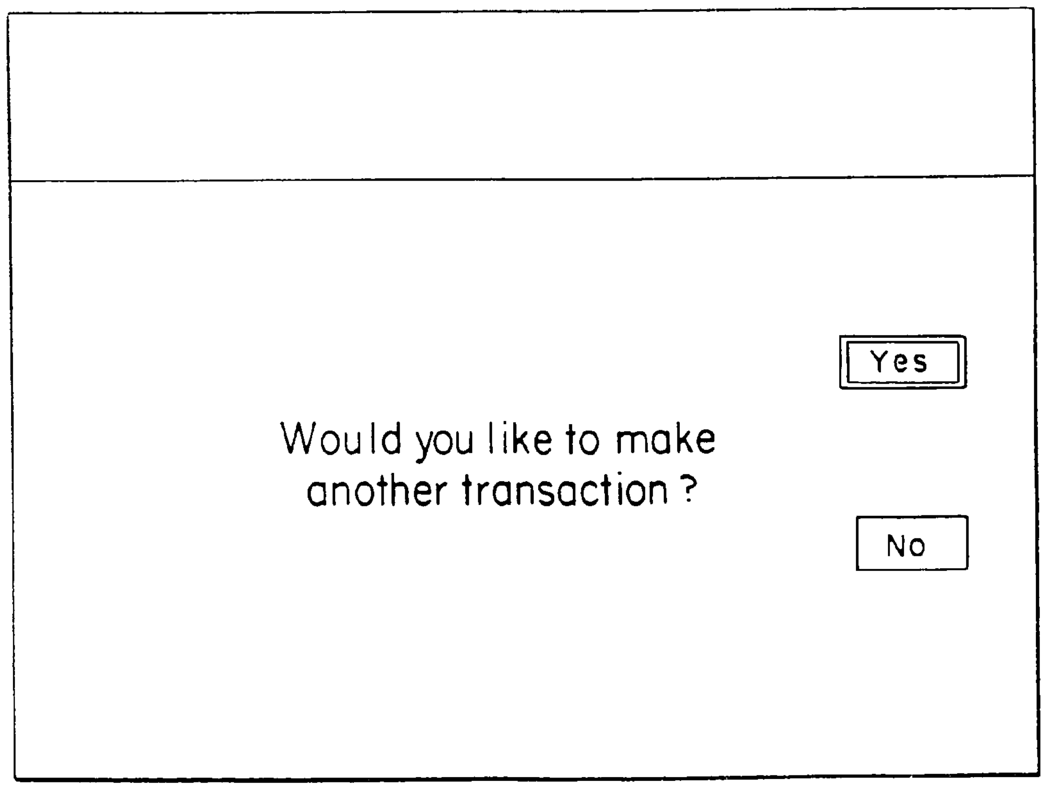

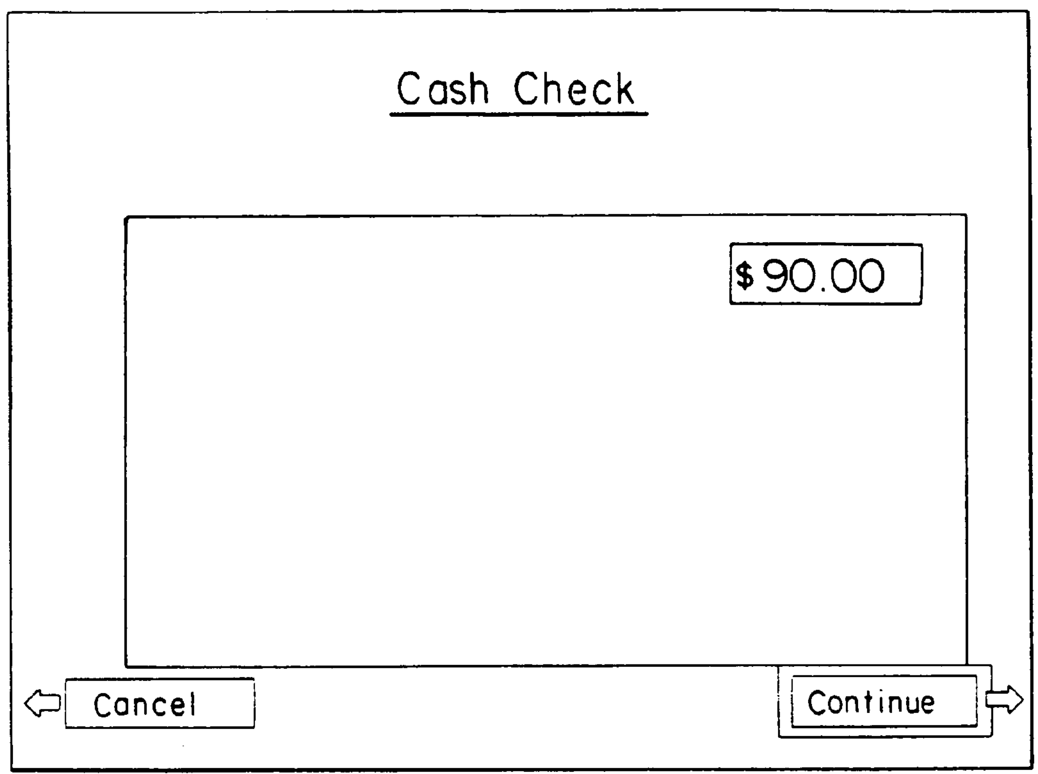
FIG. 16B
FIG. 16C
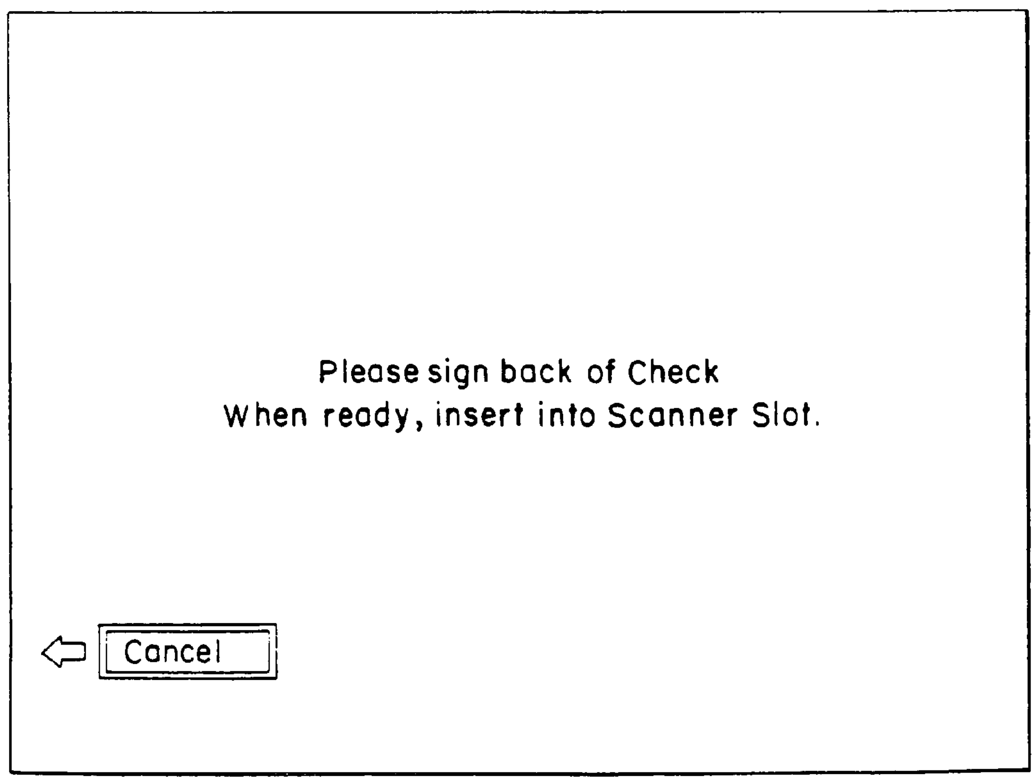

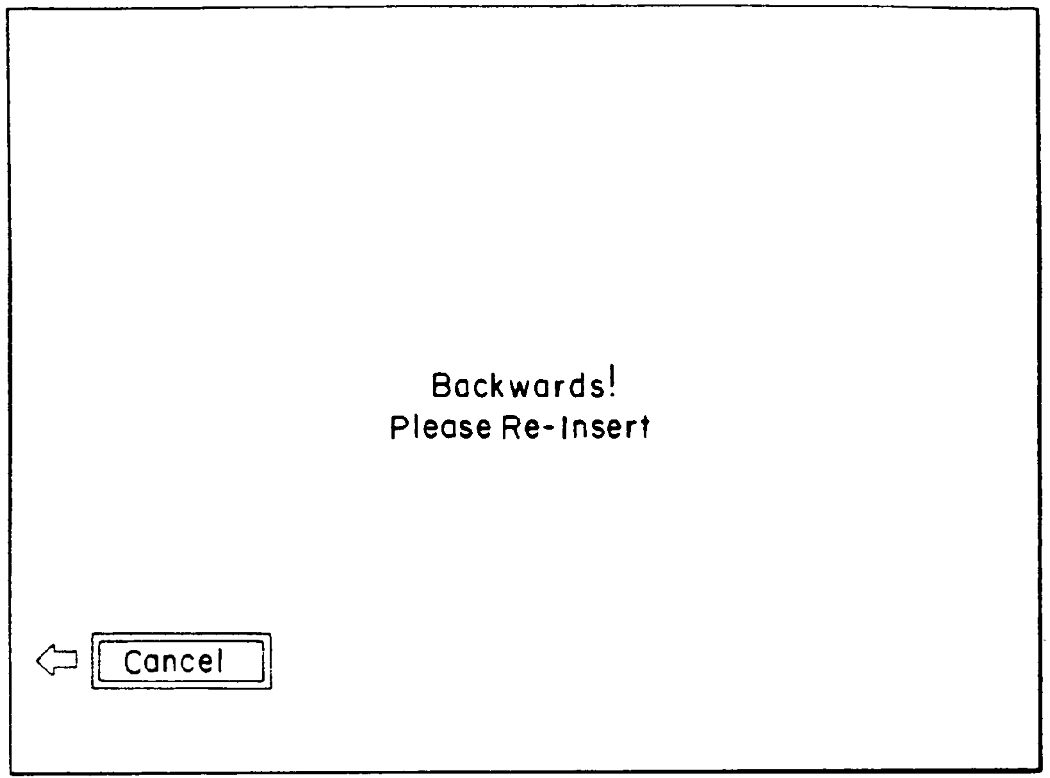
FIG. 16D
FIG. 16DD
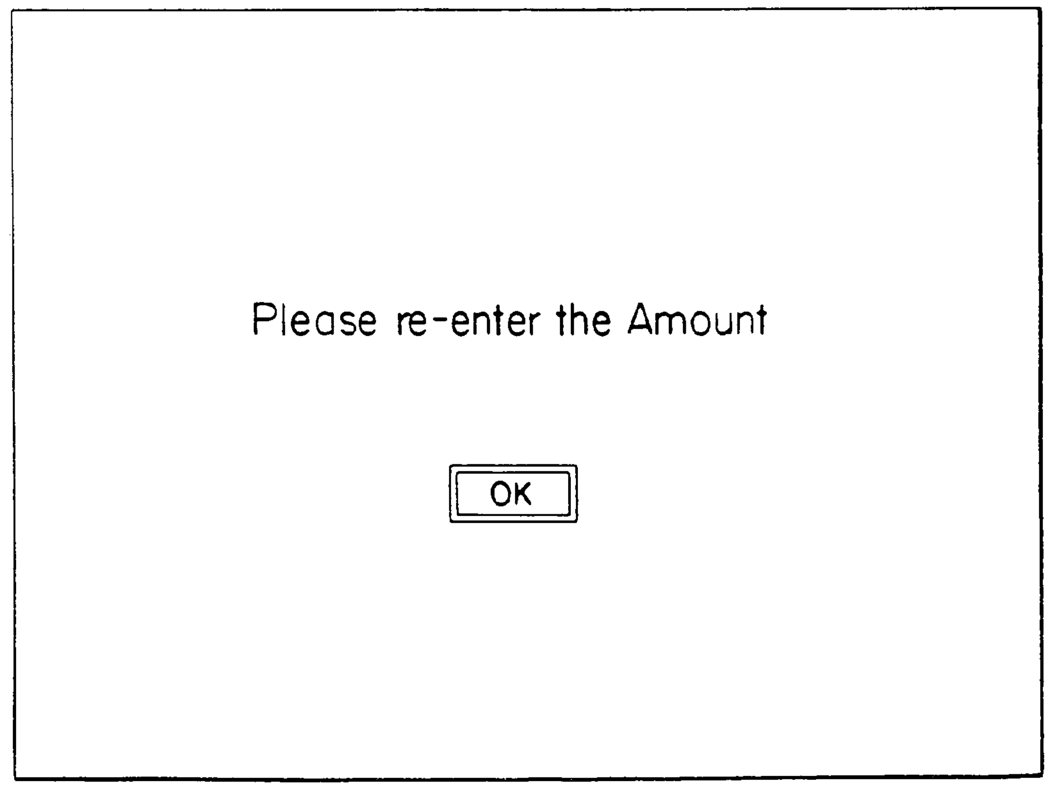

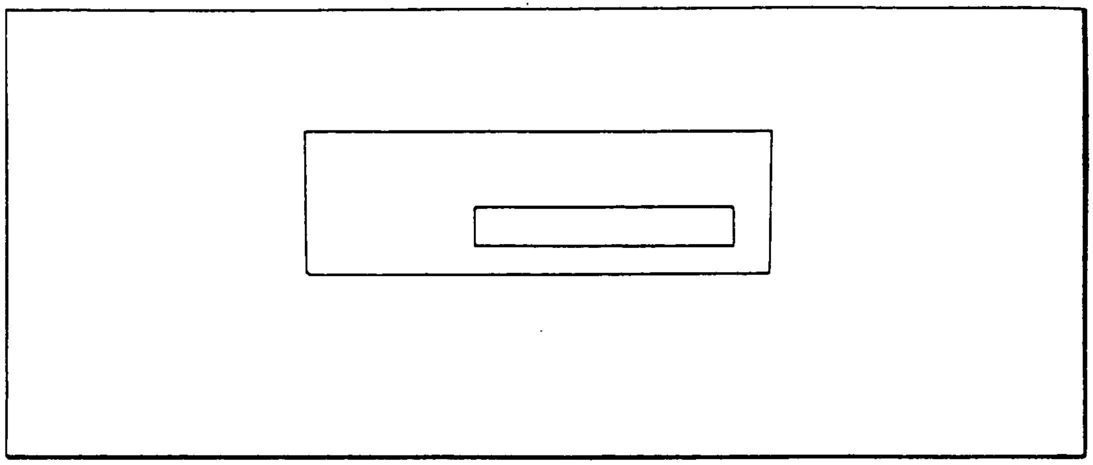
FIG. 16E
FIG. 16F
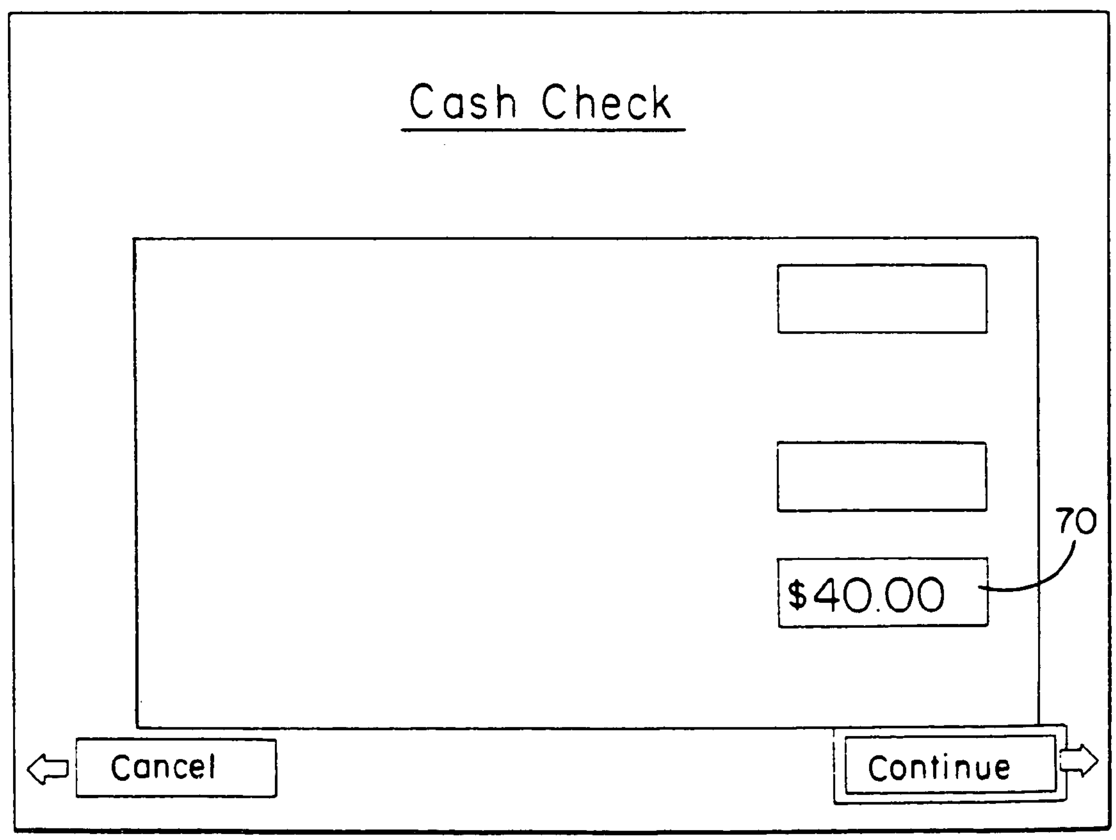

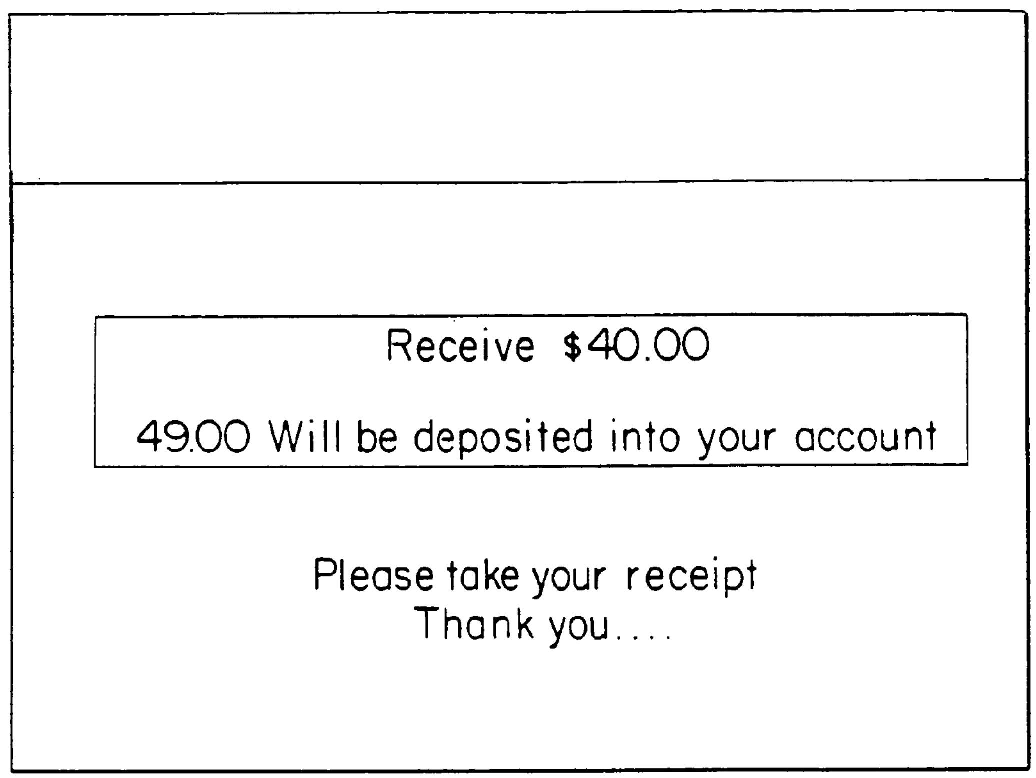
FIG. 16G
FIG. 16H
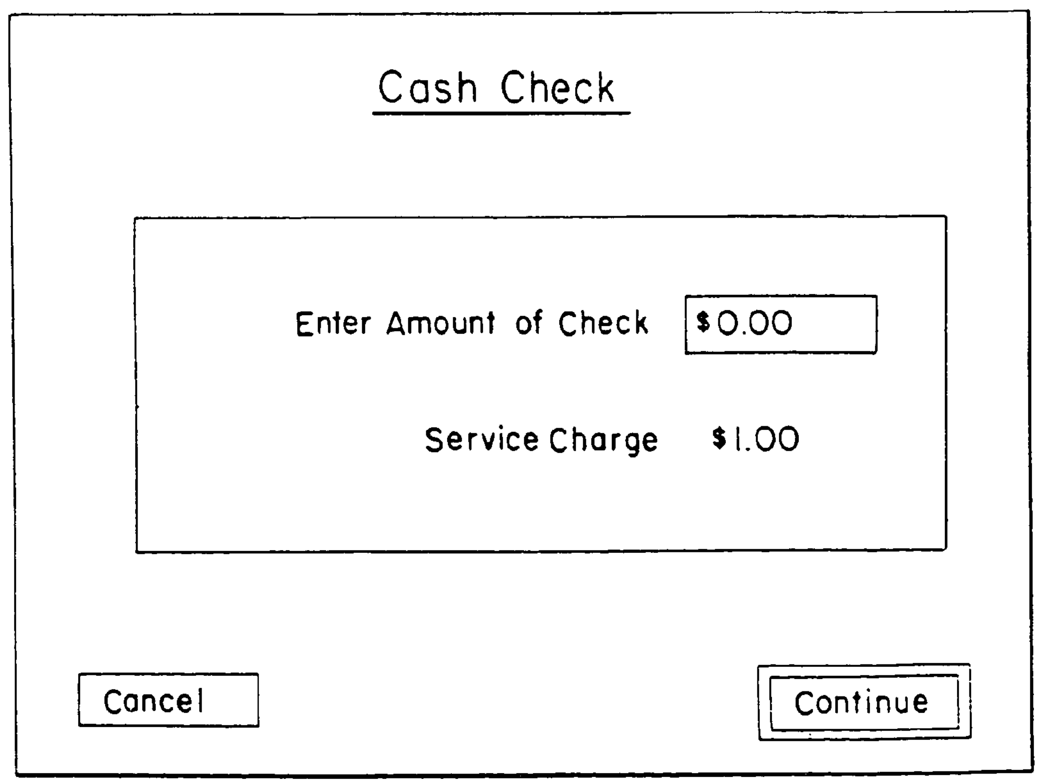

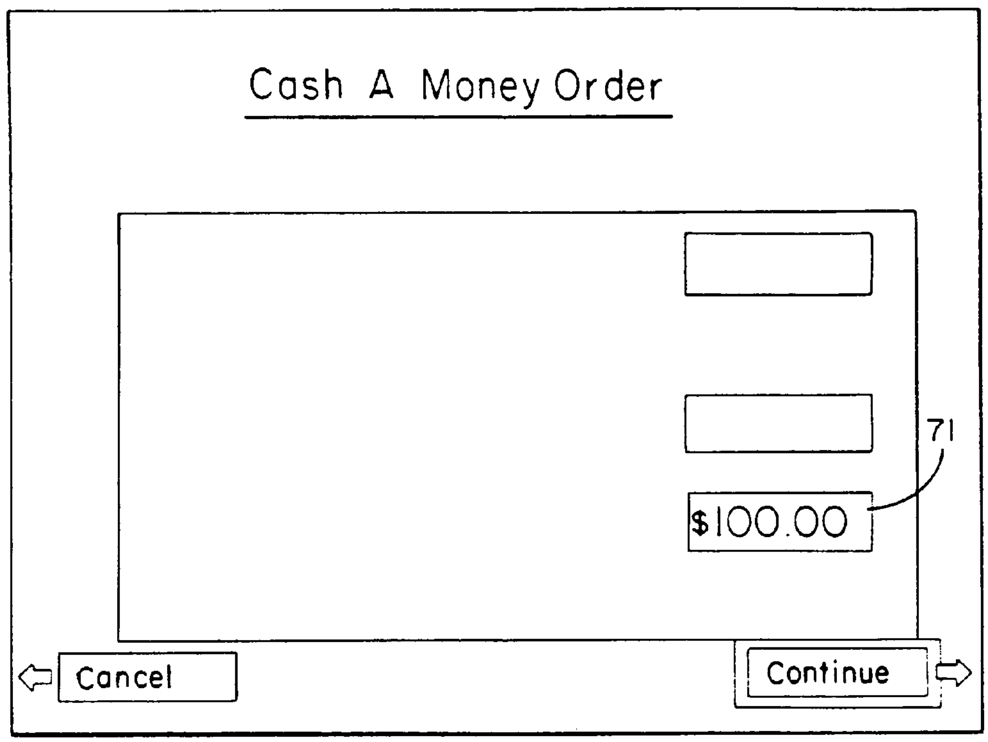
FIG. 17A
FIG. 17B
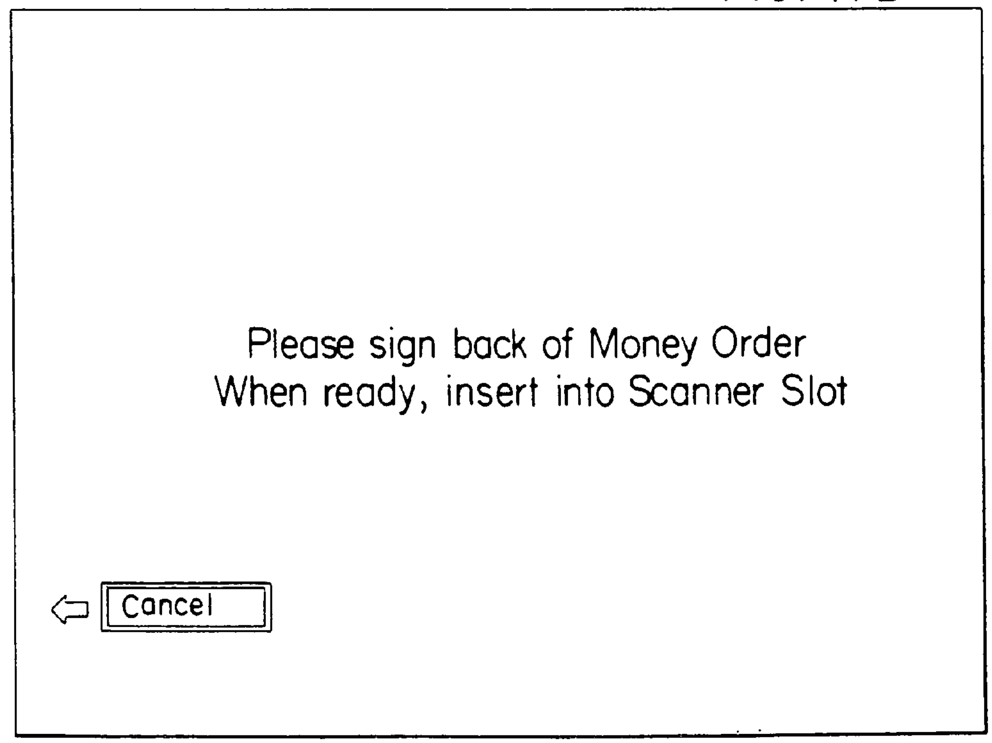

Sorry,

We Cannot Process This Money Order
Please Check With Your Financial
Institution

FIG. 17C

Figures 18, 18A:
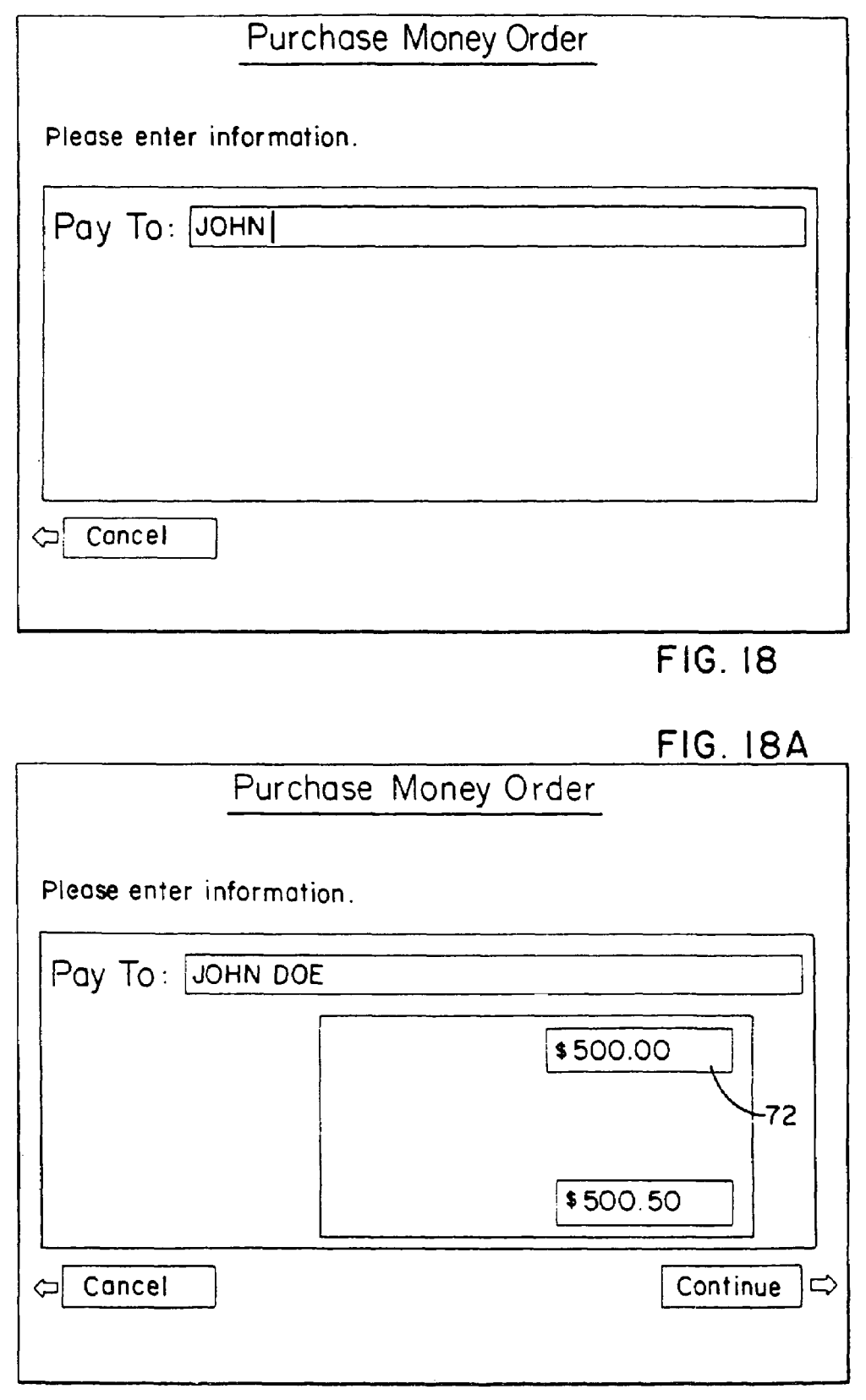

Purchase Money Order

Please enter information.

Pay To: JOHN

Cancel

Purchase Money Order

Please enter information.

Pay To: JOHN DOE $500.00

72

$500.50

Cancel

Continue

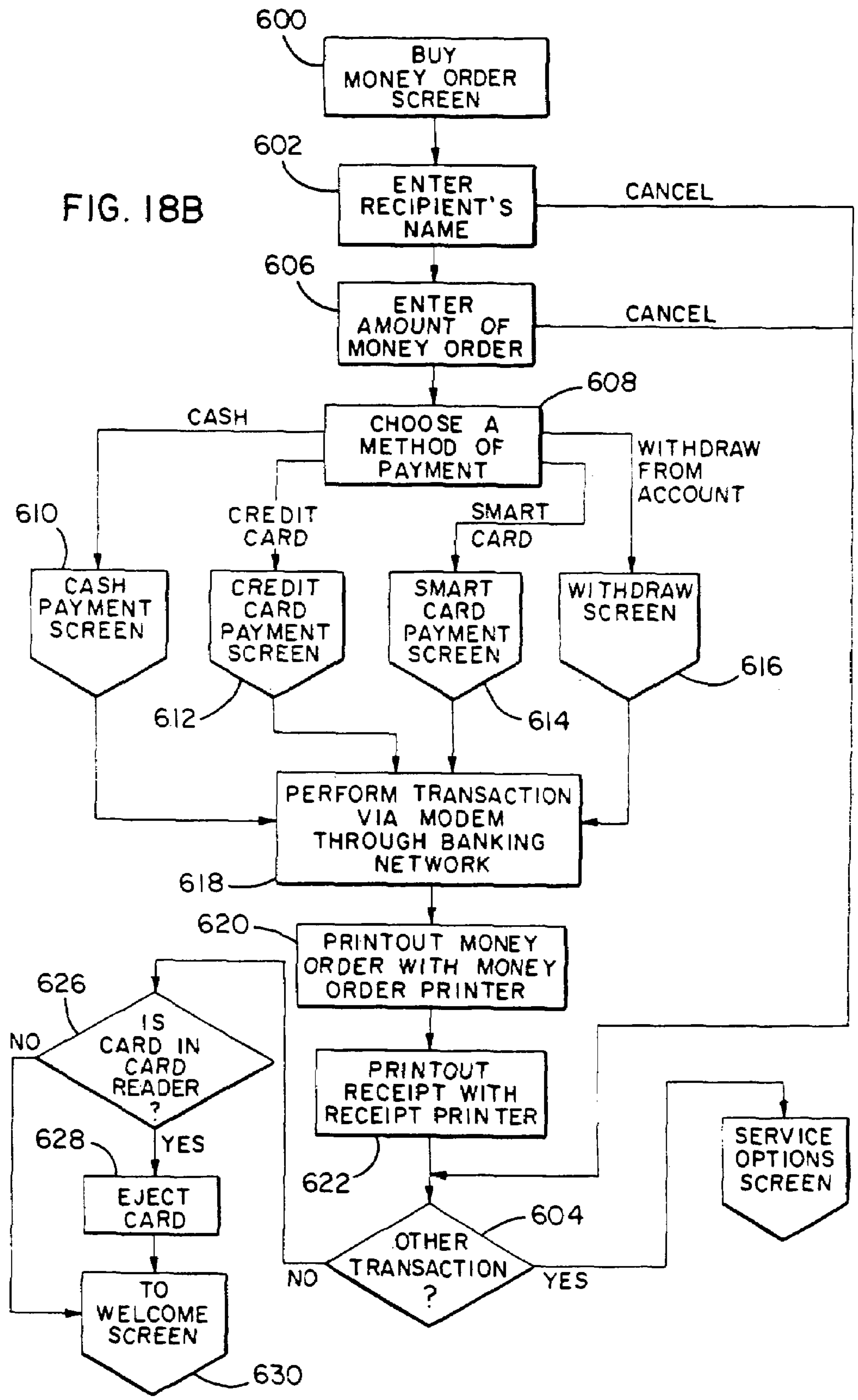
FIG. 18B
600
BUY MONEY ORDER SCREEN
602
ENTER RECIPIENT'S NAME
CANCEL
606
ENTER AMOUNT OF MONEY ORDER
CANCEL
608
CHOOSE A METHOD OF PAYMENT
CASH
CREDIT CARD
SMART CARD
WITHDRAW FROM ACCOUNT
610
CASH PAYMENT SCREEN
CREDIT CARD PAYMENT SCREEN
612
SMART CARD PAYMENT SCREEN
614
WITHDRAW SCREEN
616
PERFORM TRANSACTION VIA MODEM THROUGH BANKING NETWORK
618
620
PRINTOUT MONEY ORDER WITH MONEY ORDER PRINTER
626
IS CARD IN CARD READER ?
NO
YES
628
EJECT CARD
TO WELCOME SCREEN
630
PRINTOUT RECEIPT WITH RECEIPT PRINTER
622
OTHER TRANSACTION ?
604
NO
YES
SERVICE OPTIONS SCREEN

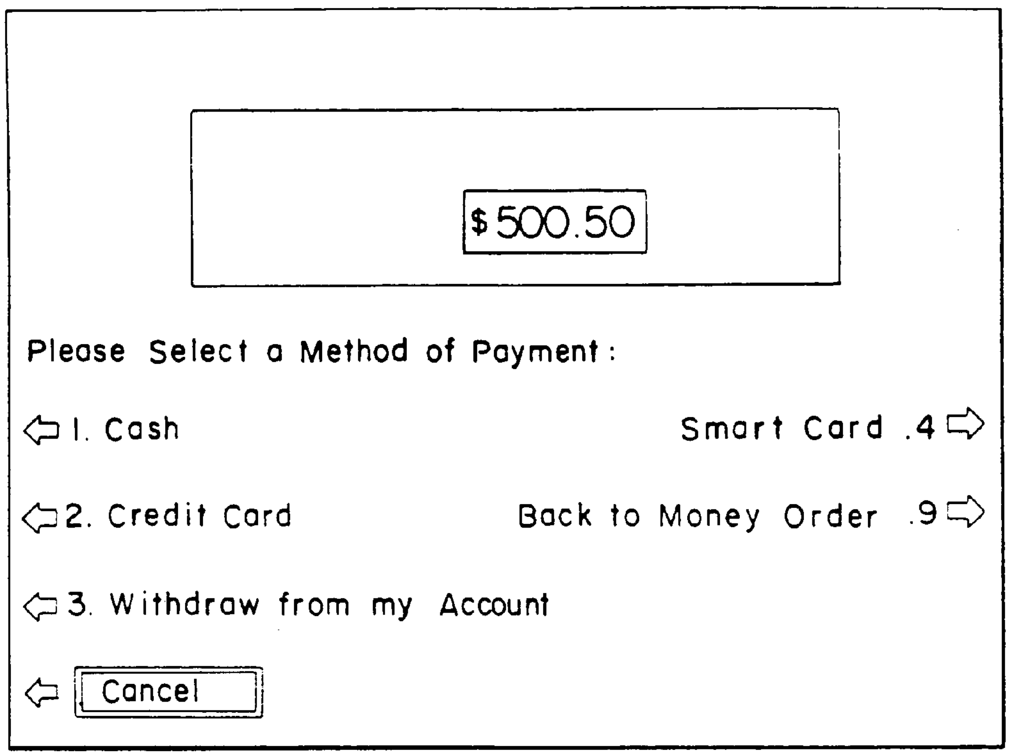
FIG. 18C
FIG. 18D
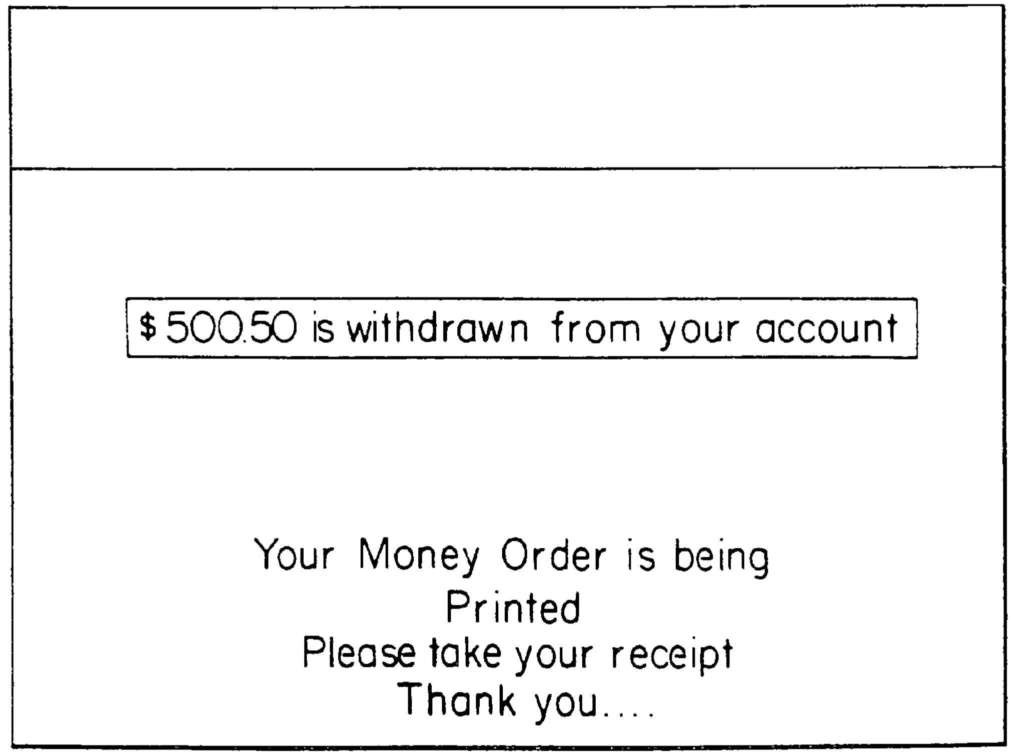

Figures 19, 19A:
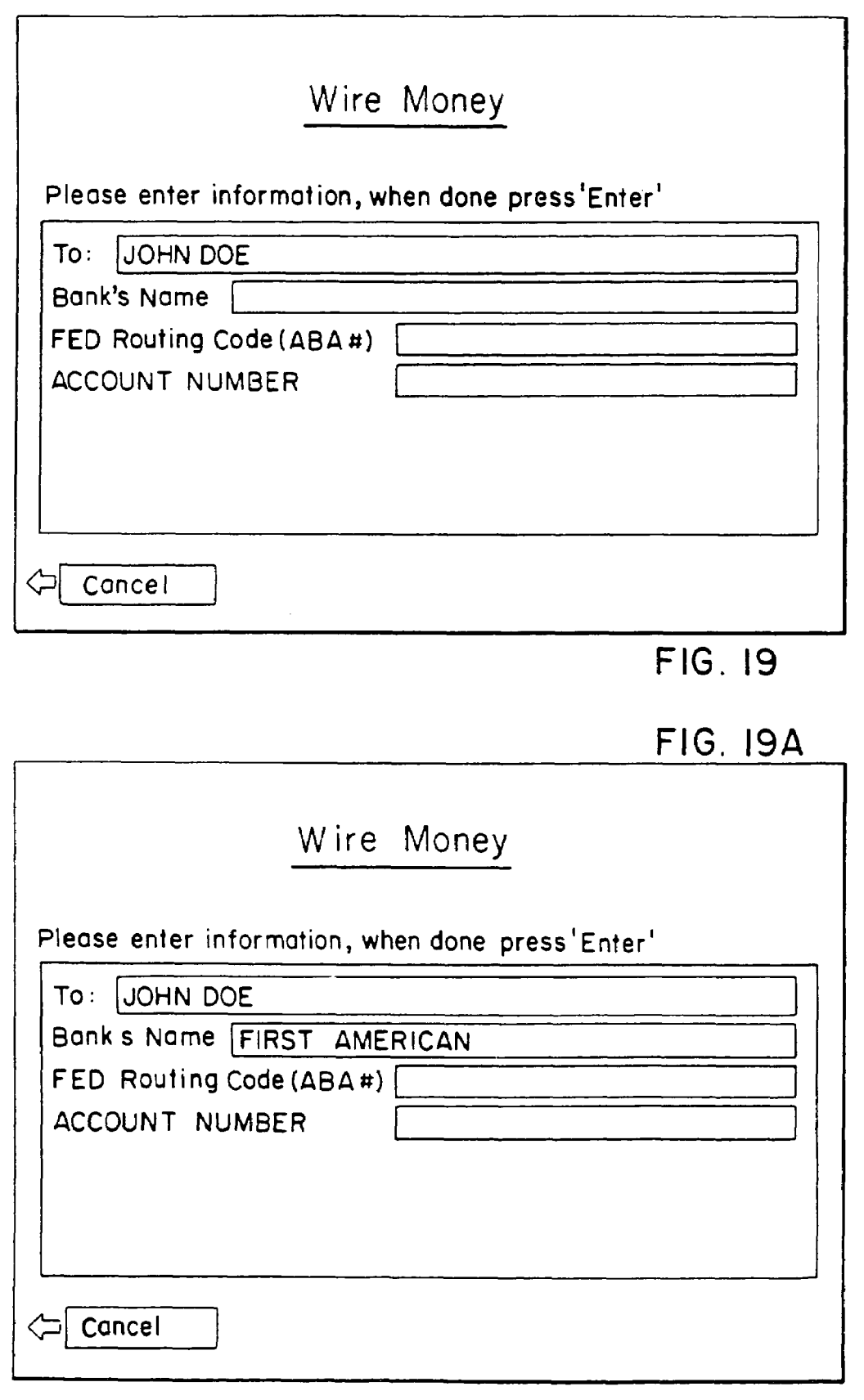

Wire Money

Please enter information, when done press 'Enter'

To: JOHN DOE

Bank's Name

FED Routing Code (ABA #)

ACCOUNT NUMBER

Cancel

Wire Money

Please enter information, when done press 'Enter'

To: JOHN DOE

Bank s Name FIRST AMERICAN

FED Routing Code (ABA #)

ACCOUNT NUMBER

Cancel

Figures 19B, 19C:
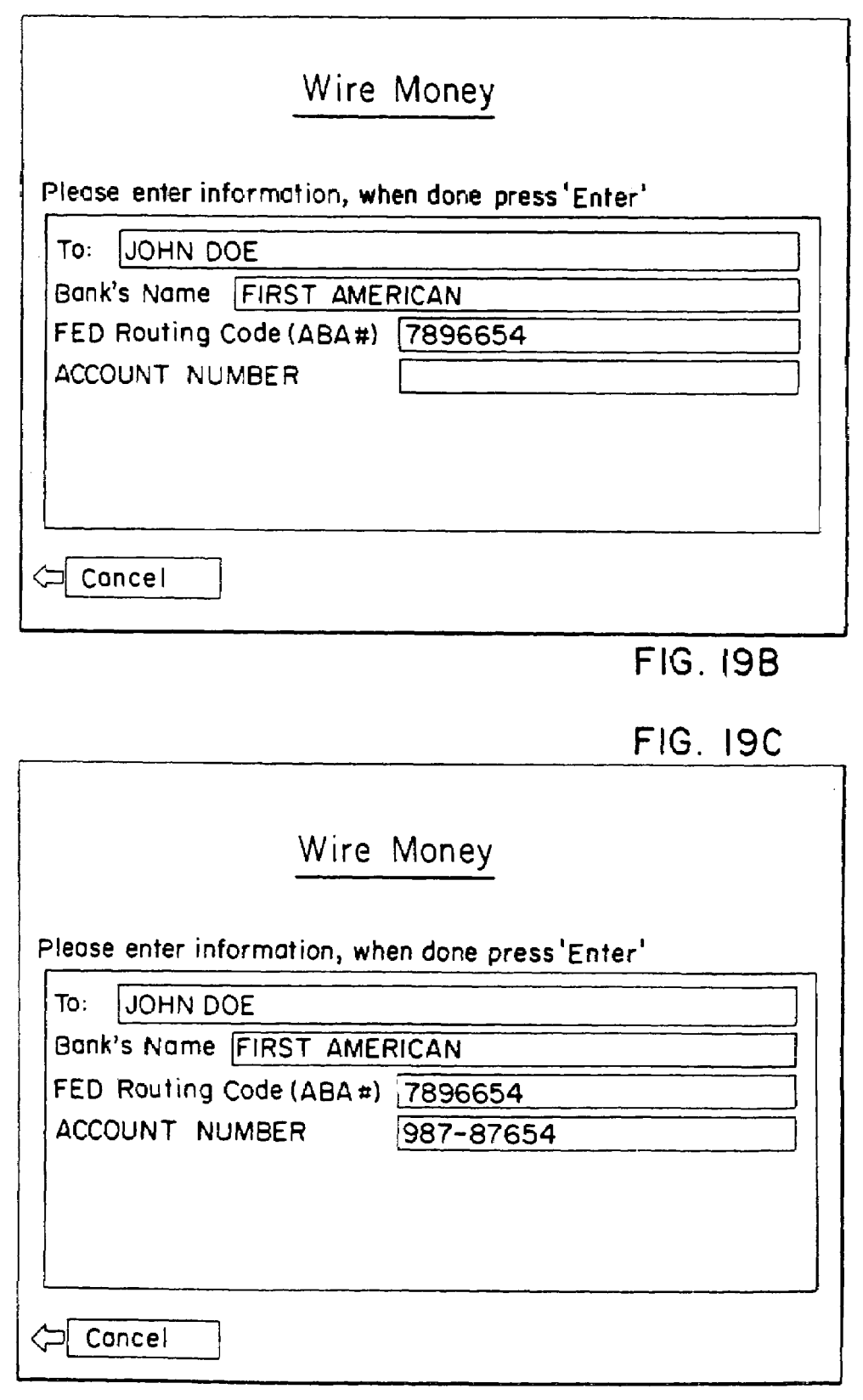

Wire Money

Please enter information, when done press 'Enter'

To: JOHN DOE
Bank's Name FIRST AMERICAN
FED Routing Code (ABA#) 7896654
ACCOUNT NUMBER Cancel

Wire Money

Please enter information, when done press 'Enter'

To: JOHN DOE
Bank's Name FIRST AMERICAN
FED Routing Code (ABA#) 7896654
ACCOUNT NUMBER 987-87654

Cancel

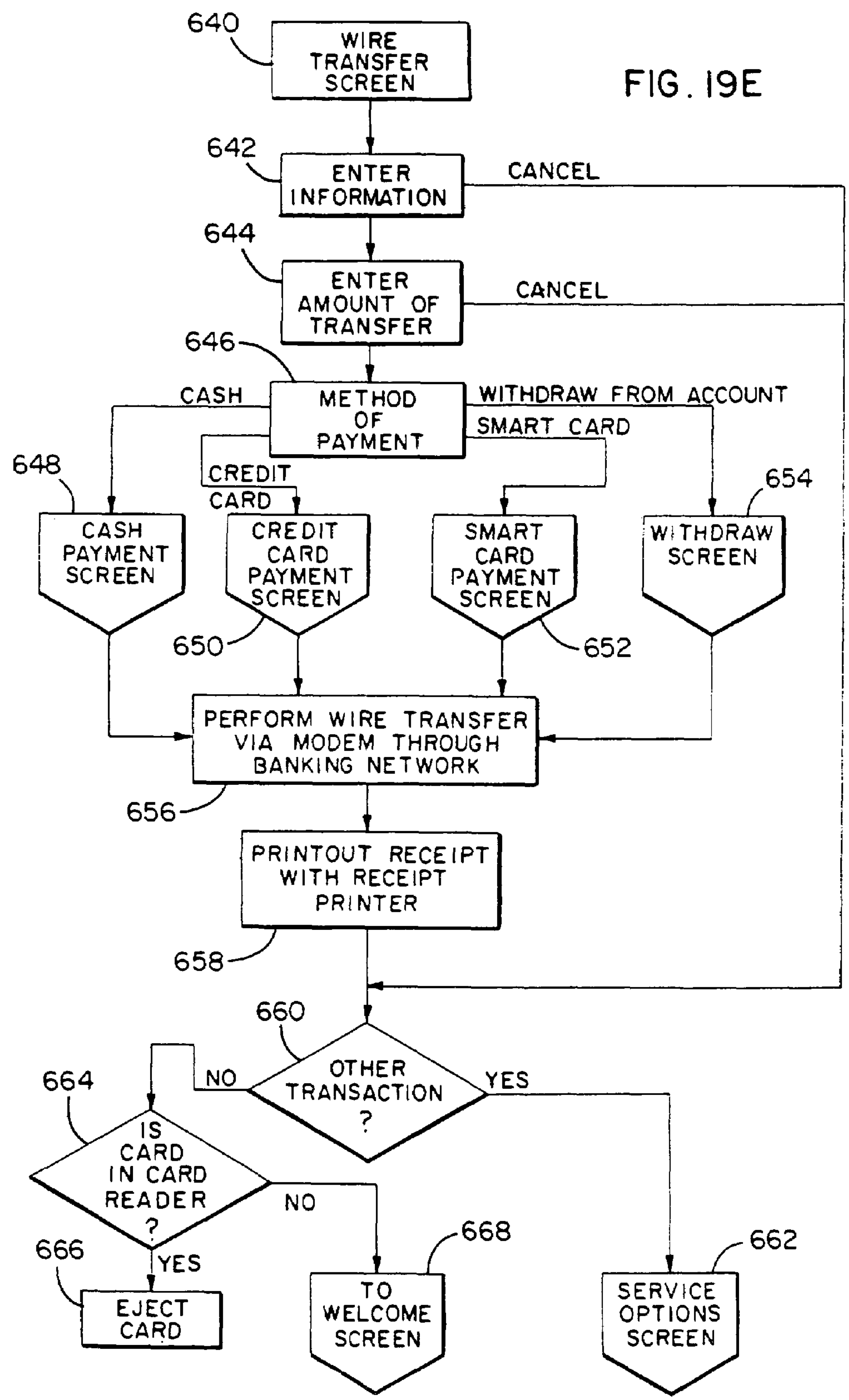

FIG. 19E
640
WIRE TRANSFER SCREEN
642
ENTER INFORMATION
CANCEL
644
ENTER AMOUNT OF TRANSFER
CANCEL
646
METHOD OF PAYMENT
CASH
CREDIT CARD
SMART CARD
WITHDRAW FROM ACCOUNT
648
CASH PAYMENT SCREEN
650
CREDIT CARD PAYMENT SCREEN
652
SMART CARD PAYMENT SCREEN
654
WITHDRAW SCREEN
656
PERFORM WIRE TRANSFER VIA MODEM THROUGH BANKING NETWORK
658
PRINTOUT RECEIPT WITH RECEIPT PRINTER
660
OTHER TRANSACTION ?
NO
YES
664
IS CARD IN CARD READER ?
NO
YES
666
EJECT CARD
668
TO WELCOME SCREEN
662
SERVICE OPTIONS SCREEN

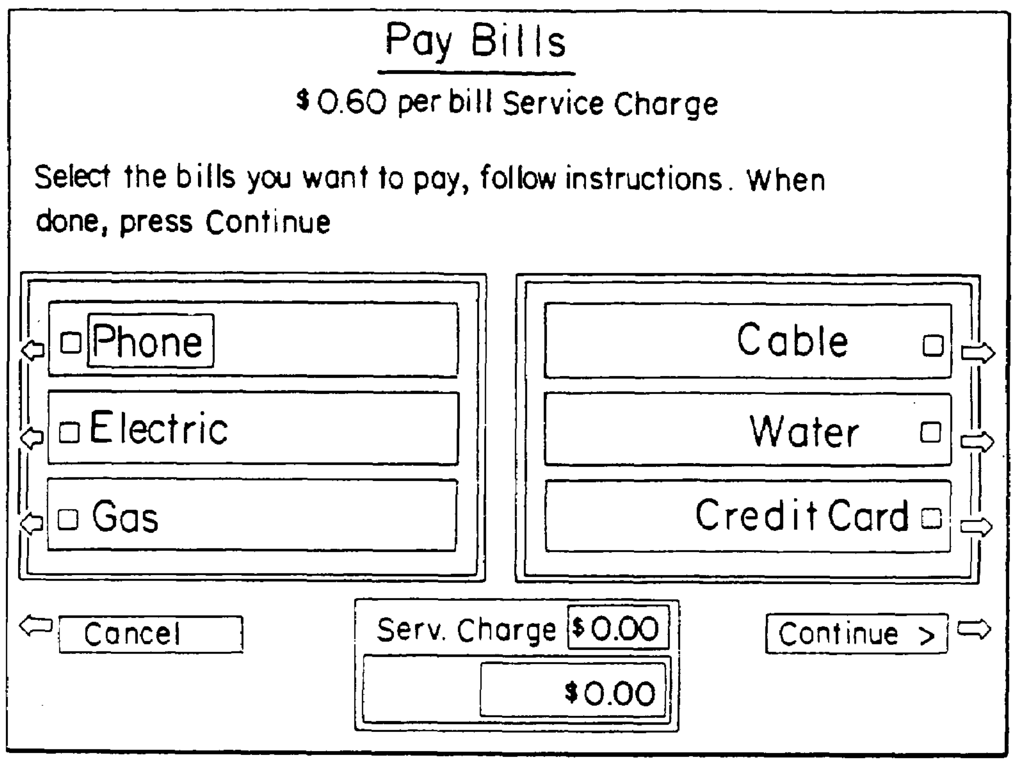
FIG. 20
FIG. 20A
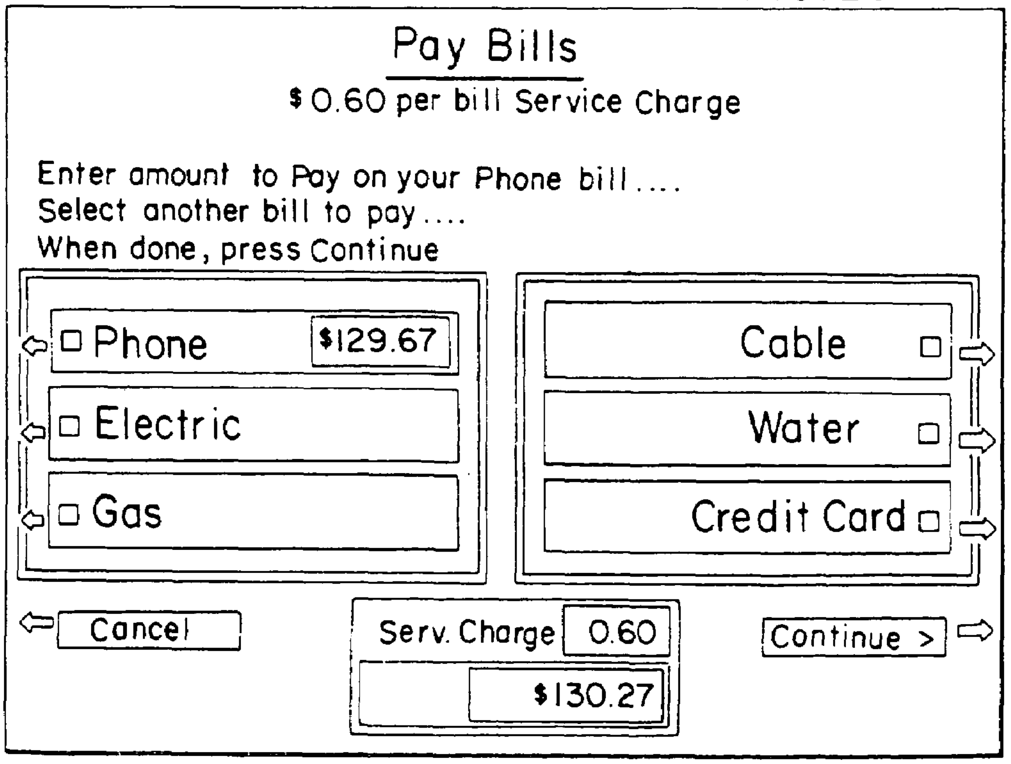

Pay Bills 0.60 per bill Service Charge

Enter amount to Pay on your Gas bill....
Select another bill to pay....
When done press Continue Phone $129.67
Electric
Gas $45.22

Cable
Water
Credit Card

Cancel

Serv. Charge $1.20
$176.09

Continue >

Pay Bills $ 0.60 per bill Service Charge

Enter amount to Pay on your Credit Card bill....
Select another bill to pay....
When done press Continue Phone $129.67
Electric
Gas $45.22
Cable
Water
$96.82 Credit Card Cancel
Serv. Charge $1.80
$273.51
Continue >

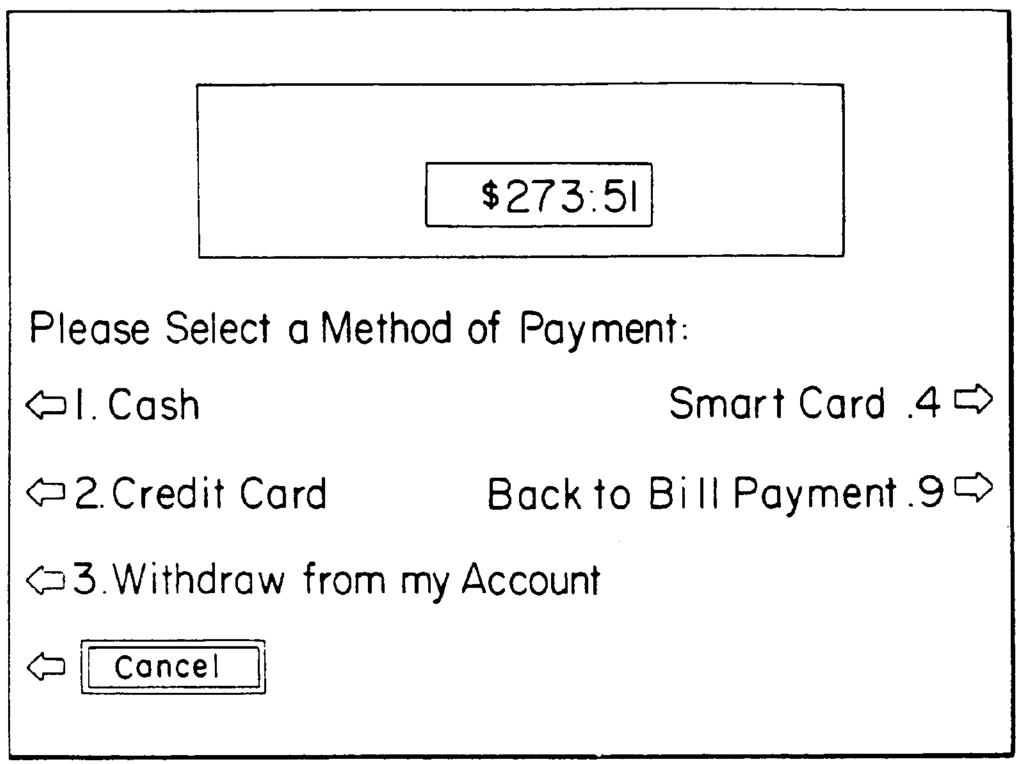
FIG. 20F
FIG. 20G
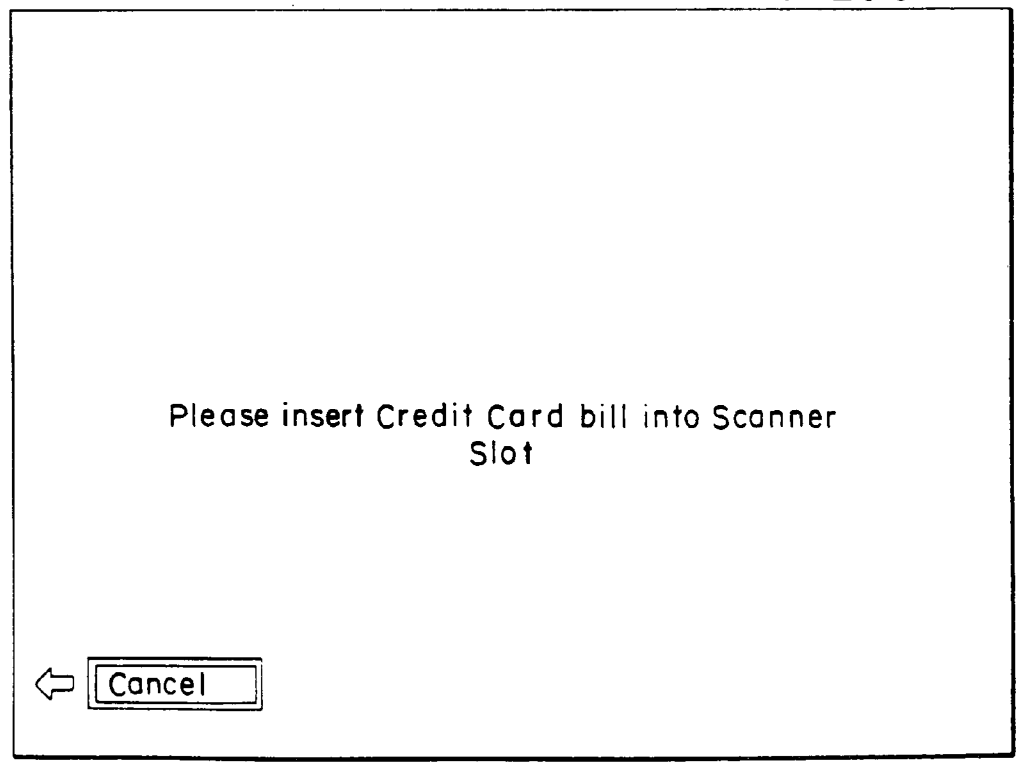

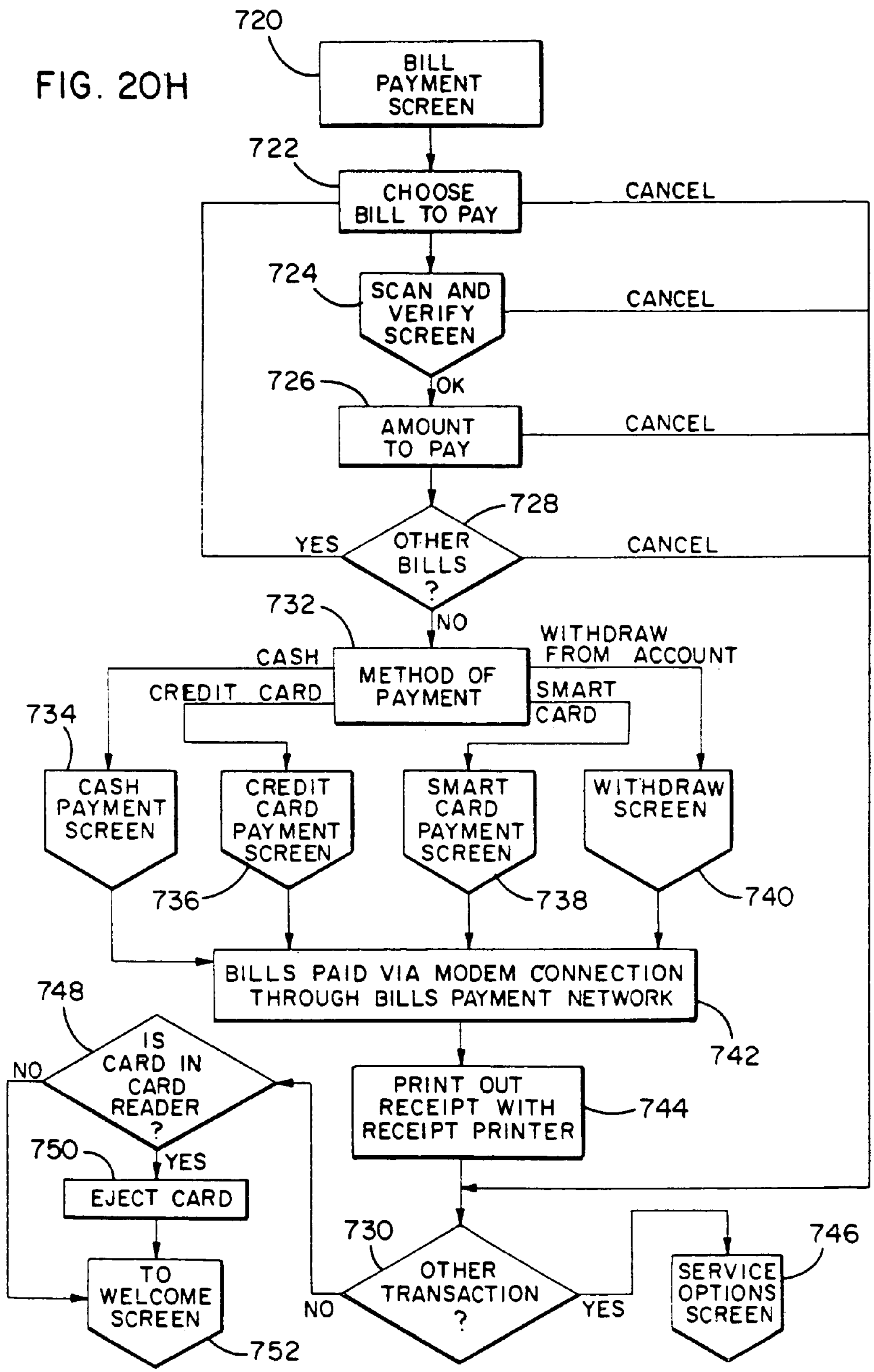
FIG. 20H
720
BILL PAYMENT SCREEN
722
CHOOSE BILL TO PAY
CANCEL
724
SCAN AND VERIFY SCREEN
CANCEL
OK
726
AMOUNT TO PAY
CANCEL
728
OTHER BILLS ?
YES
CANCEL
NO
732
METHOD OF PAYMENT
CASH
CREDIT CARD
SMART CARD
WITHDRAW FROM ACCOUNT
734
CASH PAYMENT SCREEN
CREDIT CARD PAYMENT SCREEN
736
SMART CARD PAYMENT SCREEN
738
WITHDRAW SCREEN
740
BILLS PAID VIA MODEM CONNECTION THROUGH BILLS PAYMENT NETWORK
742
748
IS CARD IN CARD READER ?
NO
YES
750
EJECT CARD
TO WELCOME SCREEN
752
PRINT OUT RECEIPT WITH RECEIPT PRINTER
744
730
OTHER TRANSACTION ?
NO
YES
746
SERVICE OPTIONS SCREEN

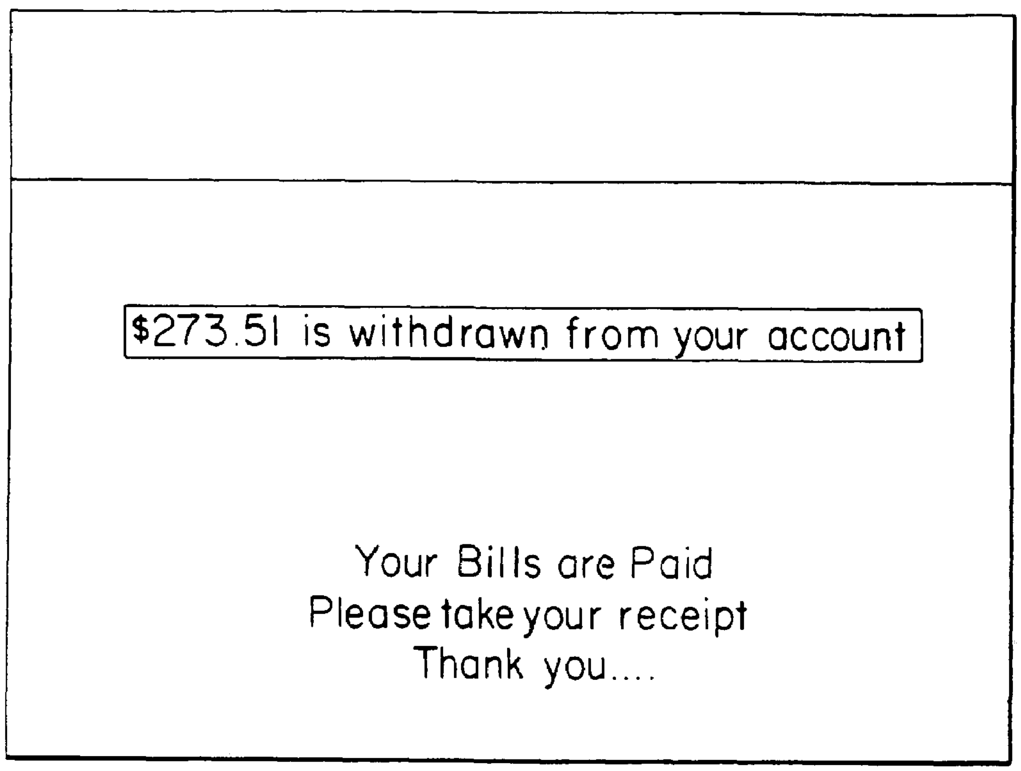
FIG. 20I
FIG. 20J
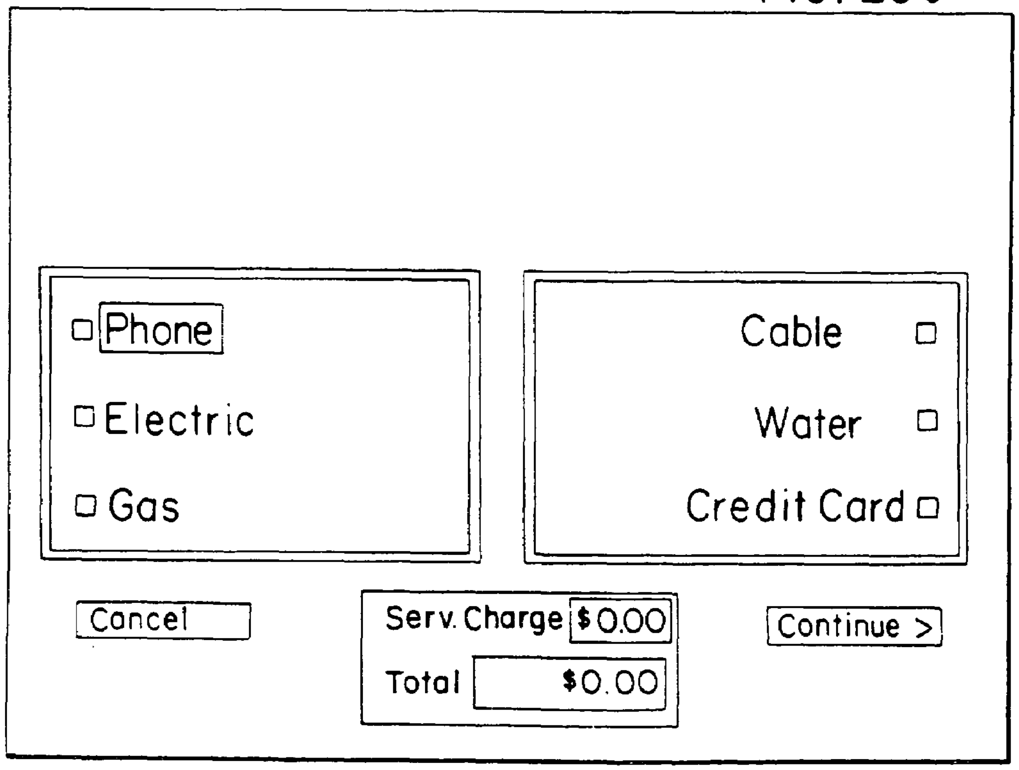

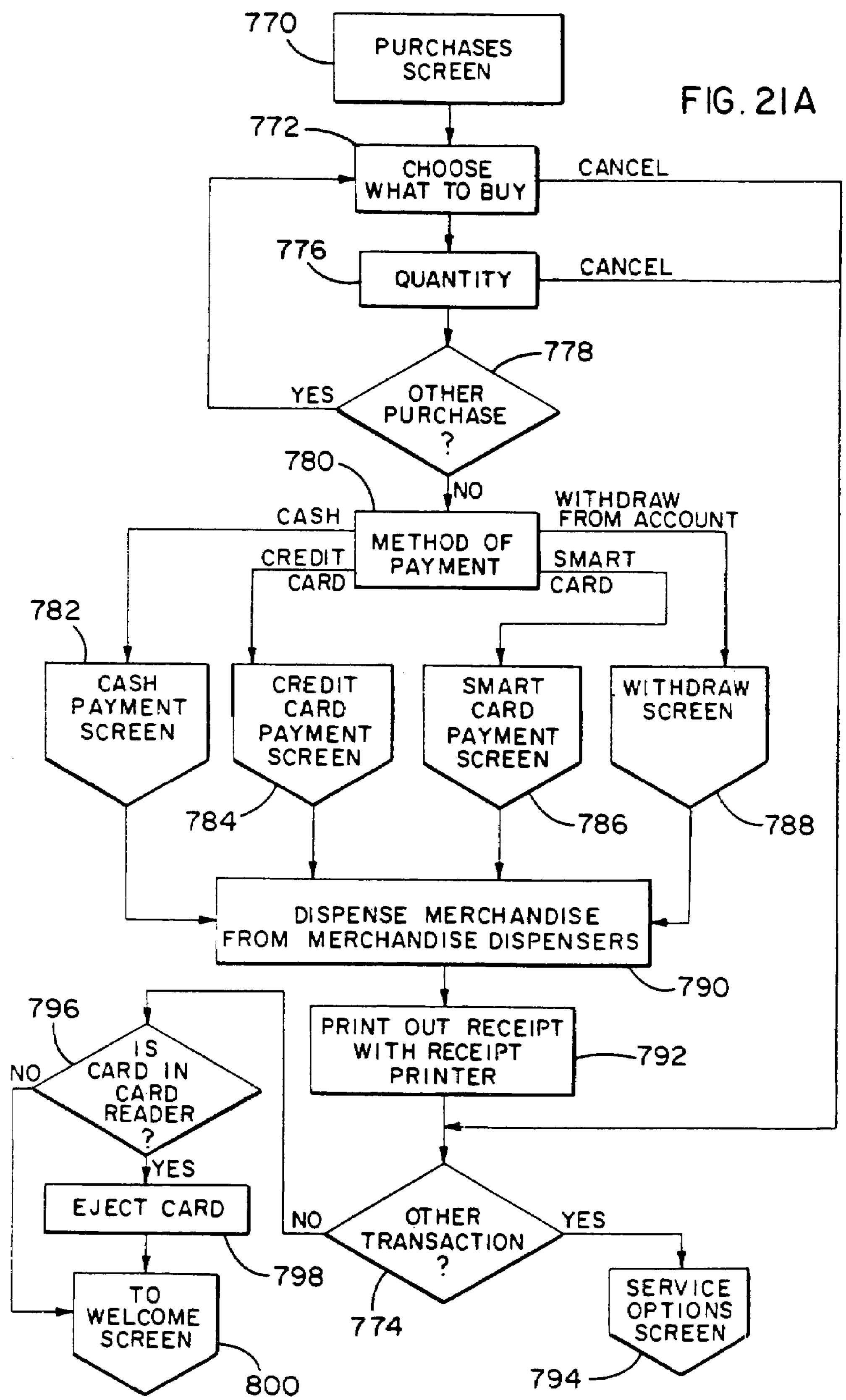
FIG. 21A
770
PURCHASES SCREEN
772
CHOOSE WHAT TO BUY
CANCEL
776
QUANTITY
CANCEL
778
YES
OTHER PURCHASE ?
780
NO
CASH
METHOD OF PAYMENT
WITHDRAW FROM ACCOUNT
CREDIT CARD
SMART CARD
782
CASH PAYMENT SCREEN
CREDIT CARD PAYMENT SCREEN
SMART CARD PAYMENT SCREEN
WITHDRAW SCREEN
784
786
788
DISPENSE MERCHANDISE FROM MERCHANDISE DISPENSERS
790
796
IS CARD IN CARD READER ?
NO
YES
PRINT OUT RECEIPT WITH RECEIPT PRINTER
792
EJECT CARD
798
NO
OTHER TRANSACTION ?
YES
774
TO WELCOME SCREEN
800
SERVICE OPTIONS SCREEN
794

Figures 21B, 21C:
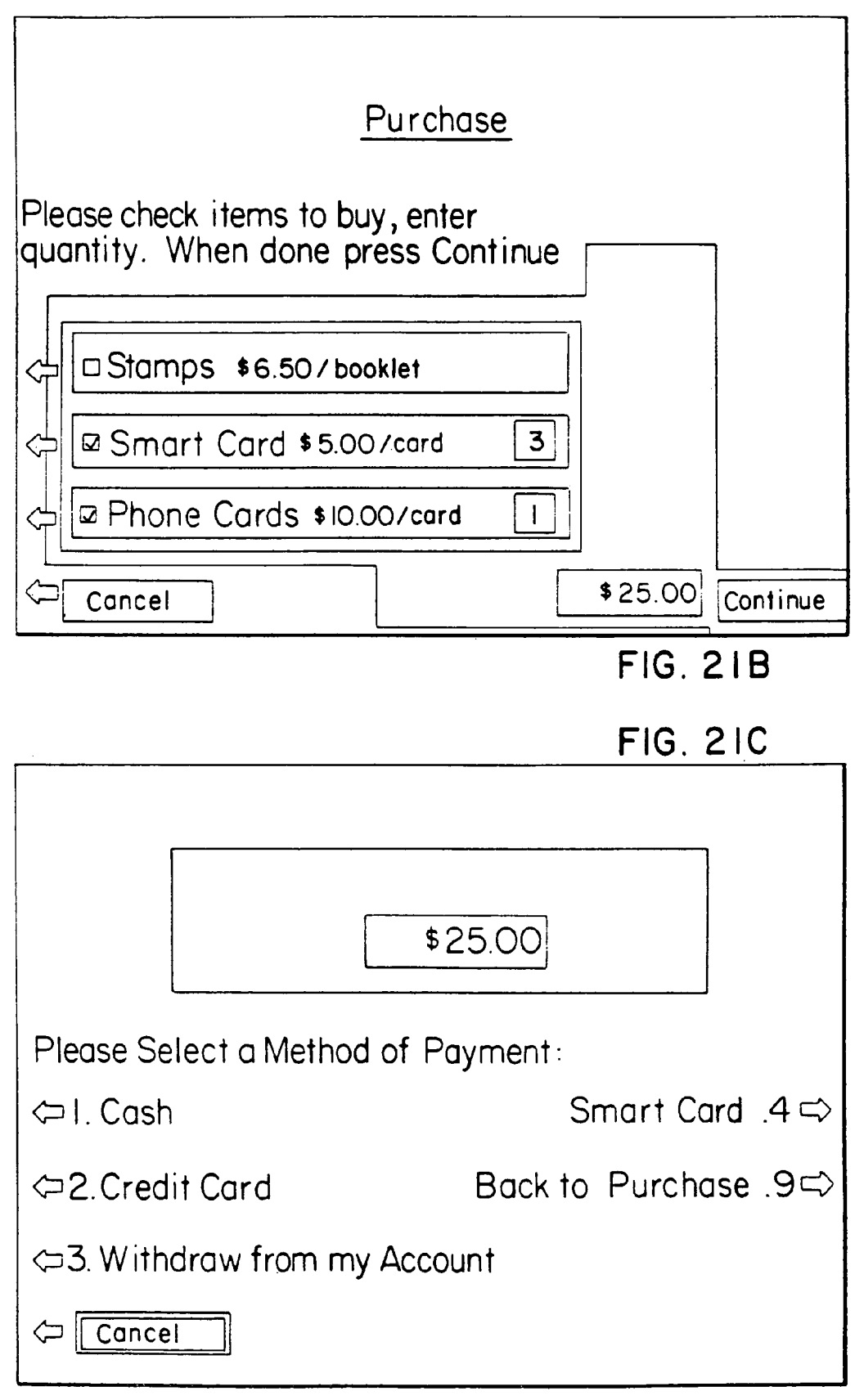

Purchase

Please check items to buy, enter quantity. When done press Continue

☐ Stamps $6.50 / booklet

☑ Smart Card $5.00/card 3

☑ Phone Cards $10.00/card 1

Cancel $25.00

Please Select a Method of Payment:

1. Cash

Smart Card .4

2. Credit Card

Back to Purchase .9

3. Withdraw from my Account

Cancel

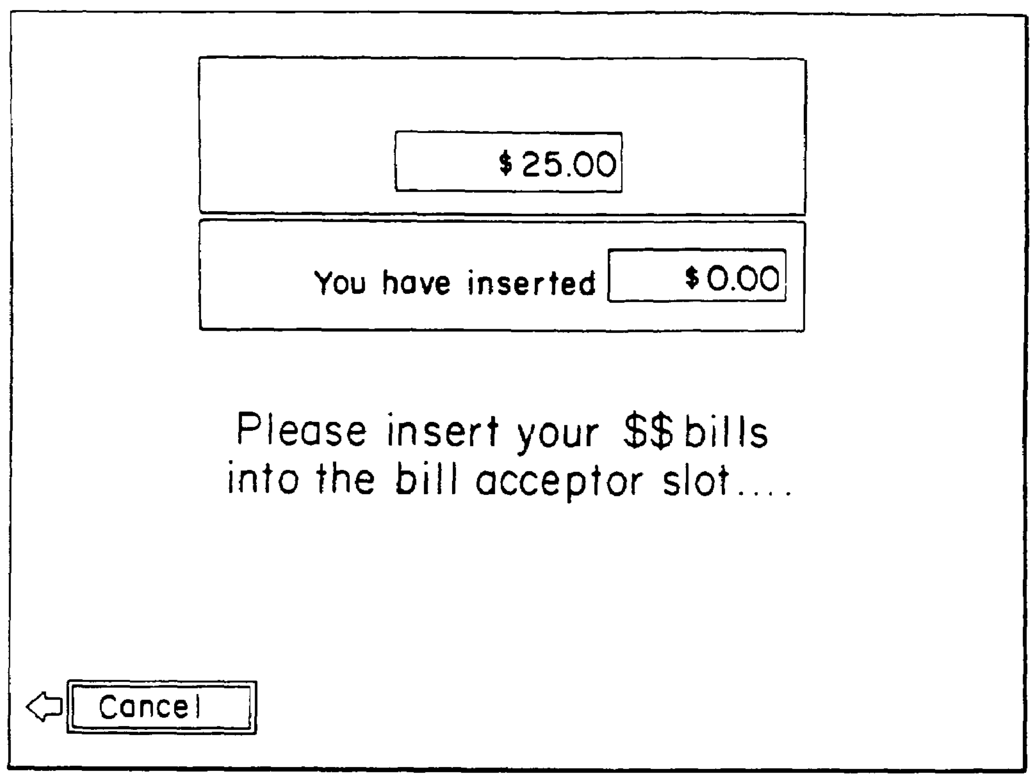
FIG. 21D
FIG. 21E
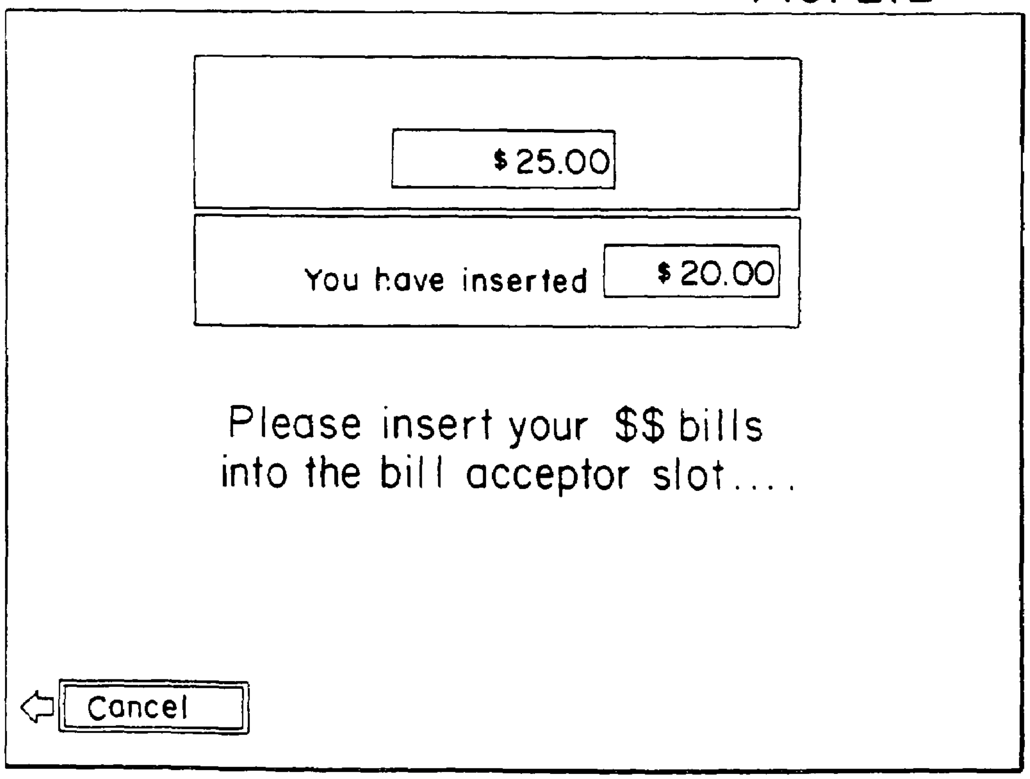

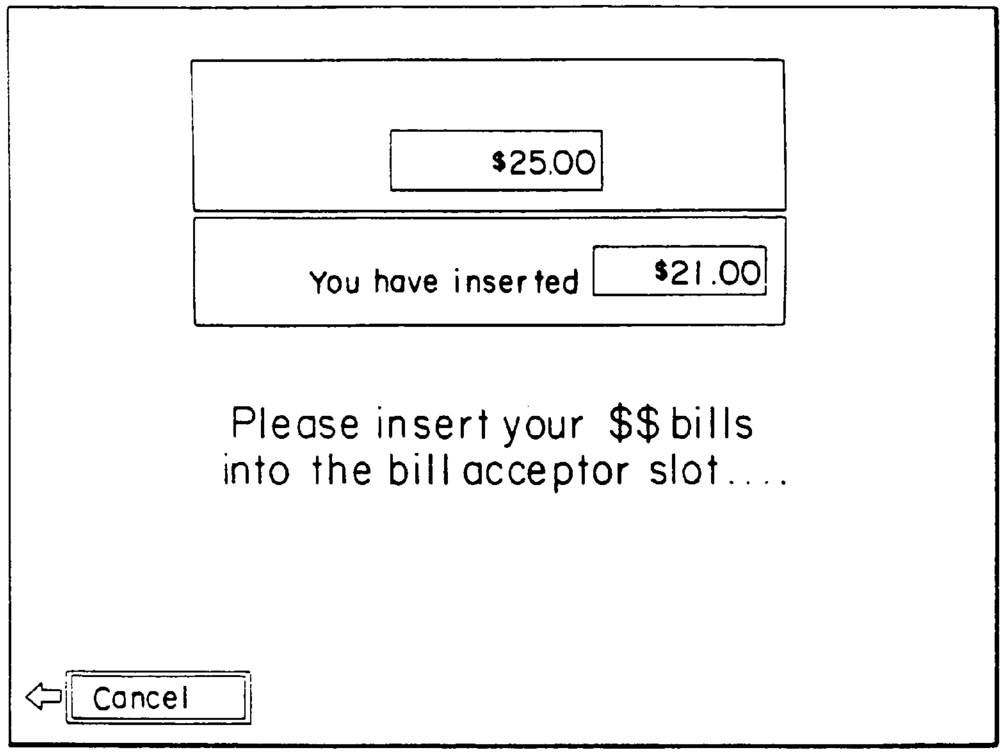
FIG. 21F
FIG. 21G
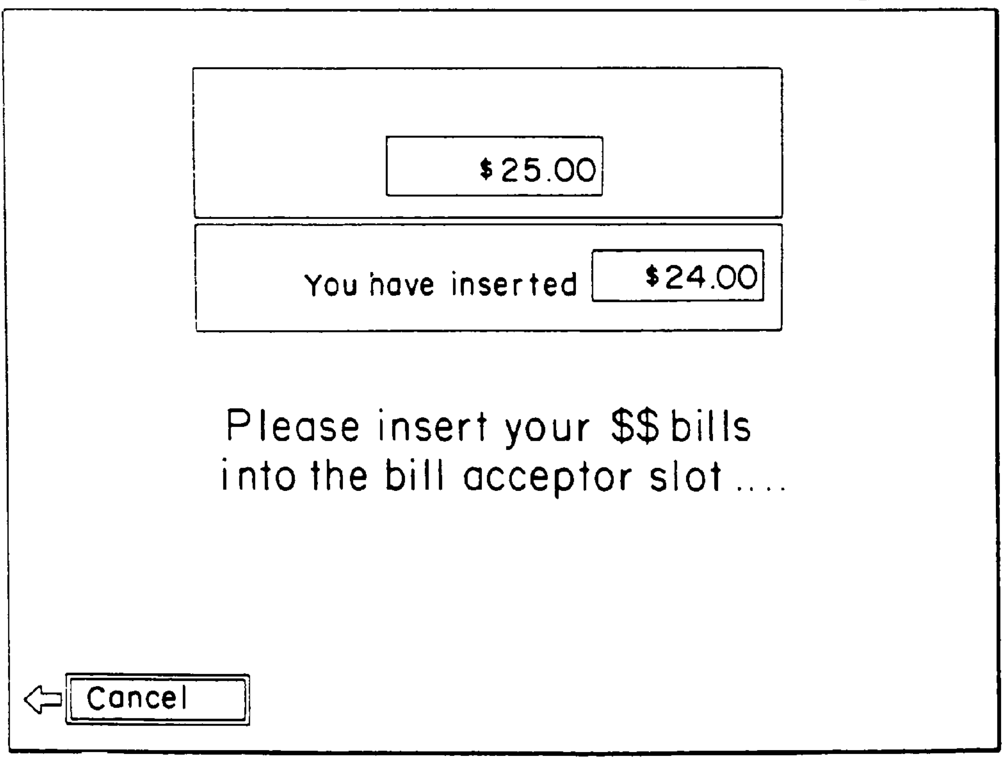

Purchase

Please check items to buy, enter quantity. When done press Continue

Total

☐ Stamps $6.50/booklet

☐ Smart Card $2.50/card

☐ Phone Cards $10.00/card

Cancel

Grand Total $0.00

Detail of LAR and CAR Arbitration Procedures

AUTOMATED DOCUMENT CASHING SYSTEM

CROSS-REFERENCE TO RELATED APPLICATION

This application is a continuation of U.S. application Ser. No. 09/113,913, filed on Jul. 10, 1998, now abandoned, which is a continuation-in-part of U.S. application Ser. No. 08/866,139, filed on May 30, 1997, now U.S. Pat. No. 5,897, 625.

BACKGROUND OF THE INVENTION

The invention relates to automated banking systems and machines including those which employ or are an improvement over automatic teller machines (ATMs). The invention also relates to providing such ATMs with sufficient security confidence levels with respect to the user, to the document, and to the bank parameters and rules that cash can be securely dispensed to the user as a result of the cashing of payroll or third party remittances or the paying of bills. The confidence levels should be such as would normally be achieved or approach those in comparable transactions with a teller.

A number of security problems arise with the addition to ATMs of functions performed by full service banks and currency exchanges. Such functions include cashing checks and money orders, paying bills, or handling a cash equivalent transaction, such as making a deposit into a bank account. When the bank is tocover such checks and dispense cash to the user, the bank requires validation of the user identity, validation of the genuineness of the document, validation of the amount(s) set forth on the document, validation of a signature on the document, validation of an endorsement when needed, validation of the bank parameters or rules, etc. To date, ATMs have been unable to provide such validations with a reliability sufficient to cash many documents without the presence of a teller.

To provide an acceptable confidence level to the bank with respect to user validation prior to dispensing cash, a minimum requirement is the use of an ATM card, smart card, or the like, and a password such as a PIN number. The machine could read these, as in conventional machines. In accordance with the preferred embodiments of the present invention, a biometric check also is provided to assure that the person using the machine is a qualified user. This involves extracting recognition features from the user and preferably biometric features such as voice characteristics or features, facial recognition features, retinal features; fingerprint features, palm features; and/or signature features or the like. The qualified user will have previously provided such features to the bank system where they are stored for comparison to the extracted features of the person using the machine. The results comparison must reach certain confidence levels that can be set and/or adjusted by the bank to its satisfaction. Thus, if provided with confidence threshold levels as to card, password and/or the biometric features, the bank can be reasonably assured that the ATM user is a qualified user.

With respect to document validation including the amount of document such as the pay amount of the remittance, a number of validation techniques are desired. To assure that the document being cashed is the original and not merely a photocopy of a valid check having a MICR line thereon, the MICR line should be tested to ascertain that a sufficient magnetic field is present at the MICR line position. Another validation that is desired is a reading of the MICR line contents and communicating to the banking system that a bank number and an account number for the identified bank refer to a real rather than a fictitious bank or account. Additionally, for checks, it is desired to be able to read the CAR amount and the LAR amount and to compare the same to detect whether or not the CAR line has been changed, for example, a “1” has been changed to a “4” or a “7” by merely adding pen strokes to the “1”. Other validations can be used and obtained to guard against violation of bank parameters or rules.

Another significant document validation procedure with respect to checks is a determination that a signature is present. That is, the check is signed at the signature line. Going even further, it would be helpful to establish some acceptable signature confidence level by comparison of the signature against a stored signature of the user in instances where the user is signing a check or endorsing the back of the check. Also, in transactions where the check needs to be endorsed, there should be a validation by the machine that a signature is present at the endorsement line. Also, there may be a step of comparing a signature against a stored signature of the endorser.

When improper payments are made to the user if the transactional is fraudulent, it is an important security feature to be able to prove that the user had an intent to defraud the bank. Absent such proof of fraudulent intent, the user may escape civil or criminal liability by claiming that such improperly dispensed cash or cash equivalent was a solely due to the fault of the ATM or banking system and not attributable to the user. That is, the user may claim he did not intentionally cause the cash dispensed or dispensed in an amount to be larger than that to which he was entitled and that there was no culpability on his part for the amount of cash dispensed to him.

The wide variety of checks, money orders and bills presents a still further problem with transactions involving cashing of checks or the like, depositing funds to an account, or paying bills. As to each document, the location of the data fields to be analyzed may be different. Preferably, the ATM machine should be able to process large amount payroll checks, smaller amount personal checks, and bills having a bill pay amount located at various places on the bill.

Preferably, a cash or cash equivalent dispensing system used without a human teller also is able to meet various bank parameters or rules. Often there is a transaction maximum limit, which may be customized as to the drawer of the check issuer or the payee. The bank may have cash payout limits on a daily or other time basis that should be met with sufficient confidence before dispensing cash. The bank may also have check date rules with respect to processing antedated or postdated checks that should be satisfied. Finally, the bank may want to set its own thresholds with respect to confidence levels with respect to the identity of the user and validation of document. The system should be able to meet the satisfaction levels desired by the bank, and to be able to adjust such levels for a given transaction, type of transaction, or different validations.

Another consideration for transactions such as cashing checks, paying bills, or other like things from a remote banking machine is the need to make a record and to leave an audit trail for later manual review, if required, of the transaction.

Among some of the mechanical problems that have been experienced with the remote ATM-type machines is that of providing change in coins or small bills. Already, over a single weekend, ATMs are being severely taxed often to the point that they are completely emptied of their cash contents. In addition, ATMs do not have change makers. When cashing checks, money orders or returning change from a cash bill payment, the ATM must be able to return to the user the exact amount. If the exact amount is in cash, the addition of a coin change maker and small denomination bill dispenser adds considerable expense and maintenance problems to the machine. This would be necessitated to provide the exact change, including coins, to the user who is cashing a check or performing some other function, such as paying a bill with cash from which change is due. The situation is aggravated when the ATM is performing transactions that include an automatic fee calculation and deduction of the fee because there will usually be change due for any cash payout after the transaction fee deduction.

Another problem with providing a commercially practical automated banking machine is that of the time needed for the transactions. Preferably, the transactions should be relatively brief and simple so that a minimal number of operator actions, such as touch screen pushes or keystrokes, are required for each transaction. If a particular transaction takes more than a minute or two, the system would probably be too slow to adequately service a line of people waiting to use the machine at a busy time, for instance on a weekend. Also, if the machine is able to process a large number of different types of transactions like those of a full-service bank or a currency exchange, the machine should provide the user a wide range of funds-delivery or payment options so that the payment can be made in cash, by credit card, by smart card, or by withdrawal from a checking or savings account.

Even if an ATM existed for paying bills or processing checks of various amounts, that ATM might have difficulty in automatically locating, reading or interpreting amount lines such as the CAR or LAR, an invoice account number, the amount of the invoice, the amount to be paid, etc. without assistance from the user. Often the numbers written, typed or printed in such lines are relatively small. They might need to be accurately separated from any other writing or numbers to provide a secure and accurate execution of the desired transaction for the document being read. To this end, there is a need for an efficient system or method to locate, read, and interpret such lines with a manual input from the user.

There is a need for an automatic banking machine which includes an ATM-like machine that performs and allows a number of service options, such as for example the withdrawing of cash, the deposit of cash, the cashing of a check, the cashing of a money order, the purchase of a money order, the transfer of funds by wire, payment of a bill and purchase of end user items.

SUMMARY OF THE INVENTION

In accordance with the present invention, there is provided an automated banking system including one or more machines which perform the usual ATM functions, but also have such significant security safeguards that they allow the cashing of monetary transaction documents such as checks or money orders, or handling of cash equivalent transactions such as making a deposit in the bank account of the user, without the aid of a teller. These functions are achieved by having sufficient validation of the identity of the user, validation of document, such as being a signed or endorsed check or the like, validation of the amount to be paid in cash or deposited, and validation of the banking system parameters or rules for the customer and/or transaction.

With respect to validation of the personal identity of the ATM user, a first, minimal fraud protection procedure is to verify that the ATM card and/or the user, as presented at the machine, is associated with a qualified password or PIN number that, upon entry, validates the user as a qualified user. Preferably, and in accordance with the invention, an additional biometric comparison or recognition function is made between extracted features of the user such as face features, voice features, retina features, fingerprint features, palm features, handwriting features for signature verification, etc. In the present invention, the identity of the user is preferably validated with sufficient levels of confidence that cash will be dispensed if the other validation techniques are also satisfied. The bank will have its own rules with respect to how large a transaction will be permitted for the particular user, particularly with respect to the dispensing of cash to the user.

In the preferred embodiment of the invention, the validation of the document preferably includes the extraction of data to compare the LAR amount and the CAR amount. In instances where the check to be negotiated includes a magnetic ink character recognition (MICR) line amount for the amount of the check, the MICR line may be read and a comparison of the LAR to the CAR is not needed.

Additionally, other validation methods for checks may be provided and practiced such as validation that magnetic ink is present on the MICR line and that bank and account numbers are recognized as being valid within the banking system computer system.

To prove that the user intentionally requested the amount of cash being dispensed, the user must manually enter amounts using a manual entry device at the ATM, e.g., the pay amount of the check, so that user will not be able to contend later that a machine error caused a specific payment to him. A part of the proof of the intentional request yielded by scanning the check and presenting a computer-generated image of the check to the user and prompting the user to enter the payable amount via an entry device.

A still further validation technique is used in the preferred embodiment of the invention to safeguard the assets of the bank. Banks may have their own set of parameters or rules governing payouts and other transactions that must be validated. For example, validation techniques are used to assure that the amount of cash being paid out is equal or less than the transaction or daily limit for the user and the bank is satisfied with paying out those amounts based on credit history of user.

In accordance with a further aspect of the invention, the bank will receive a validation that a signature is present at the signature line of the document, such as a check, before performing the requested financial transaction with respect to the check. To this end, the signature line is located and an analysis is made to an acceptable confidence level that a signature is present at the signature line. If a signature is lacking, the check will be rejected. Preferably, an analysis will be made as to verify the user's signature against stored user signatures to provide an additional security check to provide further confidence to the bank doing the transaction. Machine protection against a skilled forgery is difficult with current technology; nonetheless, unskilled forgeries or ambiguous signatures may still be detected. In instances where a third-party check or money order is to be processed and the ATM user must endorse the instrument, it is preferred to locate the endorsement line and at least validate that an endorsement is present in order to protect the receiving bank and others in the check reconciliation process against certain types of claims. Again, if the user has signatures of record, the endorsement can be compared to the signatures of record and a confidence level validation can be achieved if the transaction is to be completed.

In the preferred ATM machine, the user manually selects the transaction, for instance from a list of transactions including check cashing, check deposit, bill payment, etc. The user then further operates the machine by inserting the document into the machine to cause a computer generated image to be seen by the user and to allow for analysis of features of the document image reflective of the document's contents. Because of the wide variety of document sizes and the variety of locations of the amount line or lines such as CAR, LAR or bill payment due, it is preferred to prompt the user to locate the coordinates of and/or to bound one or more fields for analysis and validation. These fields may include a date field, a CAR field, a LAR field, an amount field, an account number or MICR line field. If the document fails to meet the threshold validity for any one or more of these bounded fields, further transaction processing is aborted without any cash being dispensed to the user.

In accordance with a further aspect of the invention, the ATM user is prompted by the display and the display provides a bounding box image. The bounding box can be adjusted by the user who then accepts or rejects with respect to a particular line. The accepted line in the bounding box is machine interpreted by OCR or some other image processing technique or the like. Typically, account numbers for bills and the amount of the bill to be paid are located often arbitrarily at various places. They are difficult to locate and must be precisely delineated from other adjacent typing, printing, letter or cursive to allow the transaction to be accomplished. In a preferred embodiment of the invention, the user is prompted to touch a touch screen display at the desired location, e.g., the account number on an invoice. The user then has the option of "tweaking" or adjusting the bounding box to cover only the desired information.

The user is prompted to point to the general area of the document image that contains the information, such as an account number or an amount, to be bounded. The identified region would have its image zoomed on the screen. The first zoom step might be 1.8× linear magnification with the next step 1.1×. The magnification factor would decrease for each additional step to help avoid zoom overshoot. When zooming has been completed, the user would so indicate to the machine and then would be prompted to define the bounding box. This would be done in part by pointing to the beginning and the end of the area of interest. After this first bounding box is generated, a pixel analysis routine would be executed in the pixels at the bounding box borders. This would help ensure that no stray or extraneous characters were inadvertently included in the bounding box leading possibly to a spurious result from later analysis of the data contents of the bounding box. Finally, the user would indicate her acceptance or rejection of the final bounding box, which might change color for clarity, by appropriate keystrokes or touch screen entries or the like.

This technique would avoid problems of lack of bounding box resolution due to a user's finger obscuring a feature of interest during box definition. An alternative bounding box technique would require the user to trace her finger around the region of interest thereby enclosing it rather than simply identifying the beginning and the end of the field.

In order to assist the user the ATM provides prompts to the user and has buttons or touch screen areas that allow the user to switch back to the menu screen to begin again. In the alternative they would allow the user to undo the current screen and go back one screen to make a revision or the like where appropriate.

When processing a monetary transaction document for routine bill paying, it is preferred to provide a validation of the bill, the user and the monetary transaction document being used to pay the bill or a portion thereof. With a bill-paying transaction, an operative assumption may be made that where no cash or cash equivalent is being paid out to the user, that user lacks an incentive to misrepresent the pay amount on the checks or the like. In the paying of bills, the user will select the bill payment transaction from a list of transactions. The user will be prompted to make one or more manual entries into machine, like the amount of the bill, the amount being paid by the user which should be equal to or less than the check; and the user's account number on the bill. The machine will scan and interpret the user's account number on the bill, the full amount due, and the date field. If the amount being paid is other than the full amount of the bill, a prompt to enter the tendered amount is provided to user on a screen or the like. When the amount of the check or the like from which the funds are derived is greater than the amount being paid, the user may be prompted to have the remainder of the funds paid in cash or loaded into a balance of a debit or a smart card.

When paying a bill or making a deposit, the amount field of the document is analyzed on the bill or the deposit slip and compared to the amount manually entered by the machine user. This provides one validation procedure. In some instances, when cashing or depositing a document such as a check, the drawer of the check may have indicated the amount of the check at a MICR line. For example, large employers may issue authorized payroll checks for its enrolled employees. Those payroll checks are issued with a MICR line having the amount of the check thereon. In such instances, the MICR amount line may be read and used to validate the document and the amount to be paid without any comparison of CAR and LAR lines, as is the case for checks that lack a MICR amount thereon.

In accordance with an important aspect of the invention, the check, money order or the like is scanned and an image therefrom is dissected with extracted image information being obtained for several recognition fields. The recognition fields are processed to provide a list of amount results ranked by confidence values. The user-entered amount and these confidence values are provided to a processor for transaction arbitration involving cross-validation according to rules. If there is validation of the arbitration using the rules, the transaction is then taken, such as cashing a check, paying a bill, or making a deposit. The usual recognition fields for a check are the LAR and CAR. When a remittance document is also provided to the ATM machine for paying a bill or the like, the remittance document is scanned and its image dissected with one recognition making a deposit field being the amount for the remittance. A list of amount results are ranked by confidence levels and they are provided to the processor for transaction arbitration under the rules. The remittance amount is cross-validated with the transaction amount results in the transaction arbitration; and, upon validation, the remittance transaction action then proceeds to completion.

BRIEF DESCRIPTION OF THE DRAWINGS

FIG. 8 is a flow chart for showing the operations occurring after insertion of the card and for verification;

FIG. 8A shows the screen with the instruction to PLEASE INSERT YOUR CARD;

FIG. 8B shows a screen prompting entry of a user's password;

FIG. 8C shows the progression of the password verification operation;

FIG. 8D shows the screen when an incorrect password has been entered;

FIG. 8E shows that the password is not correct and that the card is being retained;

FIG. 8F shows a screen display prompting the user to make a touch screen selection of the language in which the transactions are to be processed;

FIG. 9 shows on the screen the money exchange or transactions options available for the user;

FIG. 10 is a screen prompting a checking or savings step as part of a transaction;

FIG. 11 is a screen showing different amounts for withdrawal from checking;

FIG. 11A is a flow chart showing the operations for a withdrawal transaction;

FIG. 13A is a screen showing the prompt for the source of a deposit into checking;

FIG. 13B shows a screen providing for entry of the amount of a check to be deposited;

FIG. 13C is a screen showing a prompt to endorse or sign the back of the check;

FIG. 13D shows the screen with a message of showing progress in confirming;

FIG. 13E shows a screen prompting the user to take a transaction receipt;

FIG. 13F is a screen with respect to a transaction for a deposit into saving;

FIG. 13I is a screen showing the amount of cash deposited;

FIG. 13J shows a request to deposit the cash into the cash acceptor slot;

FIG. 13K shows a machine verification of completion of the cash deposit;

FIG. 14 is a flow chart with respect to the document scanning and verification operations;

FIG. 15A is a screen that shows an inquiry to the user requesting a decision as to making a further transaction;

FIG. 15B is a screen display of a touch screen version of the screen display shown in FIG. 15A;

FIG. 16B shows a screen for requesting the manual entry of the amount of the check to be cashed;

FIG. 16C requests the signing of the back of the check;

FIG. 16D is a screen showing a request to re-insert the inverted check;

FIG. 16DD is a screen requesting the user to re-enter the check amount;

FIG. 16E shows a bar graph of the progress with respect to the reading of the check;

FIG. 16F shows a check cashing and the amount that is available to be received in cash;

FIG. 16G shows the completion of the check cashing and the receipt for the amount deposited to the user's account;

FIG. 16H is a touch screen display version of the screen shown in FIG. 16B;

FIG. 17A is a screen shown to the user when cashing a money order;

FIG. 17B requests the signing of the back of the money order;

FIG. 17C states that the money order cannot be cashed;

FIG. 18 shows the screen used when typing in the name of the payee with respect to a money order being purchased;

FIG. 18A shows the amount of the money order being purchased;

FIG. 18B is a flow chart showing the various operations being performed when buying a money order;

FIGS. 18C and 18D show the method of payment and the total transaction at the screen that the money order is being printed and the request to the user to take her receipt;

FIG. 19 is a screen display for wiring money;

FIG. 19A shows the account to which the money is to be wired and the name of the bank having the account;

FIG. 19B shows and requests the entry of the Federal routing code;

FIG. 19C shows the account number being added;

FIG. 19E is a flow chart showing the operations for a wire transfer;

FIG. 20 is a screen showing a number of bills that can be paid through the apparatus;

FIG. 20A shows a telephone bill, service charge and total amount to be charged for payment of the telephone bill;

FIG. 20F shows the amount of payment with respect to the telephone, gas and credit card bills; and the request for the method of payment;

FIG. 20G shows the screen when the bill is to paid by credit card;

FIG. 20H is a flow chart showing the operations that occur during a bill payment;

FIG. 20I shows a screen confirming payment of the bills;

FIG. 20J is a touch screen display version of the screen shown in FIG. 20;

FIG. 21A is a flow chart showing the various operations that occur during the purchasing transaction;

FIG. 21B shows a screen displaying request for a purchase of three smart cards and one telephone card;

FIG. 21C shows the total transaction and requests a selection of the method of payment;

FIG. 21D shows a screen showing a $25.00 transaction and showing how much has been inserted to pay for the transaction;

FIG. 21E shows that $20.00 has been paid;

FIG. 21F shows that $21.00 has been paid;

FIG. 21G shows that $24.00 has been paid;

FIG. 23 shows the payment of change either by credit to a card or by a deposit into a bank account;

DETAILED DESCRIPTION OF THE PREFERRED EMBODIMENT

Figure 3:
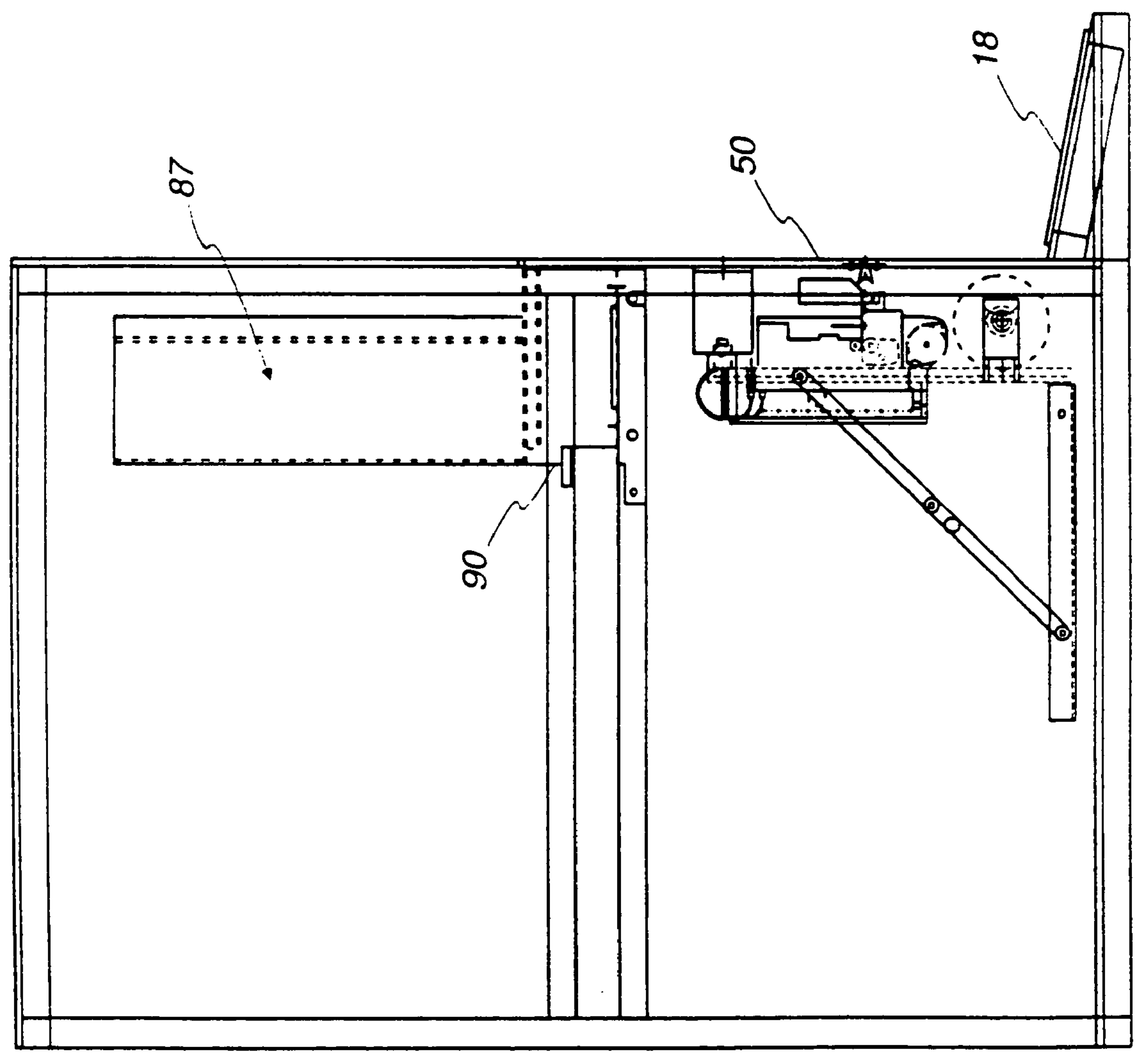
FIG. 3 is a left side view of one section of the apparatus shown in FIG. 1.

As shown in the drawings for purposes of illustration, the invention is embodied in an automated banking system that includes an apparatus 10 having a housing 12 for housing the components of the apparatus 10 which are to receive an ATM card which can be inserted through an insert, slot or opening 14 in a front wall 16 of the housing 12. The insert slot 14 will accept the usual ATM card, credit cards, IC cards or smart cards. The card slot 14 is located immediately above an alphanumeric user keyboard 18 and below a user display 20 comprising a touch screen of the type sold by Dyna-Pro under its Model No. DTFP 95633. The user keyboard 18 supplies command signals to a microcomputer 21, in this embodiment a 133 MHz Pentium-based personal computer having a 2.1 gigabyte hard disk drive for storing software, a 32 megabyte random access memory for storing instructions and operands, a 133 MHz Pentium microprocessor, an ISA bus, a PCI bus, a serial interface, and a parallel interface. (FIG. 3). The microcomputer 21 executes application software under Windows 95, which among other things, responds to keystrokes on the user keyboard 18, and signals from other input devices as set forth below. The microcomputer 21 drives the output display 20 in response to the software it is executing and the various signals it receives from the input devices connected to transfer signals to it.

Located immediately behind the insert card slot 14 is a magnetic card reader 22 (FIG. 4) which will read the ATM card, send signals to the microcomputer 21 through a serial communication card 21*a*, and immediately cause initialization, via the microcomputer 21, of all hardware and software parameters for an operation. The touch screen 20 is provided to assist the user in identifying for the machine the area of the image occupied by the account number and dollar amount of a bill, as will be explained. The illustrated keyboard 18 is a very tough, vandal-resistant, alphanumeric industrial keyboard, such as the Model 300 manufactured by Everswitch USA of Silver Springs, Md. The preferred display 20 is a flat LCD display panel sold by Sony Corporation. The keyboard and display panels are selected because they are considered to be tough, strong, easy-to-use, and difficult for thieves or criminals to vandalize or to misuse to illicitly obtain funds from the machine. A backup storage device 23 connected to the computer 21 provides further security for the software and data stored on the hard drive.

As shown in connection with the flow chart of FIG. 8 entitled "insert card and verify screen", the user will see on the screen display 20 the welcome message and a prompt to insert the banking (or ATM) card and to verify a user password with the banking network. The user will be prompted to select English or Spanish as the language for the transactions as shown in FIG. 8F. The user will then touch the screen display to select English or Spanish for the transaction language.

In a card insert routine 300 a test is made in a step 302 to determine whether the magnetic-striped identification card has been placed in the card reader 22. If it has not, control is transferred to a step 304 prompting the user to insert the card through the card slot 14. The card is then read in a step 306 and the user is prompted and enters a password in a step 308. A test is made in a step 310 to determine whether the password is verifiable by the banking network when communicated over a modem 29. If the password is not, a test is made in a step 312 allowing the password to be entered three more times. Assuming three unsuccessful tries in a step 314, an incorrect password message is displayed and process loops back to the step 308. If the password is found to be correct after step 310 the transaction is proceeded with in a step 316. If as a result of step 308 the transaction is cancelled, control is transferred to a step 320 testing for whether another transaction has been requested. This may be done by screen prompts to be answered by the user as exemplified by the screen displays shown in FIGS. 15A and 15B. The selection may be made by keypads 26 and 27, as shown in FIG. 15A or by touch screen contact with the appropriately labeled portion of the screen display shown in FIG. 15B. If it is, a service option screen 322 is displayed. If it is not, a test is made in a step 324 to determine whether the card is in the card reader 22. If the card reader 22 does not have a card in it the welcome screen is displayed in a step 326. If the card is in the card reader 22 it is ejected back to the customer in a step 328. In the event that the password is entered more than three times control is transferred to a step 330 causing the card to be eaten or retained and placed in a card bin. In a step 332 the message is displayed on the touch screen that the card has been retained and the touch screen after that displays the welcome screen in the step 326.

The display shown in FIG. 8A prompts the user to insert the card. After the insertion of the card, the display will prompt the user to please enter the PIN or password number, as shown in FIG. 8B. The processing of the entered password is shown in FIG. 8C. If an incorrect password has been used with the card, then the screen display will display, as shown in FIG. 8D, the phrase "incorrect password", and prompt the user to "please try again". If the subsequent or second password is incorrect, the machine retains the card and the screen display will show on its face, as shown in FIG. 8E, the statement that there still is an incorrect password, and that the card is being retained. The card has been "eaten" by the machine. The card can be retrieved only by contacting the financial institution owning the machine. Having verified the card and having verified the password or PIN number with the banking network over the modem 29 or the like, the machine 10 is ready to proceed with a transaction. The modem 29 communicates with the computer 21 through the serial interface 21*a* to which it is connected.

The user display screen 20 will then display the transaction options available to the user, such as those shown in FIG. 9 which include 1) withdraw; 2) deposit; 3) cash check; 4) cash money order; 5) buy money order; 6) wire transfer; 7) bill payments; 8) purchase (lottery tickets, stamps and telephone cards). The display shown in FIG. 9 will be on the panel display 20 and adjacent the pair of flanking additional keypads 26 and 27 (FIGS. 1 and 6), which have arrow keys which are aligned with these options 1-8. That is, the pressing of the arrow key 26*a* opposite the number "1)" "WITHDRAW" on the screen 20 will initiate a withdrawal. Whereas, the operation of the second arrow key 27*a* in the right hand bank of keys will initiate a "BUY MONEY ORDER" operation, to be described hereinafter.

Assuming the user has selected the "1)" withdrawal option by depressing the arrow key 26*a* opposite number "1) WITHDRAW", the screen display 20 will then display a request to an account for a withdrawal, i.e., from a checking or savings account. This is shown in FIG. 10 with the display of a "1) CHECKING" and a "2) SAVINGS" on the screen display opposite the arrow keys 26*a* and 26*b*. Assuming that the user wishes to withdraw money from a checking account, the user will press the arrow key 26*a*. The screen display 20 will then show the display of FIG. 11 with the display labeled "WITHDRAW FROM CHECKING" and with the monetary amounts "20", "40", "50", "100", "200" and other listed opposite the selection arrow keys 26*a*-26*c* and 27*a*-27*c*, respectively. By operating one of the particular arrow keys 26 and 27, i.e., the arrow key $20.00 for withdrawal from checking, will signal other positions of the apparatus 10 to perform a number of operations shown on the flow chart entitled "WITHDRAW screen" shown in FIG. 11A.

In a step 340 the withdraw screen is engaged and in a step 342 the user is prompted by the screen to insert the card and a verify screen is displayed. If the card is verified control is transferred to a step 344 allowing the user to choose from a present withdrawal amount. If the user chooses to cancel the transaction control is transferred to a step 346 testing for another transaction. If the user chooses not to choose from a preset withdrawal amount, the user may enter the withdrawal amount in $5.00 increments in a step 348 or may cancel the transaction and proceed to the other transaction test step 346. Assuming that the withdrawal amount has been entered in $5.00 increments, the withdrawal transaction is performed in a step 350 by checking over the banking network. In a step 352 a cash dispenser 30 dispenses the withdrawn amount and in a step 354 the receipt is printed by the receipt printed. Control is then transferred to the step 346 testing for additional transaction prompts. If there is, the service option screen is then displayed in a step 360. If not, the card is ejected from the card reader 22 in a step 362 and the welcome screen is displayed in a step 364.

Figure 24:
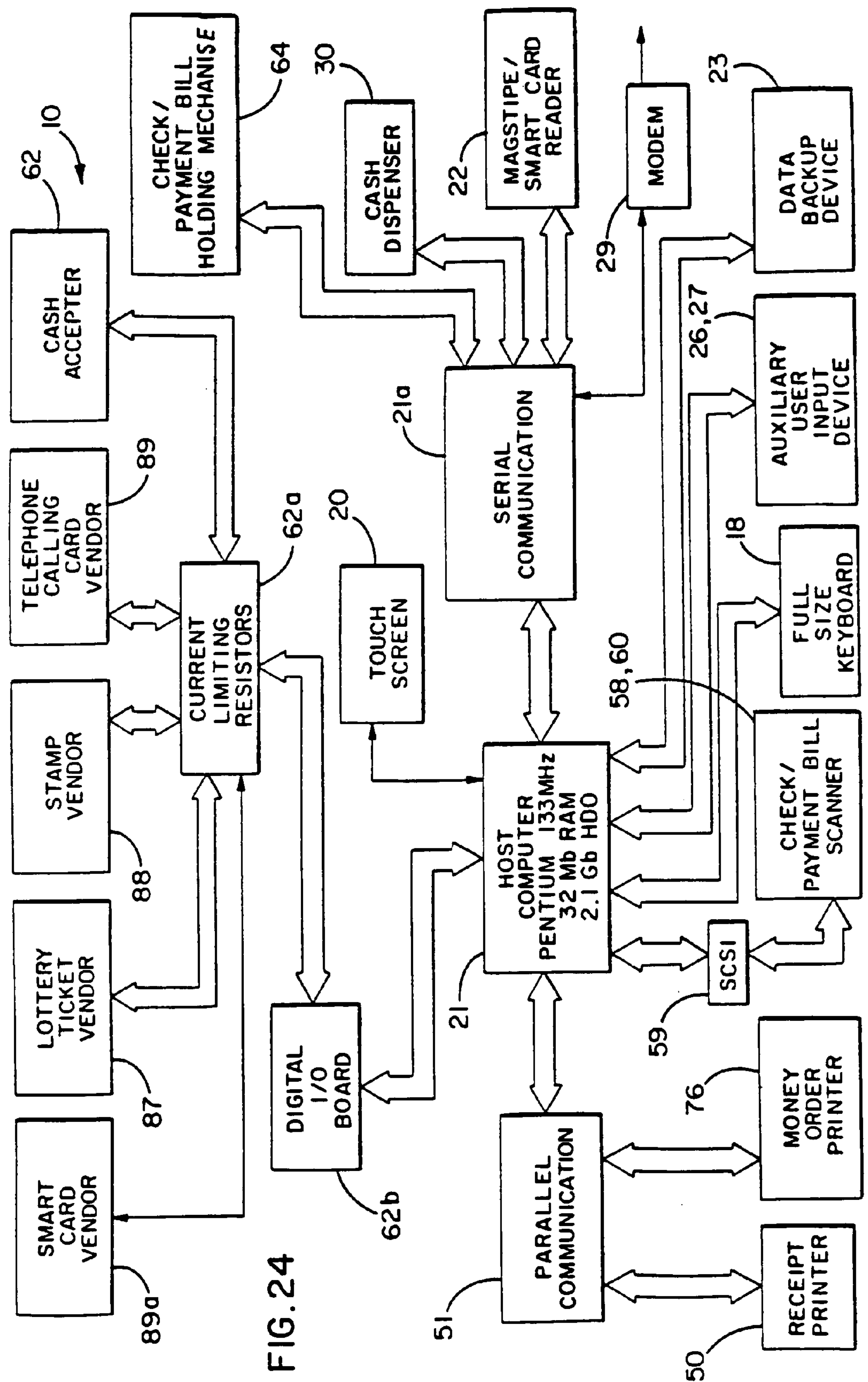
FIG. 24 is a block diagram of the apparatus shown in FIG. 1.

A connection will then be made by the electronics network and modem 29 via the banking network to access the customer's account in the bank; and then there will be an operation of the cash dispenser 30 (FIGS. 1 and 5) to dispense $20.00 in cash. The cash dispenser communicates with the computer 21 through the serial communication device 21*a* to which it is connected, as shown in FIG. 24.

The cash dispenser 30 herein is a typical cash dispenser unit used in an ATM machine. The illustrated cash dispenser is a G & D America, Inc. Model ACD which is made by Giestcke and Debrient America, Inc. The illustrated cash dispenser 30 has four (4) bins. Each bin can hold four hundred notes. The preferred cash dispenser 30 is loaded with four hundred $5.00 notes in one bin. The other three bins are each loaded with four hundred $20.00 notes. Manifestly, more or less bins may be used and also different cash dispensers may be used than that described herein.

Figure 5:
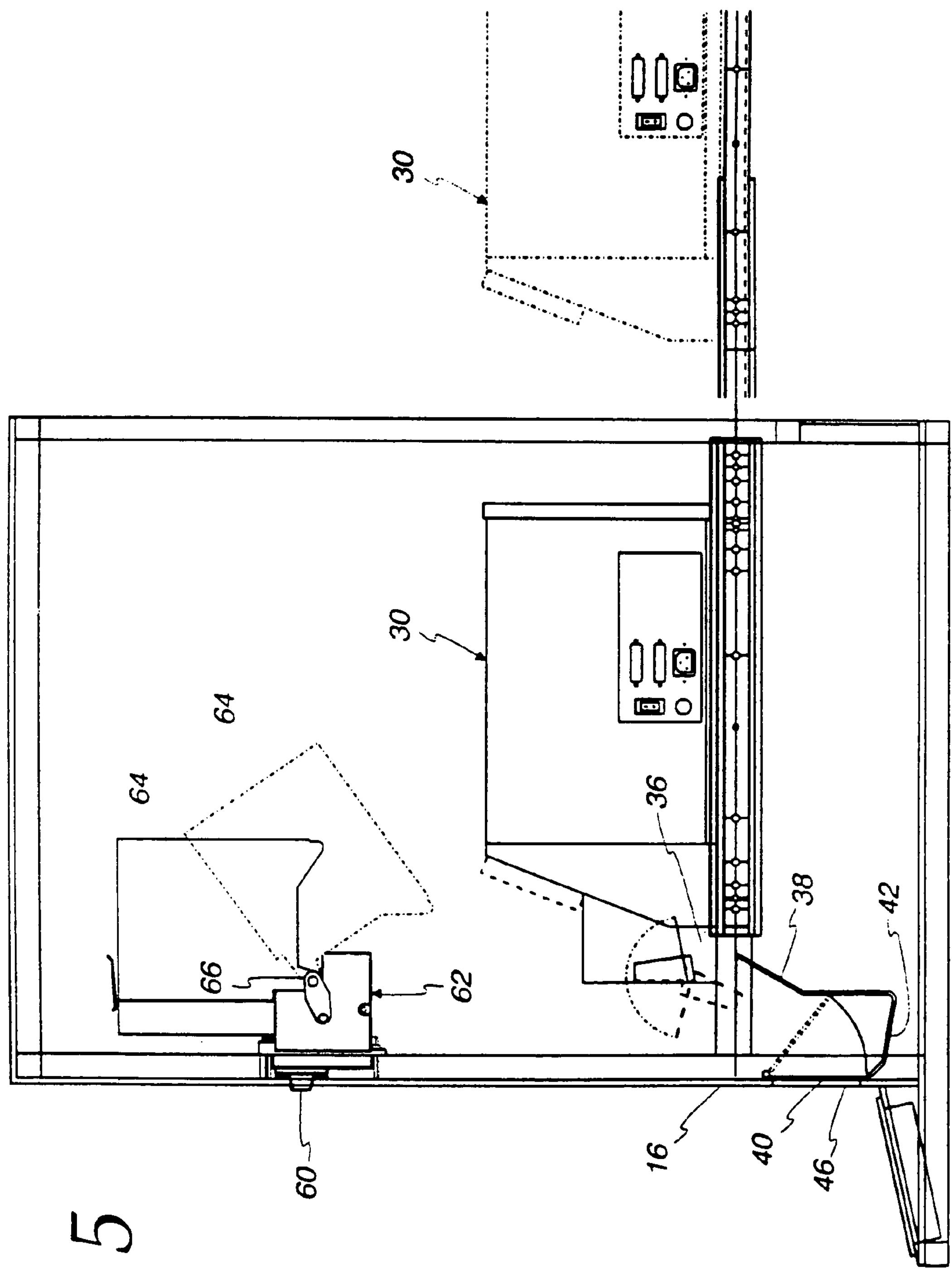
FIG. 5 is a right side view of the right section shown in FIG. 1.
Figure 6:
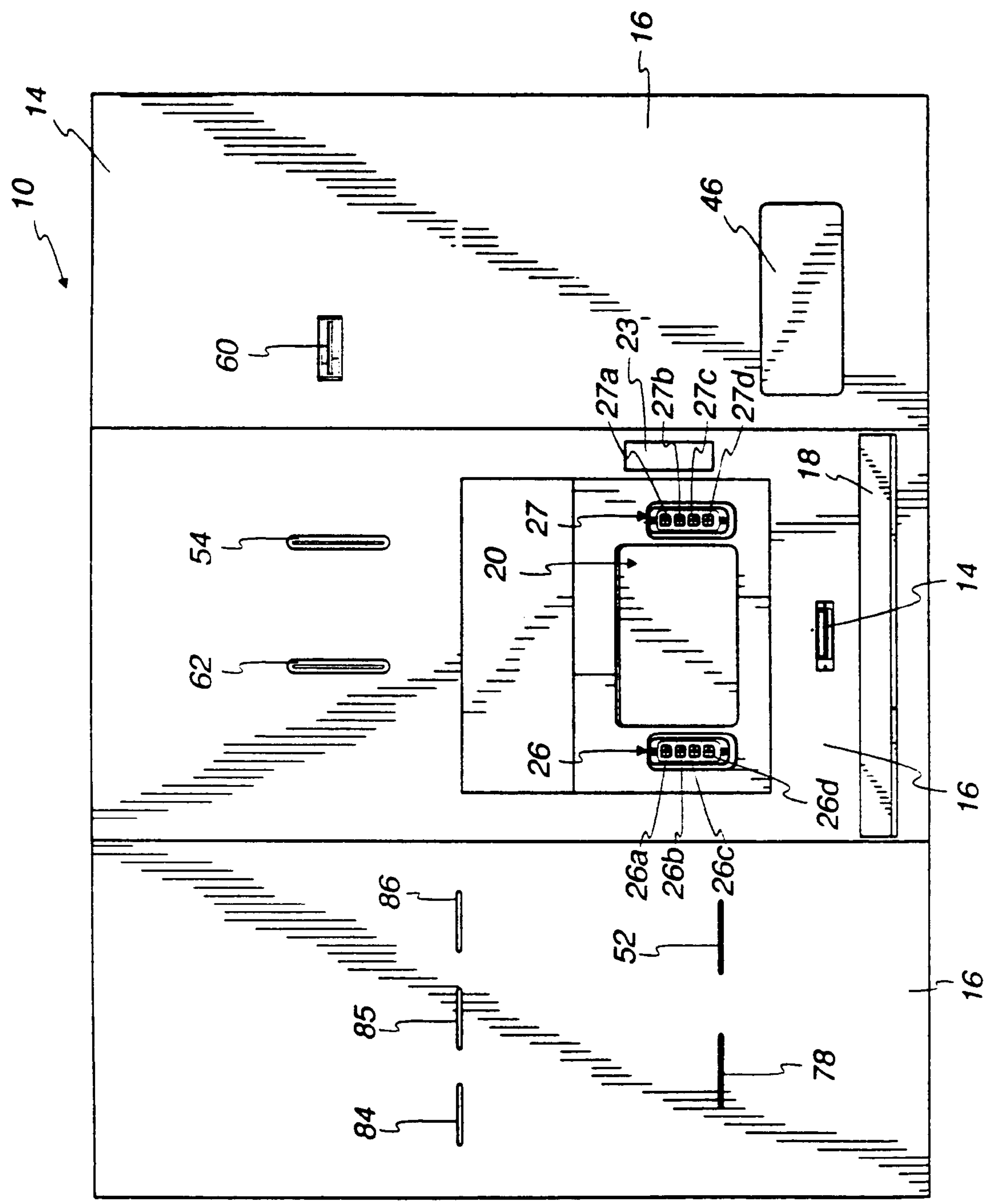
FIG. 6 is a enlarged view of the front of the apparatus of FIG. 1 showing the various insertion slots or receiving slots on the apparatus of FIG. 1 with identifying indicia thereon.

The illustrated and preferred cash dispenser 30, as shown in FIG. 5, is mounted for sliding horizontally to the right for reloading, and is slid back into the position shown in FIG. 5 where it is supported on slide tracks 32 mounted on the housing 12. The cash being dispensed drops through a chute 36 into a hopper 38 having a pivoted axis door 40. The pivoted access door 40 allows the dispensed cash to drop into a dispensed cash bin 42. As shown in FIG. 6, in order to withdraw dispensed cash the user will reach through a cash bin window 46 in the front housing wall 16 and remove the cash from the bin 42. As shown in FIG. 7A, access to the interior of the housing 12 and to the cash dispenser 30 for the replenishing the cash is through a rear housing door 44. The rear housing door 44 has a double security lock 47*a* and 47*b* and a handle 48. With the rear housing door 44 open, the cash bins can be accessed and slid along the tracks 32. The double security lock 47*a* and 47*b* provides security for the cash sections in the normal manner of an ATM.

Figure 12:
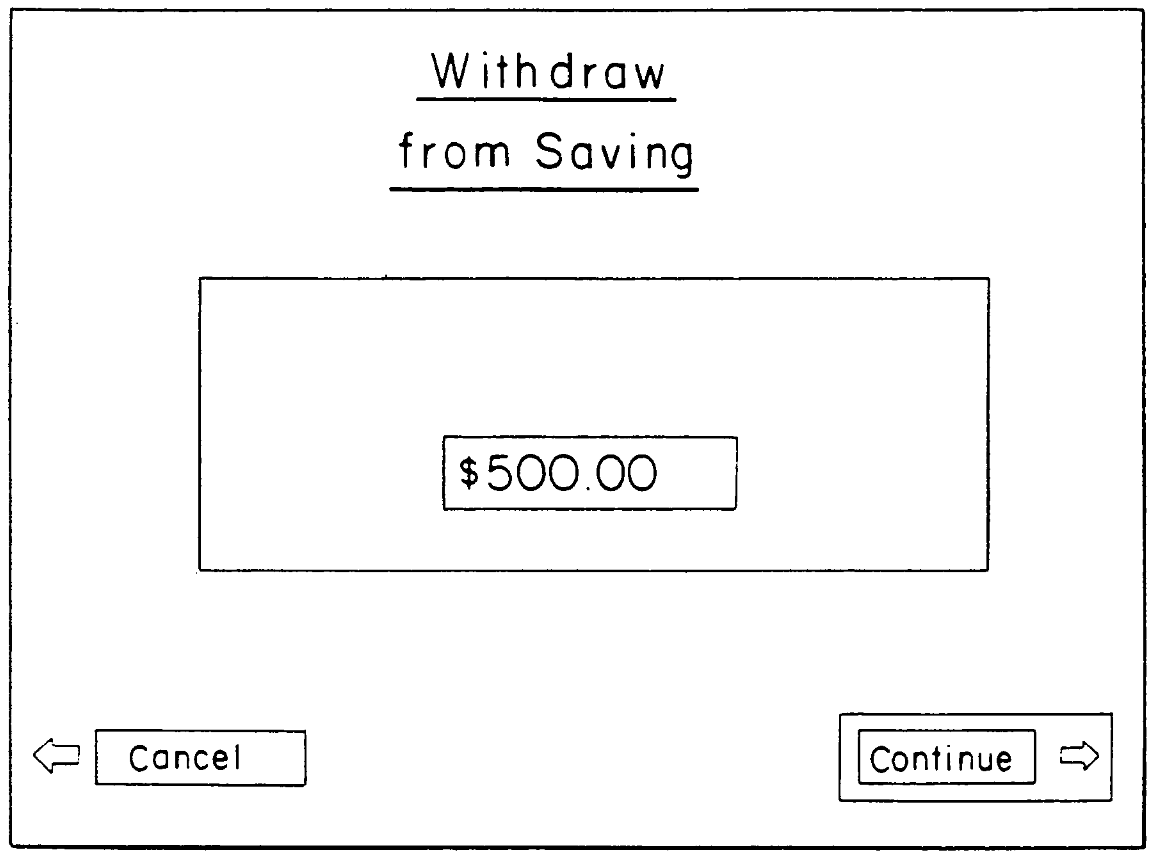
FIG. 12 is a view showing the screen of having an amount prompt for a withdrawing from saving transaction.

If the user had chosen the "SAVINGS ACCOUNT" on the display 20 for withdrawal transaction (shown in FIG. 10), she would have pressed the arrow key 26*b* opposite the "SAVINGS ACCOUNT" prompt on the screen display 20. As shown in FIG. 10, the display 20 would then show the withdrawal from savings screen having the prompt "WITHDRAW FROM SAVINGS." The user is requested to enter the amount in $5.00 increments of the amount to be withdrawn. In this instance, the user operates the keyboard 18 to type in $500.00, the amount to be withdrawn from savings. In such event, the withdraw screen under the control of the microcomputer 21 executing the steps of the flow chart shown in FIG. 12 used to perform the withdrawal from savings by the modem through the banking network, and the cash dispenser 30 is then operated to dispense the cash into the cash bin 42 for removal by the user.

Figure 1:
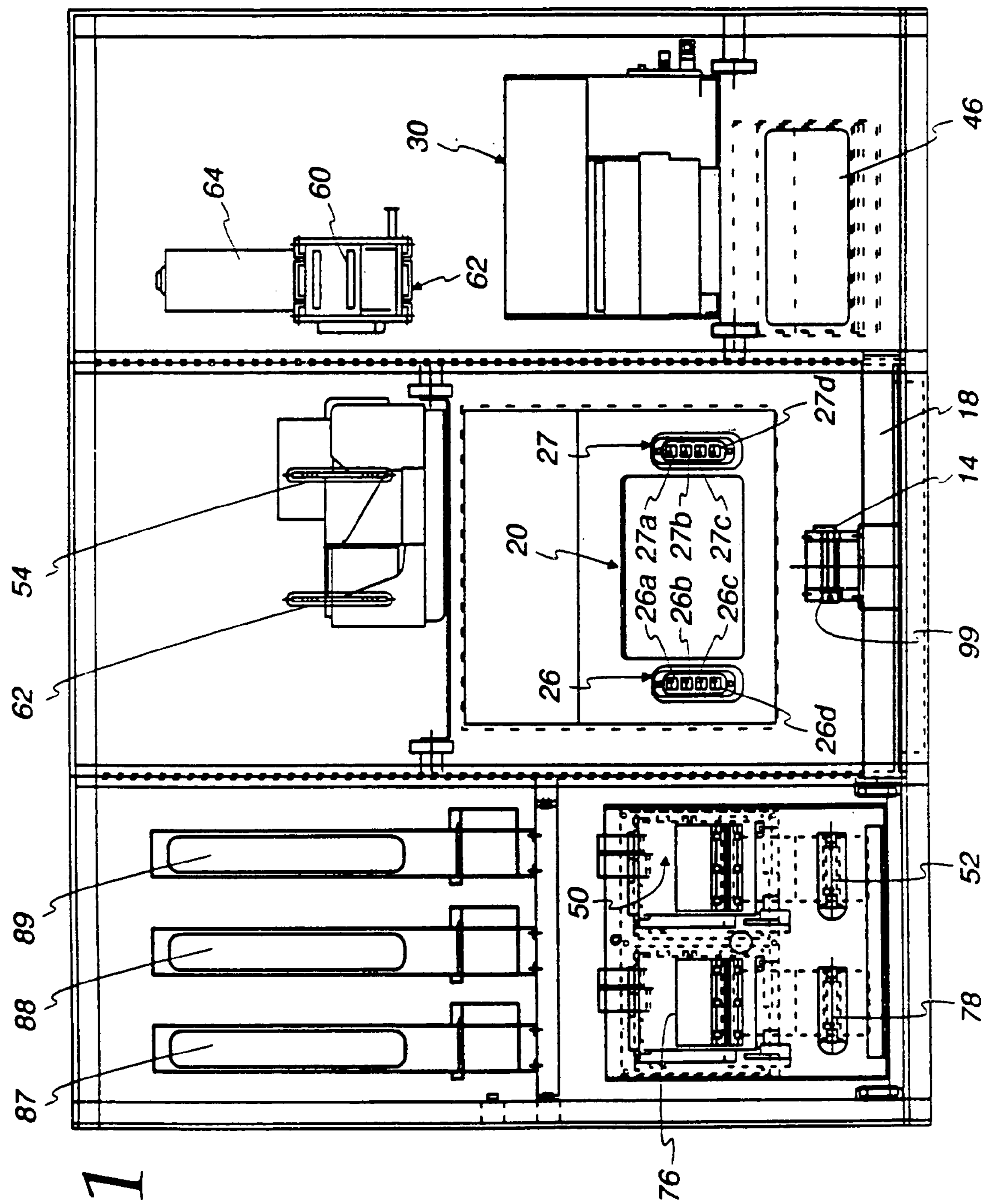
FIG. 1 is a front view of an apparatus embodying the invention including a left section, a central section, and a right section.

For either a withdrawal from savings or a withdrawal from checking, it is preferred to print out a receipt with a receipt printer 50 shown in FIGS. 1 and 3. The receipt printer 50 is connected to the computer 21 through a parallel communication device 51. The receipt printer 50 dispenses a printed paper receipt which is fed therefrom and is issued, in this instance, from a receipt dispensing slot 52 in the front wall 16 of the housing 12. The user will then receive the receipt which shows not only the amount being withdrawn but also the transaction fee. Thus, the total withdrawn from checking or savings for the transaction will include not only the cash dispensed but also the transaction fee, i.e., $1.00 per transaction.

The illustrated receipt printer 50 is preferably a Model MP342F, manufactured by Star Micronics America, Inc. of Piscataway, N.J. The receipt printer 50 has an automatic cutter for cutting the receipt after printing. Manifestly, other printers or receipt generators may be used than the model described herein.

Figure 9A:
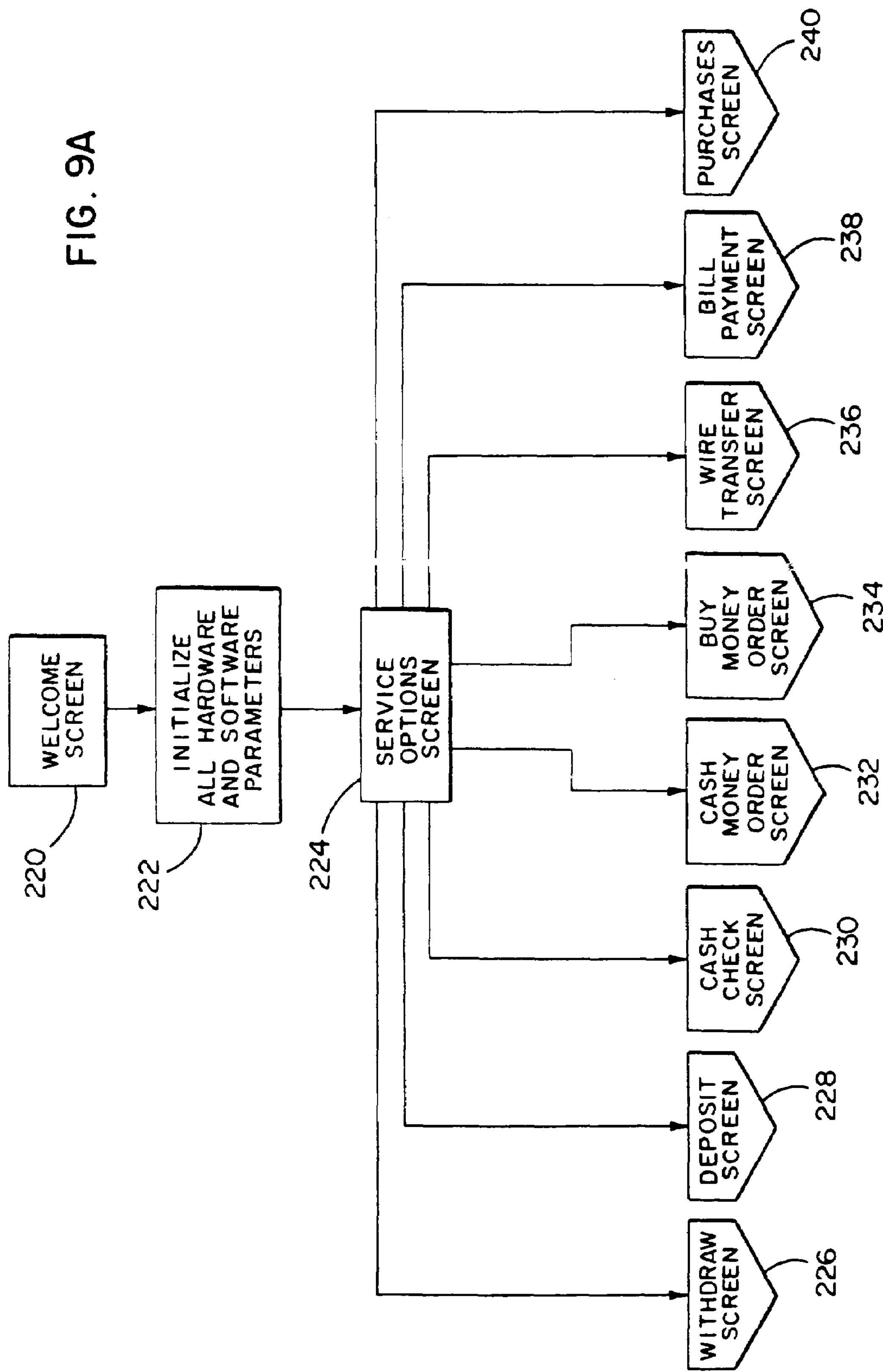
FIG. 9A is a flow chart which shows the initial welcoming and the various options available to the user.

The welcome screen is displayed in a step 220, as shown in FIG. 9A. In a step 222 all hardware and software parameters are initialized. In a step 224 the service options screen is displayed, allowing a choice to enter. The withdrawal screen 226, the deposit screen 228, the check cashing screen 230, the cashing of money order screen 232, buy money order screen 234, the wire transfer screen 236, the bill payment screen 238 or a make purchase screen 240.

Figure 13:
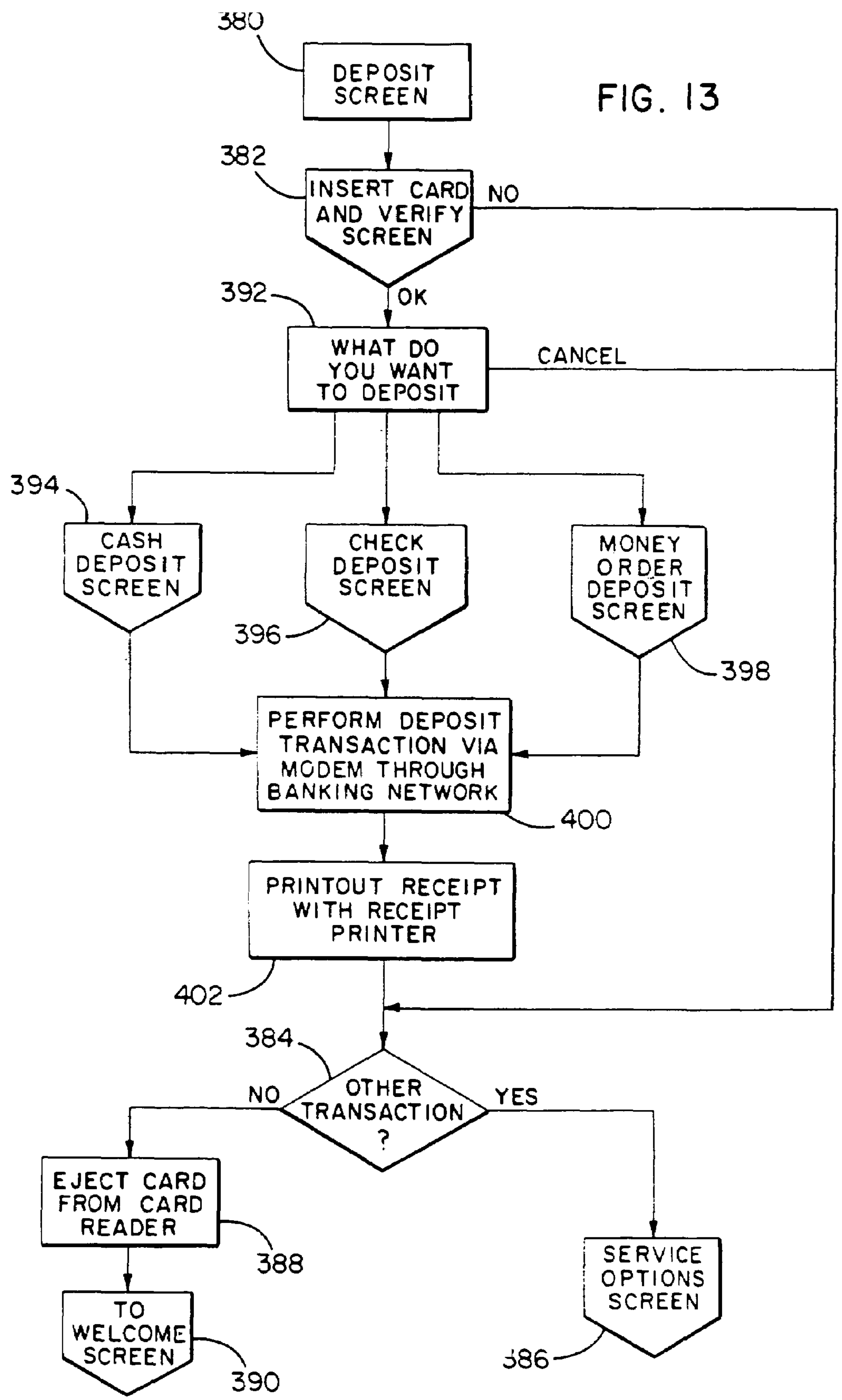
FIG. 13 is a flow chart with respect to making a deposit.

Assuming now that the user had selected the deposit #2 option as shown in FIG. 9, and wanted to deposit into the checking or savings account, the user would have pressed the arrow key 26*b* of the keypad 26, which is opposite "DEPOSIT." This action results in a request whether to deposit into a checking account or into a savings account. Assuming the deposit is to be made into the checking account, the flow chart of FIG. 13 shows the steps performed by apparatus 10 which will be described in greater detail hereinafter.

The deposit screen, which is displayed in a step 380, requests insertion of the card and displays a verify screen in a step 382. If the card is not inserted control is transferred to a step 384 testing for whether any other transaction is to be carried out. If it is, in a step 386 the service option screen is displayed. If not, in a step 388 the card is ejected and the welcome screen is displayed in a step 390. In the event that the card has been verified a prompt is made to the user in the step 392 as to the type of deposit. If the user elects to cancel the transaction, control is transferred to the step 384. If the user selects "Cash", a cash deposit screen is displayed in a step 394. If they select "Checking", a check deposit screen is displayed in a step 396 and if they choose "Money Order," a money order deposit screen is displayed in a step 398. Control is then transferred to a step 400, causing the selected transaction to be performed by the modem 29 through the banking network. In a step 402 the receipt is printed out and control is then transferred to the other transaction test step 384.

Figures 13A, 13B:
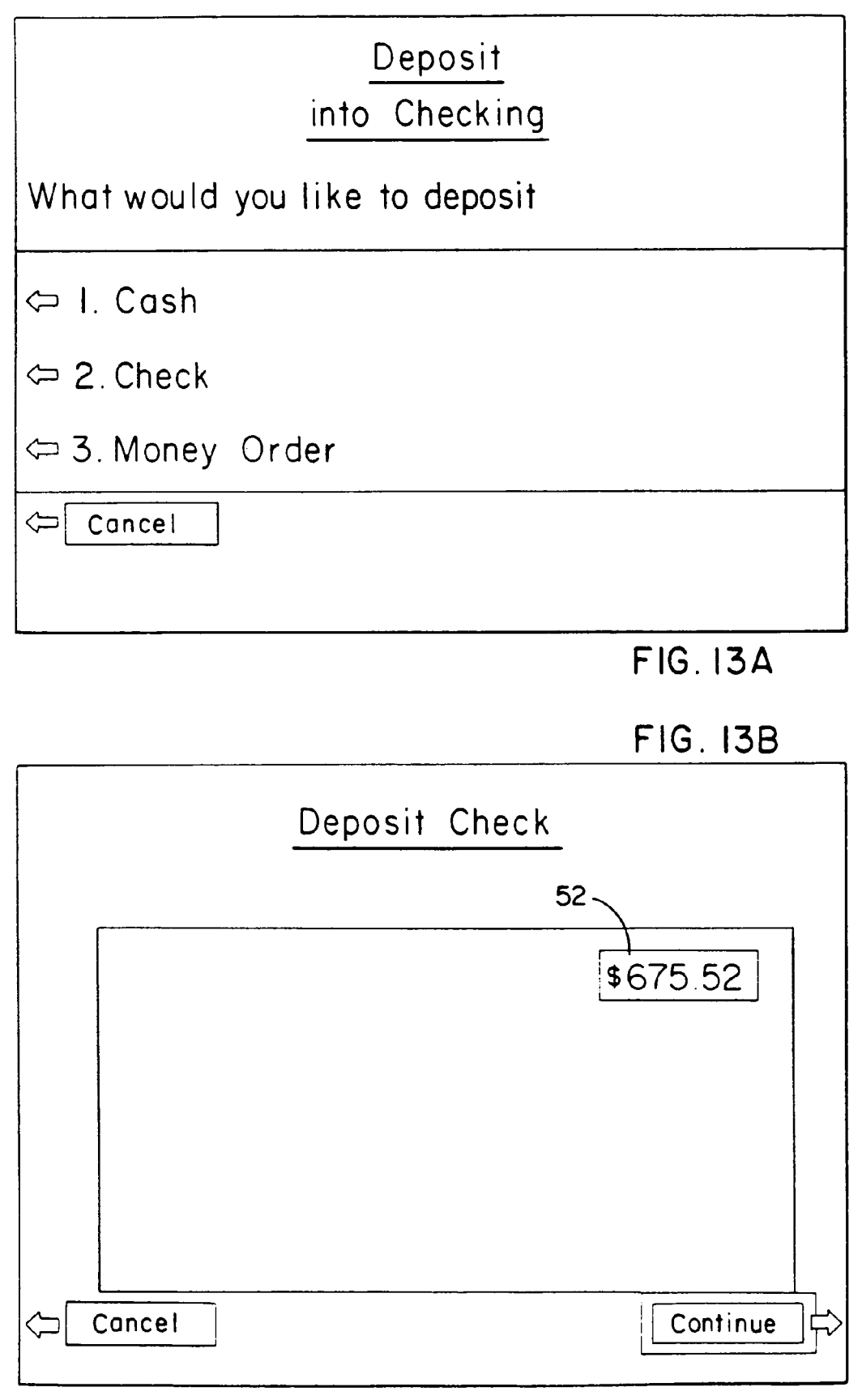

The deposit into checking screen display (FIG. 13A) prompts the user with the statement: "WHAT WOULD YOU LIKE TO DEPOSIT IN YOUR CHECKING ACCOUNT 1) cash; 2) check; or 3) money order". Assuming that the user has elected to deposit a check, the check transaction will be selected by pressing the arrow key 26*b* of the keypad 26. As shown in FIG. 13B, a request then will appear on the screen display 20 labeled "DEPOSIT CHECK" opposite a window 52 for the amount of the check. In the window 52, the operator will then use the keyboard 18 to enter the deposit amount of $675.52. In this instance, a service charge in the amount of $1.00 will also be displayed, as shown in FIG. 13B to the user. If the user has not endorsed the check, the user will see, upon entering the amount, will be that shown in FIG. 13C, which will request the user to "sign the back of the check", and "when ready to insert the check into a scanner slot".

Figure 2:
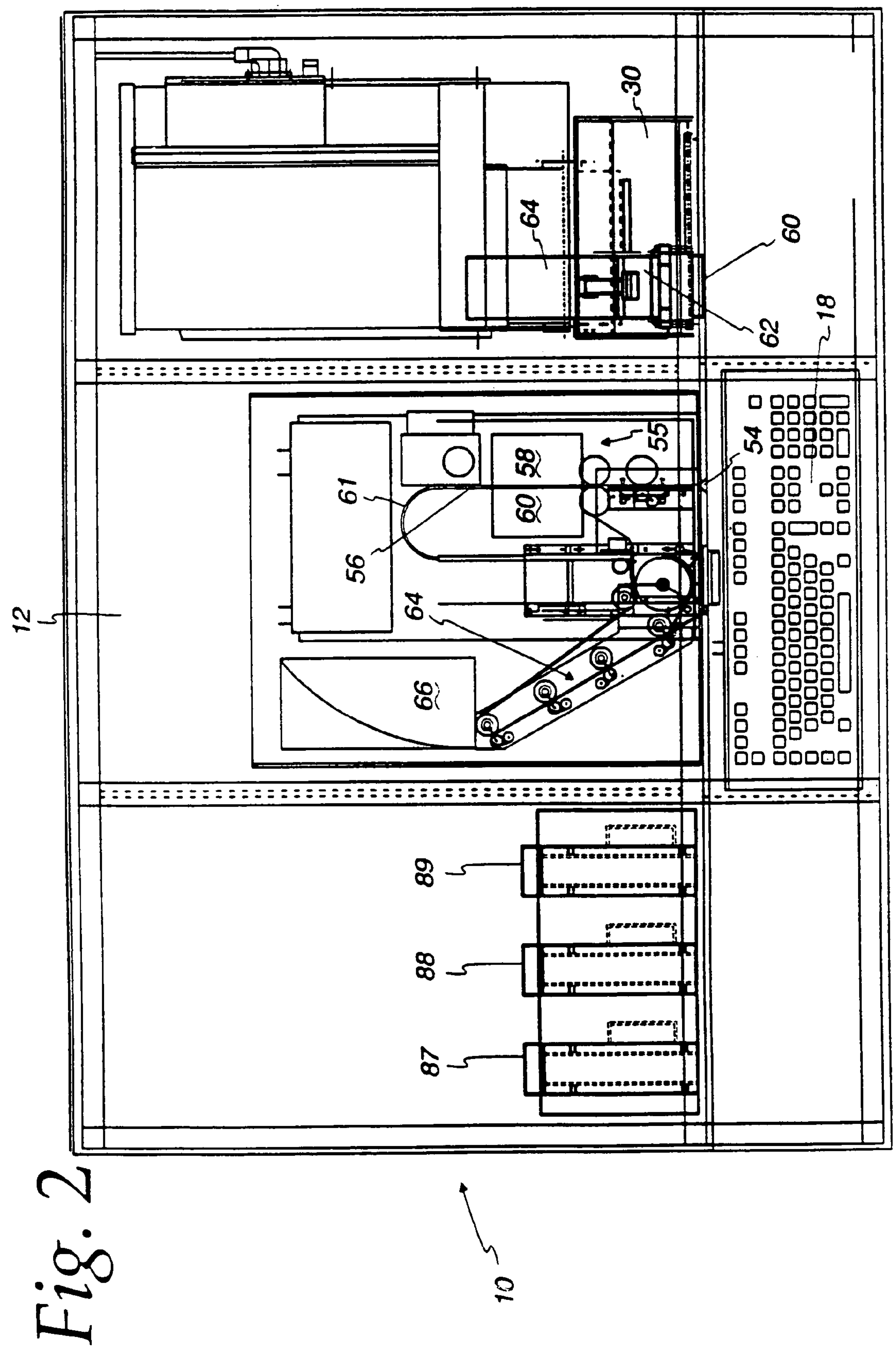
FIG. 2 is a top plan view of the three sections of the machine shown in FIG. 1.

A scanner slot 54 is located above the user display 20, as shown in FIGS. 1 and 6. In this instance, the check will be inserted vertically. The illustrated scanner slot 54 is approximately 4"×9", and the inserted check will be scanned while it is in this vertical position, as will be described hereinafter. As the check enters the scanner slot 54, it is gripped by feed rollers and moved along a feeding track 56 (FIG. 2). The check feeds directly into and stops at an imaging station 55 where the check is scanned or images of the front and the back sides of the check are captured. A scanning and confirm flow chart is shown at FIG. 14. It will be described in greater detail hereinafter with respect to the software control and operations of the machine. As shown in this flow chart, an optical character recognition (OCR) scanner scans the document. A magnetic ink (MICR) reader reads the magnetic ink data on the check, which will include the bank's identification number as well as the user's checking account number with the bank.

Also, while the check is in this stopped position, its legal line (LAR) will be scanned, and the CAR line will be scanned to verify that the check is for the correct amount, in this instance $675.52. Also, while in the vertical stopped position, it is preferred to have a camera unit 58 and 60 (FIG. 2) disposed on opposite sides to capture images of both sides of the check and connected through a SCSI device 59 to the computer 21. The images are stored on a magnetic recording medium in TIFF format and are provided with a tag so that the image file, as shown in FIG. 14, can be later accessed if so desired.

At the beginning of the scanning operation, the check image is processed to ascertain if the check has been inserted correctly. In the scanning operation 420 the document is inserted in the scanner slot in a step 422. The scanner using the camera 58 and 60 scans both sides of the documents and reads the magnetic ink via a magnetic transducer in a step 424. The document is placed in the holding area in a step 426 and a determination is made in a step 428 as to whether the document is a check or money order on the basis of the presence or absence of the magnetic ink data. A check is also made in a step 430 to determine whether the document is inserted correctly. If it is not, the document is ejected from the document slot 54 in a step 432 and the touch screen 20 displays if the document is inserted incorrectly in a step 434 following which control is transferred back to the step 422.

Figure 25:
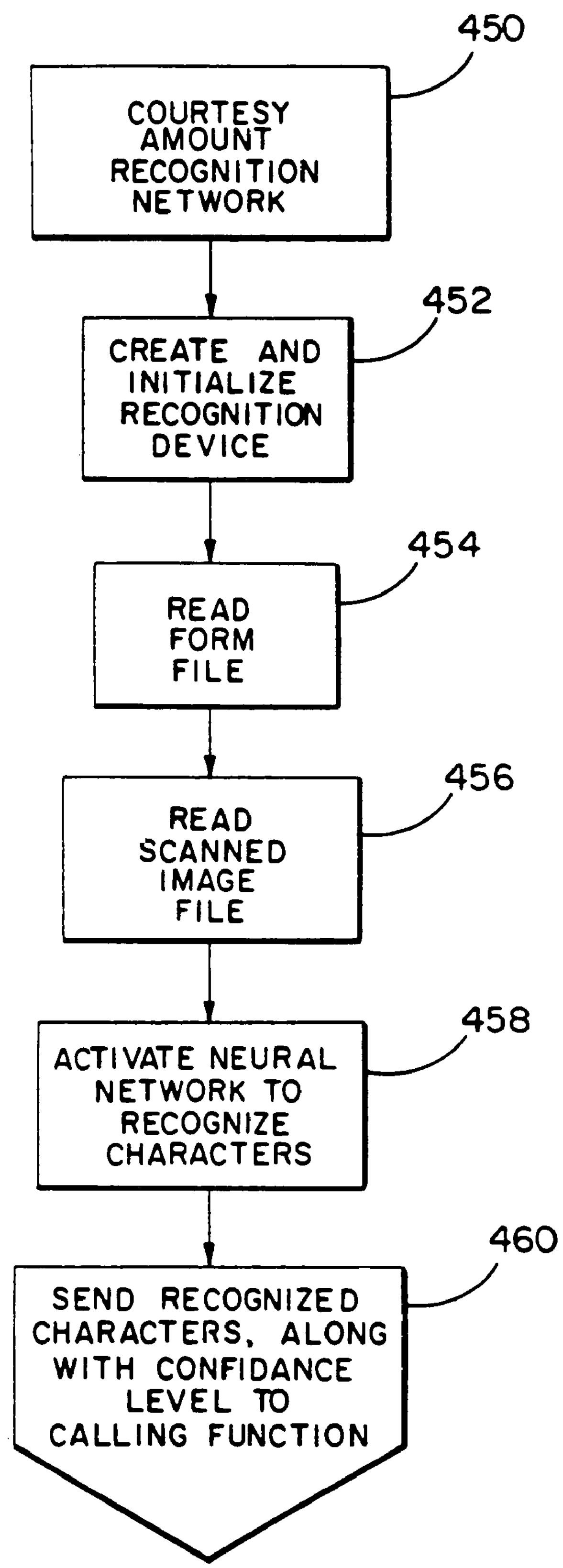
FIG. 25 is a flow chart of a signature verification and character recognition process.

If the document is not a check or money order as determined in a step 428, control is transferred to a step 440 causing both sides of the document to be saved in a tagged image file format. If the document was inserted correctly as tested for in step 430, both sides of the document are saved in a step 440. In a step 442, the images are analyzed by amount recognition software of the types supplied by Mitek of San Diego, Calif., in particular its Quickstrokes Version 2.5 software. Control is transferred to that software from step 442 and as may best be seen in FIG. 25, in a step 450 the software is run. In a step 452, the software recognition device is created and initialized. The form files are read in a step 454, which form files include the positions where the courtesy amount recognition (CAR) and where the signature is likely stored in the fields within the document. In a step 456 the scanned image file is read and in a step 458 the neural network contained within the Quickstrokes software recognizes the characters written in the signature line as well as the characters written in the courtesy amount recognition (CAR) space and in the amount recognition (LAR) line. The recognized characters are then evaluated from the standpoint of a confidence level in a step 460, and character strings representative of those characters are returned to the software set forth in FIG. 14 for further evaluation. Referring now to FIG. 14 in a step 470, the strings representing the signature verification as well as the amount on the document are forwarded to the bank network by the modem 29 for confirmation for payout. If there is no confirmation control is transferred to a step. 472 causing the document to be ejected from the document slot and in a step 424 a document rejection message is displayed. In a step 476 the current transaction is denied. In the event that the documents are confirmed in a step 470, the check or money order is stacked in an accepted documents bin in a step 478 and confirmation of the current transaction is sent to the banking network in a step 480.

If the images are not stored, the check is carried around the U-shaped feed path 61 back to an eject slot 61*a* in the housing wall 14 for retrieval by the user. The eject slot 61*a* is parallel with and to the left of the insert slot 54. Assuming that the check has been re-inserted correctly and images of both the front and back have been captured, then the check is sent to an escrow or holding area 64 in the check feed track. The holding area 64 communicates through the serial communication device 21*a* with the computer 21, as shown in FIG. 24.

Figure 4:
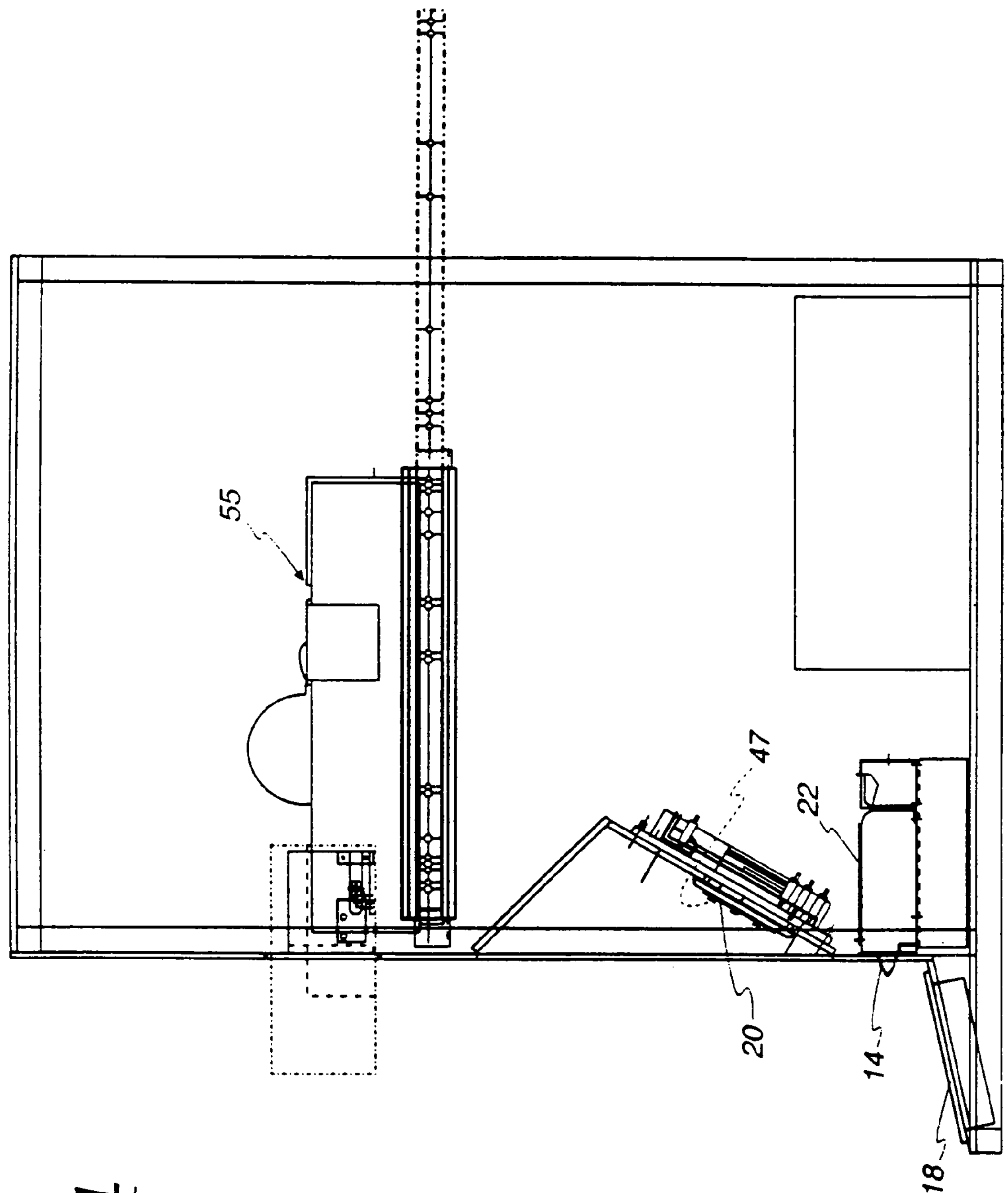
FIG. 4 is a right side view of the central section of the apparatus of FIG. 1.

As best seen in FIG. 4 at the escrow area 64, the check is held for either depositing into a store bin 66 if the check has been qualified and accepted, or the check depositing transaction, the check will be fed from the escrow area back to the eject slot 61*a* for removal by the user if failure to verify the signature causes the check to be rejected for deposit. Assuming that the banking network has been connected by the modem 29 to other portions of the apparatus 10 and that the check has been verified, the amount deposited is sent over the banking network to the identified bank and identified account of the user for deposit. The receipt printer 50 is then operated to provide a written receipt to the user showing the amount deposited minus the transaction charge of $1.00.

Figure 2A:
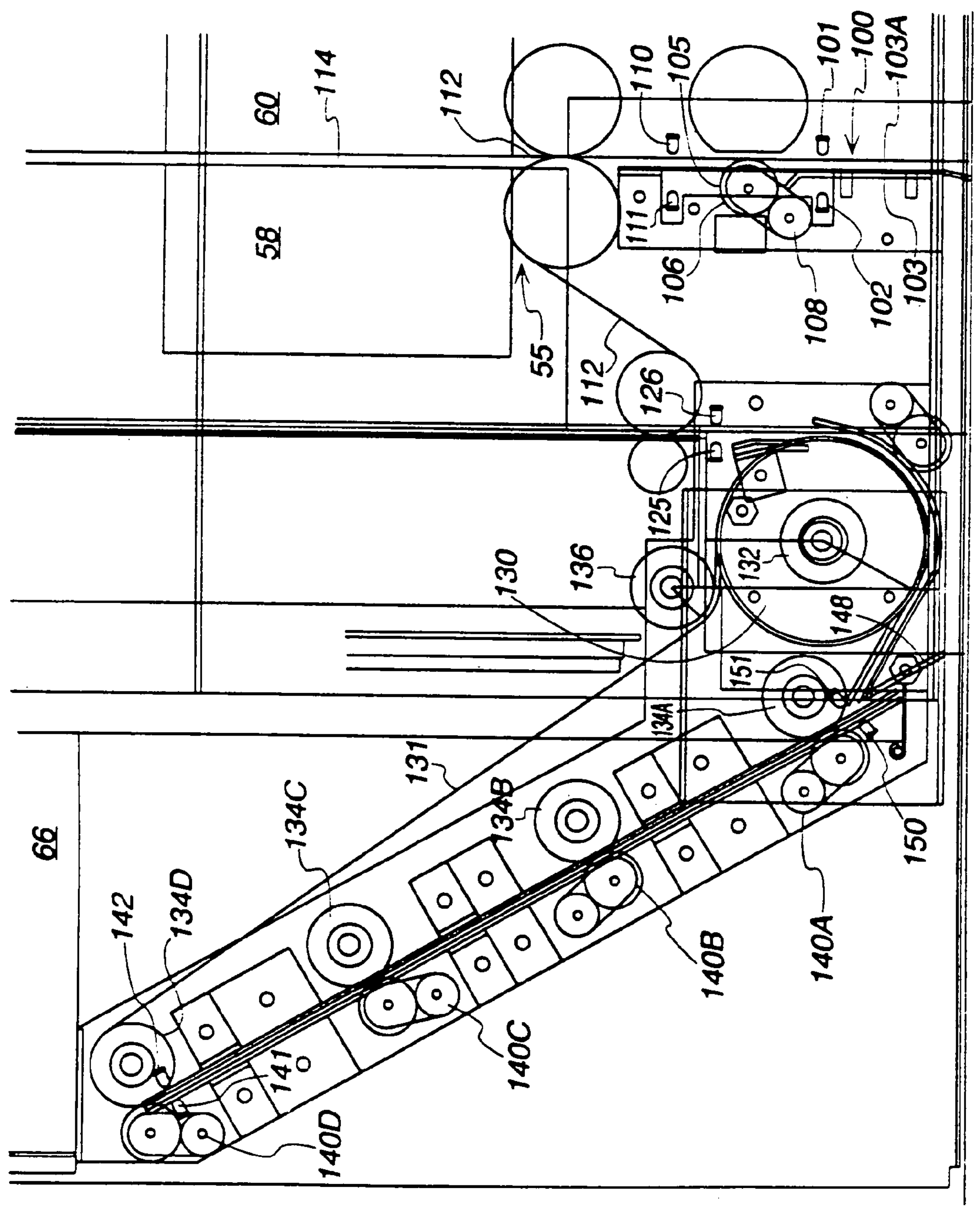
FIGS. 2A and 2B are views of an imaging station for scanning a document.
Figure 2B:
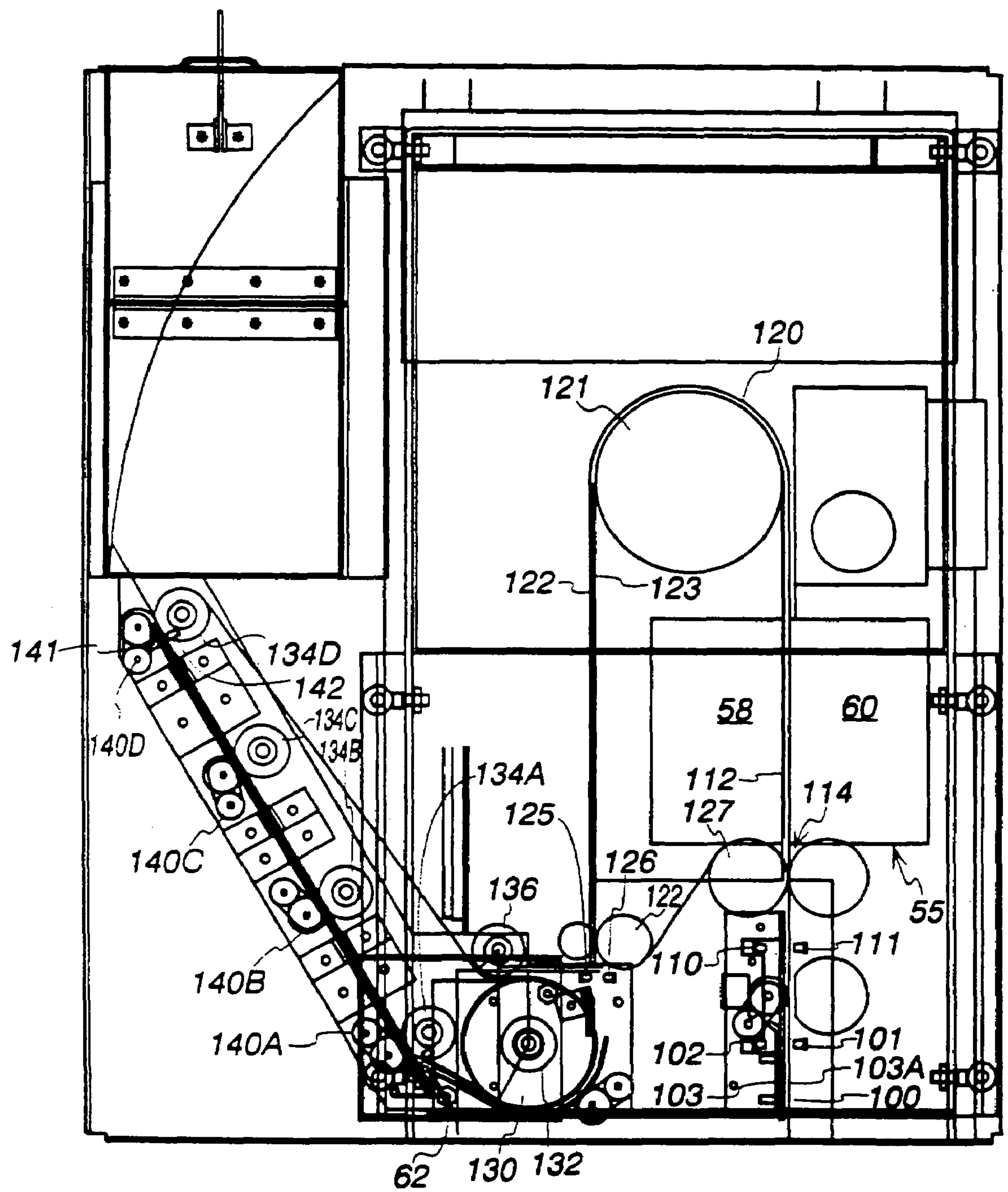

Referring now to FIGS. 2A and 2B, the document handling of a money order or a check will now be described in greater detail. The check is inserted vertically through the scanner slot 54 and passes in front of a pair of first infrared sensors 101 and 102, which sense that the check has been inserted. These sensors are on opposite sides of a guide or feed track 100 which includes a pair of spaced parallel plates 103 and 103*a* extending inwardly to the imaging station 55. Immediately beyond the infrared sensors 101 and 102, which detect the insertion of the document, is a pressure roller 105 to push the check against the plate 103. The check is pushed forwardly past a set of infrared sensors 110 and 112, which will detect when the check is fully inserted into the scanner slot and is gripped by a feeding belt 112 that runs through an entry slot 114 between the image scanners 58 and 60 at the imaging station 54. The feeding belt 112 extends through imaging station to a large diameter roller 121 (FIG. 2B). The check pauses in its travel at the imaging station 54, where the image taking video or other scanners 58 and 60 take images of the front and back of the check. Optical character recognition readers read the magnetic ink recognition characters for the bank and for the customer's account. Electronic signals from the image takers 58 and 60 provide information concerning the signature for the check, the legal line and the amount written thereon, and the CAR line and the amount written thereon, all of which are stored magnetically, in this instance, and provided with tag number for later recapture.

As best seen in FIG. 2B, a U-shaped track 120 is provided around the large diameter roller 121 to guide the check to reverse its direction of travel and to move it into a slot between plates 122 and 123 of the check guide track 100 to a pair of inlet infrared sensors 125 and 126, which sense the check coming into the inlet of the escrow area 64. The feeding belt 112 is a cogged timing belt which carries the checks about the drum 121 and between the plates 122 and 123 to the inlet to the escrow area. The cogged feeding belt is driven by a stepper motor and travels about guide rollers 127.

At the escrow or holding area 64, there is provided a large belt driving drum 130 which drives a cogged feeding belt 131 for conveying the check first upwardly and to the left into the holding area and from the latter into the deposit bin 66 above the holding area 64. If the check is to be rejected, the feeding belt 131 reverses its direction of travel to eject the check through the eject slot 62. The driving roller 130 includes a stepper motor 132, which is mounted on the top of the roller 130. The stepper motor 132 is reversible in its rotation for rotating a drum 130 and the feeding belt 131 in opposite directions and through a controlled distance.

Infrared sensors 125 and 126 sense the passage of the check from the imaging station 55 into the escrow area 64. The feeding belt 131 is guided along and travels past a series of guide rollers 134*a*, 134*b*, 134*c* and 134*d* to the top of the holding area. The endless timing belt 131 turns about the top guide roller 134*d* and travels downwardly and to the right past a roller 136 to return to a side of the drum 130, as seen in FIG. 2A.

The check is pushed against the timing belt 131 to travel with the timing belt by four sets of pressure rollers 140*a*, 140*b*, 140*c* and 140*d*. At the top of the holding area is another pair of infrared sensors 141 and 142, which sense the arrival of the upper edge of the check and they signal that the check has been moved completely into the holding area with the lower end of the check being at or above the rollers 140*a* and 134*a* at the bottom of the holding area and aligned with the eject slot 62. Once the check has been accepted, the stepper motor 132 is turned to drive the drum 130 and the feeding belt 131 to cause the check to travel upwardly into the overhead deposit bin 66. On the other hand if the check is rejected as being unacceptable, the feeding belt 131 travels in the opposite downward direction to push the lower edge of the check through the eject slot 62 and return it to the user. A lower end of the guide plate and a spring guide finger 147 guide the outgoing ejected check to slide and travel along a short guide plate 148 to the aligned eject slot 62. Infrared sensors 150 and 151 (FIG. 2A) at the bottom of the holding track sense when the check has been removed from the eject slot by the machine user.

During the deposit transaction, the screen display 20 will show a confirming message, such as shown in FIG. 13D, in the form of a bar that progresses from left to right in window 69 being viewed by the user. As the receipt is generated by receipt printer 50, the screen display 20 (FIG. 13E) will show that $674.52 "WILL BE DEPOSITED INTO YOUR ACCOUNT. PLEASE TAKE THE RECEIPT WITH YOU."

If, rather than depositing the check into a checking account, the user had selected the option to deposit into a savings account, the screen would display the deposit into savings account shown in FIG. 13F. Then, the user would press the arrow key 26*b* for the "CHECK"; and the check would have been deposited in the same manner as described above with respect to a deposit into a checking account. A cash receipt would have been provided to the user, as was the cash receipt generated for the deposit into the checking account.

Figure 13G:
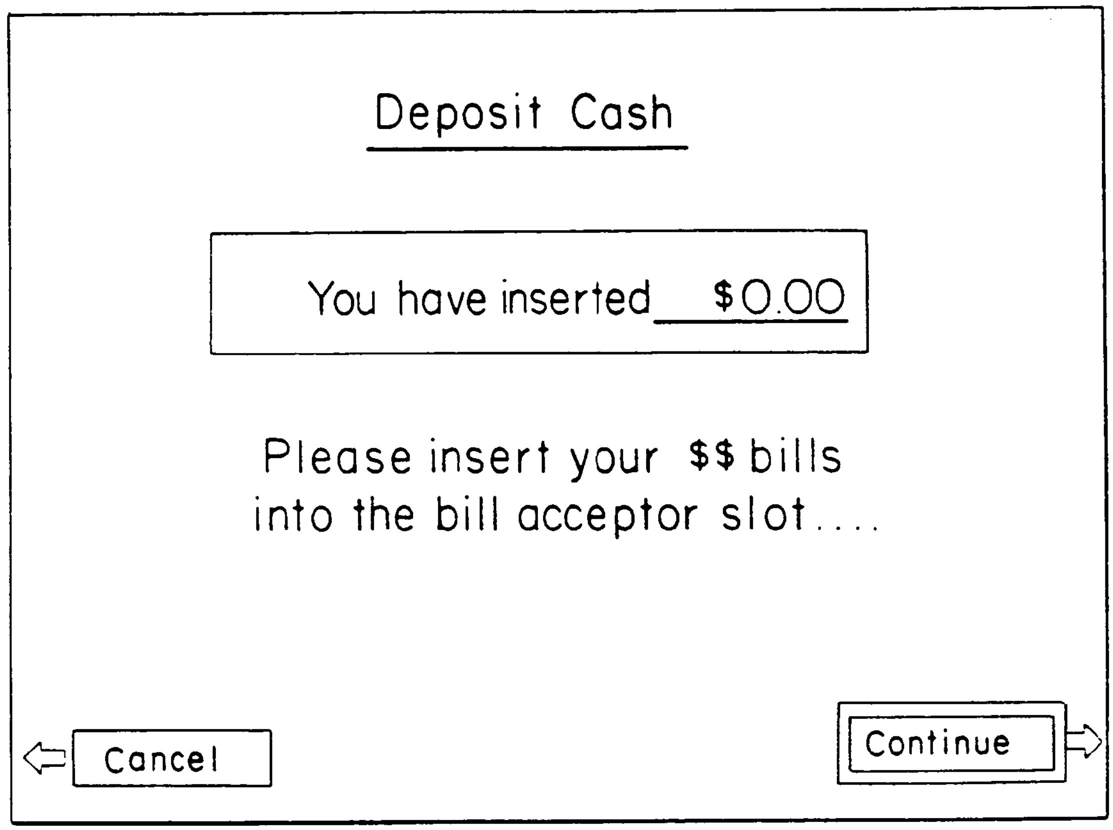
FIG. 13G is a screen requesting the amount of cash to be deposited.
Figure 13H:
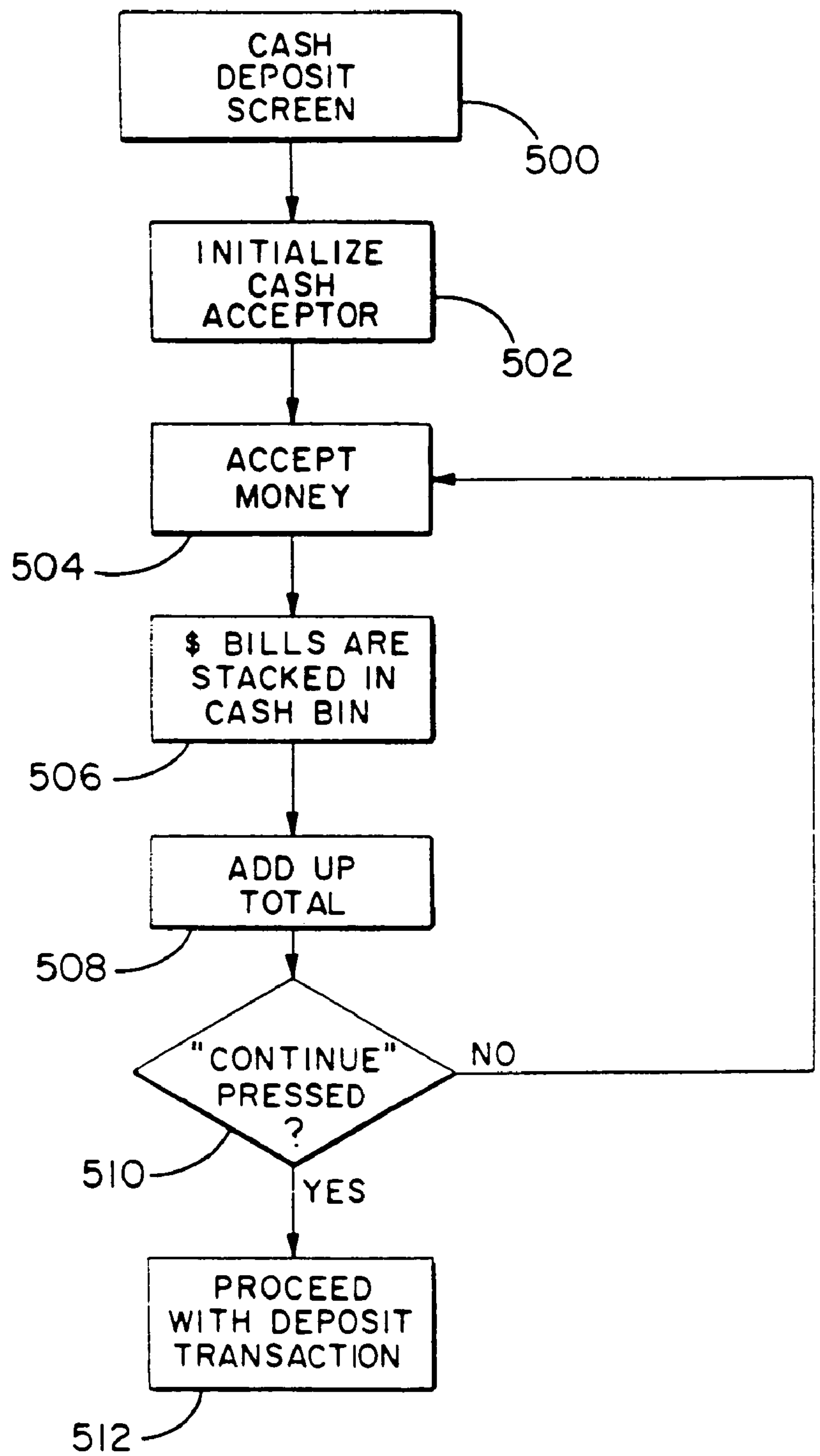
FIG. 13H is a flow chart showing machine operations with respect to a cash deposit.

Assuming that the user had decided to deposit cash into checking and had pushed the #1 cash button 26*a* of the keypad for the display screen of FIG. 13A or had pressed the same button for a cash deposit into savings (FIG. 13F), the processor would follow the steps of the cash deposit flow chart shown in FIG. 13H.

In the cash deposit process 500 as set forth in FIG. 13H a cash acceptor 62 is initialized in a step 502. Currency is inserted in the cash acceptor 62 in a step 504 and is accepted thereby. The bills are read and are transferred to a deposited cash bin in a step 506 and the total of the bills presented added up in a step 508. If the user elects to deposit more bills in the cash deposit in a step 510 control is transferred back to step 504. If not, control is transferred to a step 512 where the deposit transaction is proceeded with.

The user display 20 as shown in FIG. 13G for deposit cash would display the prompt "PLEASE INSERT YOUR BILLS INTO THE ACCEPTOR SLOT 60, WHICH IS SHOWN IN THE RIGHTHAND SECTION ABOVE THE CASH DISPENSER." As may best be seen in FIG. 5, the cash dispenser accepting slot 60 leads into a cash acceptor module 62, which accepts cash, specifically bills in denominations of $1.00, $5.00, $10.00 or $20.00. As shown in FIG. 24, the cash acceptor module 62 is electronically connected to the computer 21 via a resistor network 62*a* having a plurality of current limiting resistors. The resistor network 62*a* is connected to a digital I/O board 62*b*, in this embodiment a National Instruments PC-DIO-96. The digital I/O board 62*b* is coupled to the computer 21. The cash acceptor module 62 counts the deposited bills and has a bin in a hopper 64 to receive the counted bills. The cash acceptor module 62 is pivotally mounted at 66 to be swung to a dotted line position for emptying deposited bills therefrom. The preferred cash acceptor module 62 merely stacks the inserted bills and counts the same. The cash acceptor module 62 is preferably a Mars Electronics?

International Cash Acceptor Model AL4-L1-U1M, which is one of several available cash acceptors. It will not only stack the bills and retain them in the machine 10, but will add up the total amount of cash. The cash flow chart shown in FIG. 13H will be described in greater detail hereinafter in connection with the software and overall control of the machine. The deposit transaction proceeds from the flow chart of FIG. 13H back to the flow chart of FIG. 13 to proceed through the modem and banking methods to make the deposit into the user's checking or savings account. The machine 10 will operate the receipt printer 50 to print a receipt to be dispensed to the user through the receipt slot 52, showing the amount deposited less the transaction fee, which is illustrated as $1.00 in this instance.

Figure 13K:
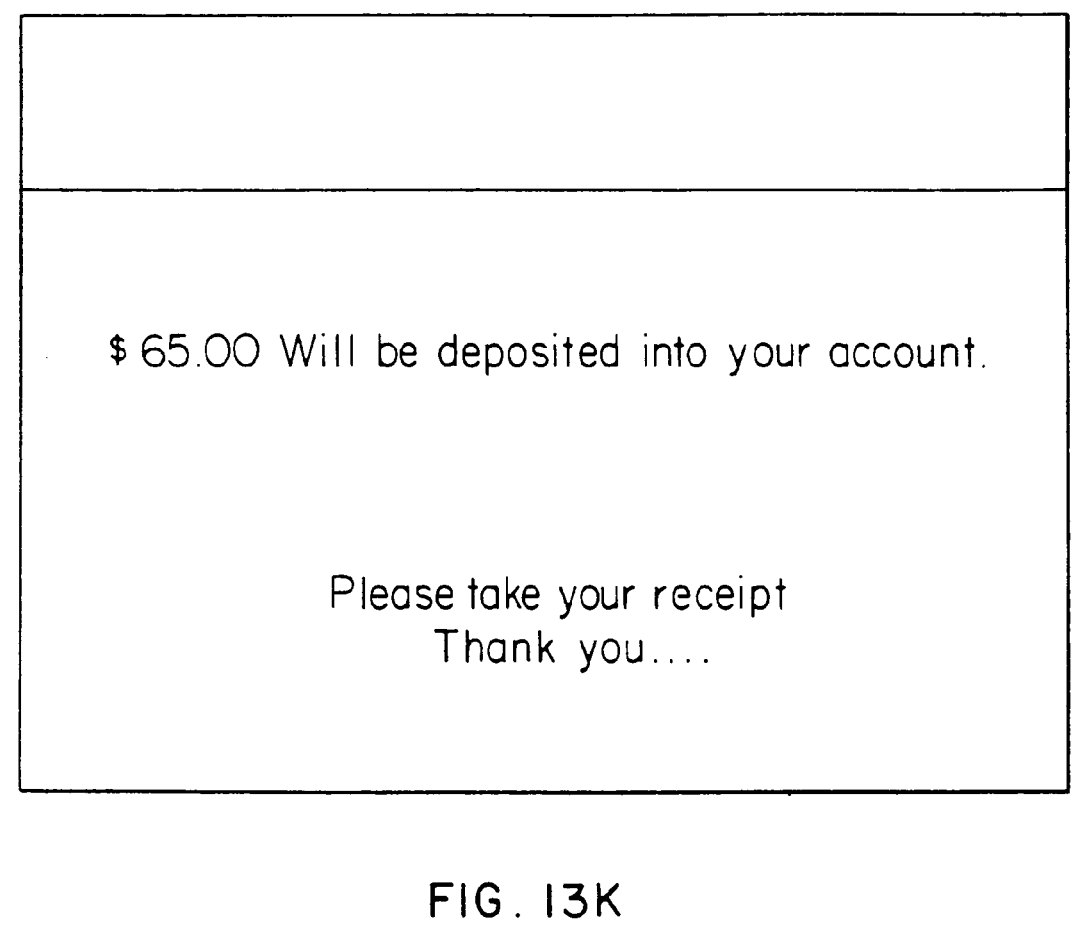

When depositing cash, the illustrated cash acceptor 62 will total the cash received and show this cash being deposited, as shown on the screen 20 which shows that the $20.00 has been deposited after $45.00 more dollars have been deposited, making for a total deposit of $65.00, as shown in FIG. 13J. A receipt will then be printed by the receipt printer 50, and the user will be notified that $65.00 will be deposited in the user's account (FIG. 13K).

Figure 16:
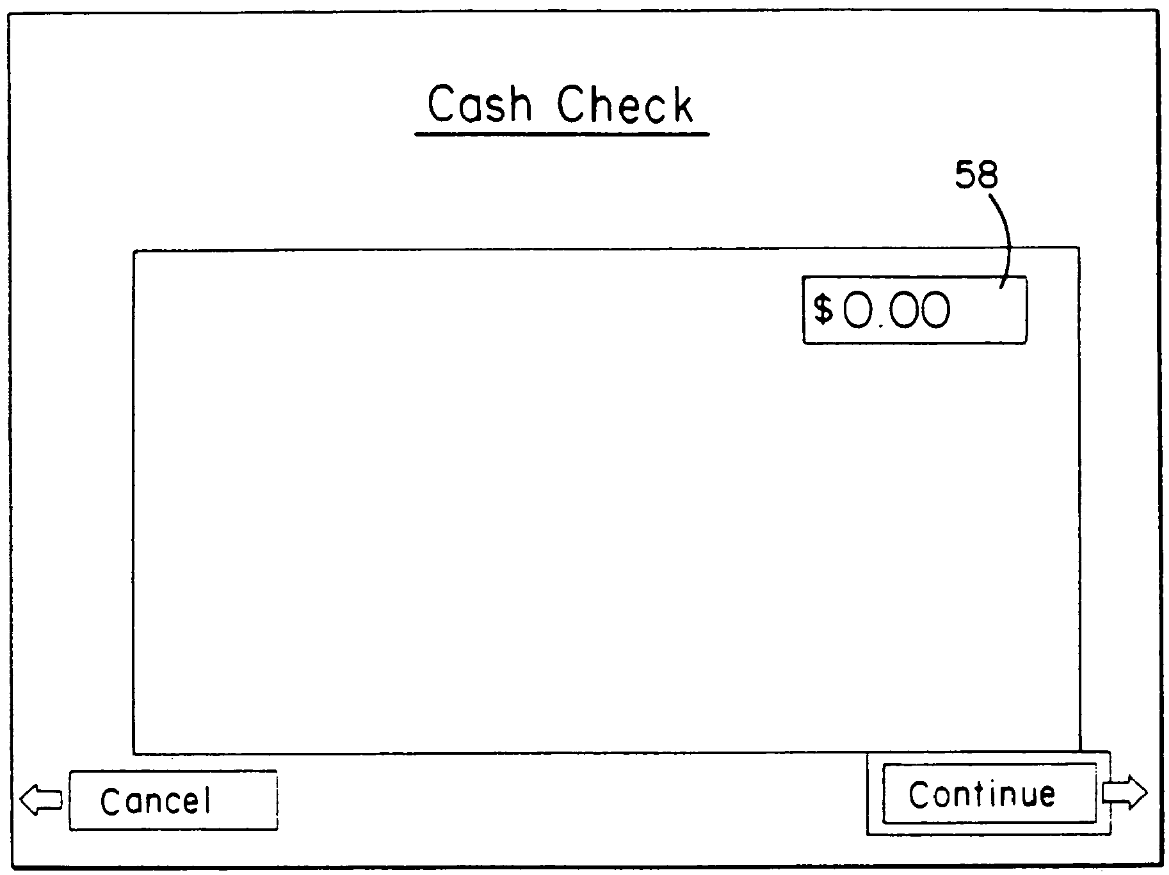
FIG. 16 is a view of the cashing check screen.
Figure 16A:
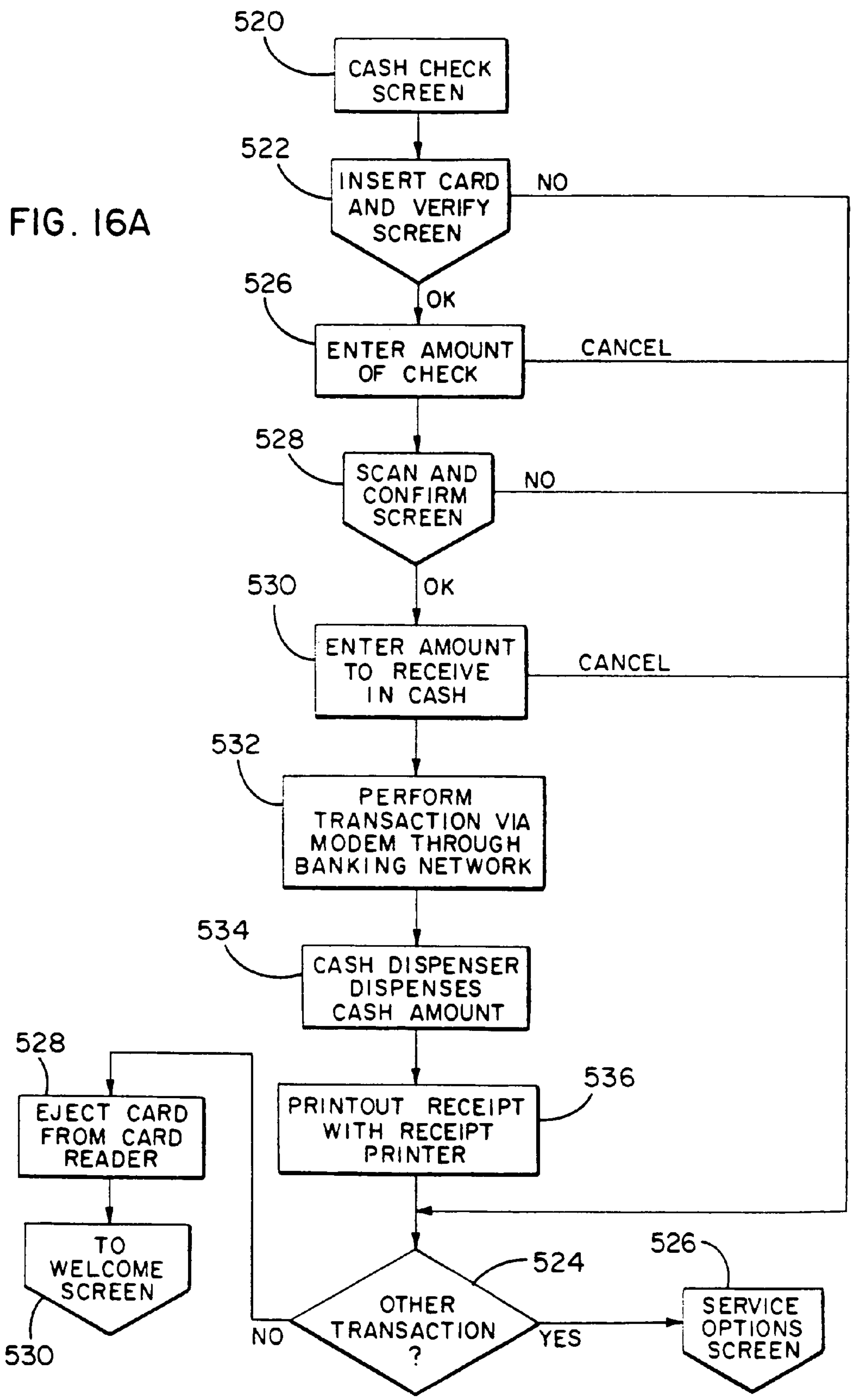
FIG. 16A is a flow chart showing the operations with respect to cashing a check.

Assuming that the user, when prompted by the options screen of FIGS. 3 and 9, has elected to press the arrow key 26*c* to initiate the check cashing transaction, the user display 20 will prompt the user to enter the amount of the check into the window 68 (FIG. 16). The flow chart, with respect to cashing a check, is shown in FIG. 16A.

The cash check process is entered at a point 520 and as a result, the magnetic card reader 22 accepts the magnetic identification card in a step 522 and displays a verify screen. The user can exit the transaction by transferring to a step 524 where he or she is prompted for another transaction. If not, the amount of the check is entered in a step 526 and the check is scanned and confirmed in a step 528 as set forth previously. The user then enters an amount in a step 530 to be received in cash and the banking network is accessed in a step 532 to determine whether their is a balance from which the check may be cashed. If so, in a step 534 the cash dispenser dispenses cash in the cash amount and in a step 536 the receipt is printed by the receipt printer. Control is then transferred to a step 524 and if another transaction is desired, the service option screen is accessed in a step 526. If another transaction is not wanted, control is transferred to a step 528 causing the card to be ejected from the card reader and in a step 530 the welcome screen is displayed.

The user enters through the keyboard 18 the amount, such as $90.00, shown in FIG. 16B, the amount will be scanned and confirmed, and the service charge of $1.00 is shown on the screen display of FIG. 16. The user may select to continue the transaction or to cancel it by pressing the appropriate button of keypads 26 or 27. The touch screen display shown in FIG. 16H allows the user to make the selection by touching the portions of the display labeled either CONTINUE or CANCEL. If the user has not signed the back of the check, the user will be requested to do so (FIG. 16C). If the check was inserted backwards, as it is viewed by the scanner, the check will be returned through the rejected material outlet slot 62. The user will invert the check and insert it now in the correct vertical position into the insert slot 54. From there the check will be carried into the scanning imaging station where cameras 58 and 60 will capture the images of opposite sides of the check. The processor 21 by executing document verification software will then analyze the signature image and compare it with the profile signature of the user. Likewise, the processor, by using the verification software, will also read the cursive legal amount (LAR) line and the written numerical amount at the CAR line, as will be described hereinafter in connection with the document verification software in greater detail.

After re-insertion of the check, the user will be requested to re-enter the amount of $90.00 (FIG. 16D). The check image will again be processed and if the amounts match the keyed-in amount the user display will show an "OK" for the amount (FIG. 16D). During the scanning and the verification operations with communication to the user's account, through the banking modem, the screen will display "OCR" with a movable bar, as shown in FIG. 16E. The next prompt shown on this screen will be to enter the portion of the check amount that the user wants to receive in cash. The cash is selected in $5.00 increments. The machine then informs the user that any remaining amount of the check will be received in cash (FIG. 16F). With reference to the specific example given herein as shown in FIG. 16F, the user's screen display 20 will show that there has been a $90.00 check scan with a service charge of $1.00, leaving a balance of $89.00. The operator will have used the keyboard 18 to enter the request for $40.00 cash, in $5.00 increments, as shown in window 70. As will be explained in greater detail in connection with check cashing flow chart of FIG. 16A, the cash dispenser 30 will then be operated to dispense $40.00 into the cash bin 56, which the user will then remove. As shown in FIG. 16G, the amount of $40.00 will be deposited in the user's account through the banking network; and the receipt printer 50 will print a receipt for the deposit of $40.00.

Figure 17:
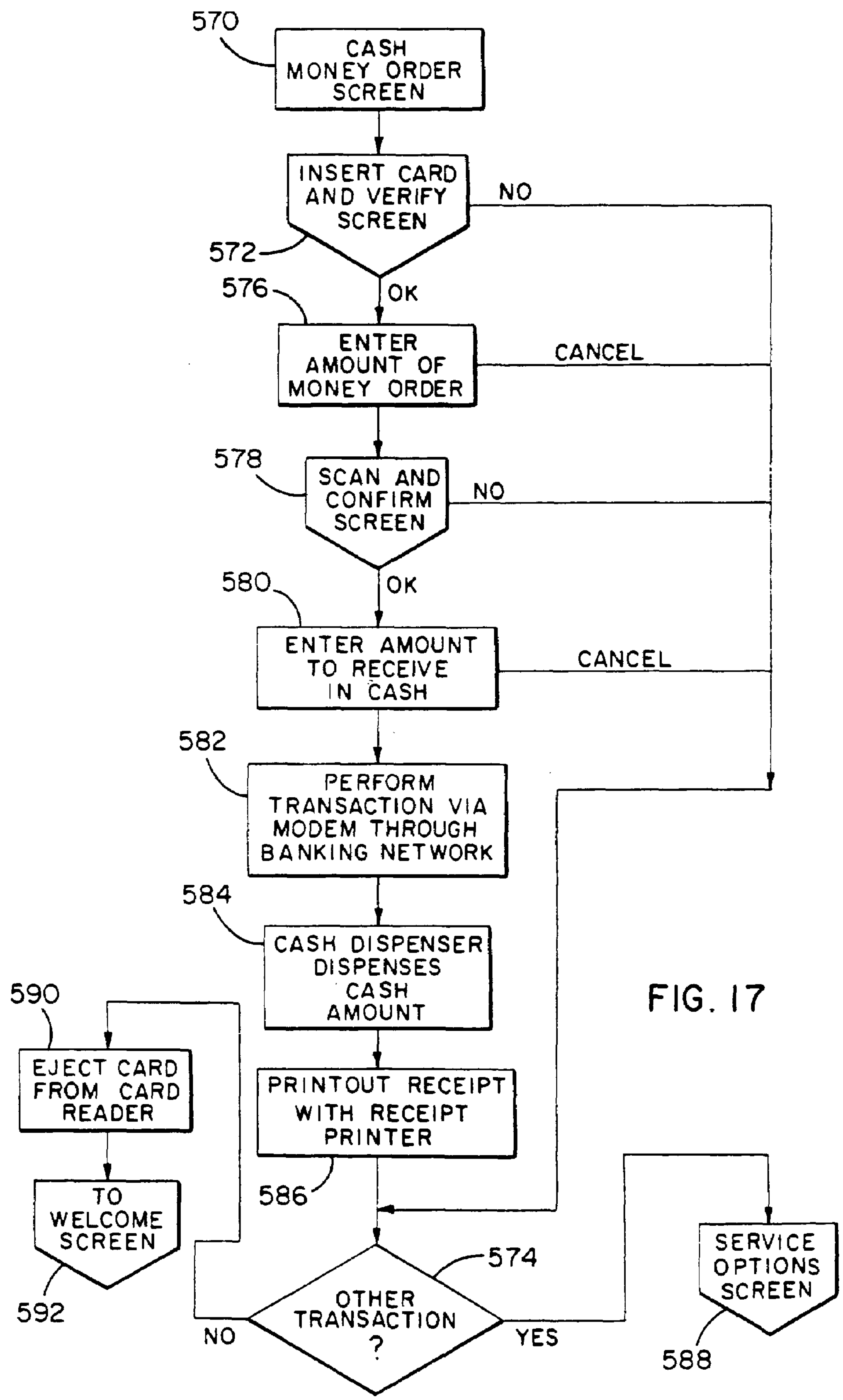
FIG. 17 is a flow chart showing the operations with respect to cashing a money order.

The cashing of the money order is much like cashing a check. It will be described hereinafter in connection with the flow chart shown in FIG. 17, and in connection with the screen of FIG. 17A.

The cash money order process is accessed in a step 570. The magnetic card is prompted to be inserted in a step 522 and a verify screen is raised. If the user decides to exit the transaction, she may so signal and control is transferred to a step 574, testing for whether another transaction is desired. Assuming that the card is verified and that the transaction is to proceed, the amount of the money order to be paid out is entered in a step 576. In a step 578 the money order is inserted and scanned and confirmed, and in a step 580, assuming the confirmation occurs, the user enters the amount for the money order to receive in cash. In a step 580 a query is generated by the modem 29 to the banking network to determine whether the amount of the money order is backed by funds. Assuming that it is, in a step 584 the cash dispenser dispenses the cash amount and a receipt is printed in a step 586. Control is then transferred to the other transaction test step. If another transaction is desired the service option screen is displayed in a step 588. If not the card reader is ejected in a step 590 and the welcome screen is displayed in a step 592.

Assuming that the user, when viewing the options available (FIG. 9), had pressed the arrow 26*d* opposite "cash money order" to institute this transaction, the user is then prompted, as shown in FIG. 17A, to operate the keyboard 18 to enter the amount of the money order, which, in this instance, is $750.00. The screen will also show the transaction service charge of $1.00 and the available amount of $100.00 in cash.

Figure 17C:
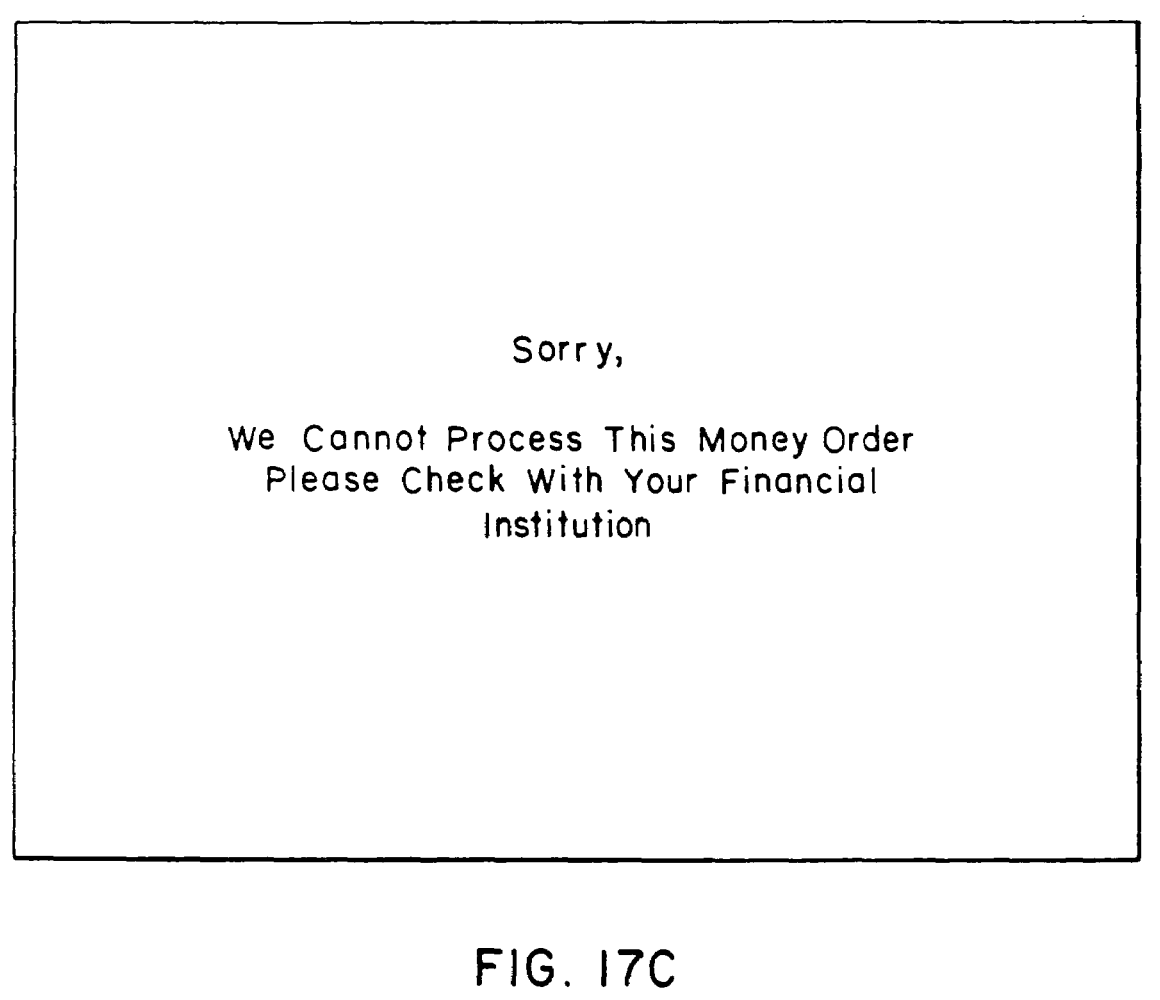

The cash money order screen displays $100.00 in a window 71 and prompts the operator to enter from the keyboard 18 the amount of cash that the user would like to receive in $5.00 increments. In this instance, the user has entered $100.00 into the window 71. In a manner similar to that used for the scanning of the check, the cameras 58 and 60 photograph both sides of the cash money order and locate the indicia showing the amount of the money order and read the amount indicia. The magnetic ink indicia identifying the issuer and the account of the issuer are read; and the signature on the back of the money order is scanned and confirmed. Then a communications network via a modem is connected to the issuer's account, indicating that the authenticity of the money order is being checked. When the machine 10 receives signals that the money order is authentic, the cash dispenser 30 is then operated to transfer $100.00 cash into the cash bin 46 for removal by the user. If the user had not signed the back of the money order, he would have been informed to reinsert the money order, as shown in FIG. 17B. If the money order could not be processed, it would be returned through the reject slot 62. The user display 20 would state that the money order could not be processed and that the user should check with her financial institution, as shown in FIG. 17C.

Assuming the user had selected, in FIG. 9, the #5 option of buying a money order by pressing the right hand button 27*a* on the keypad, then the buy money order screens and flow chart would have been operative, as will now be described. The first prompt shown on the purchase money order display 20 (FIG. 18), requests the name of the person to whom the money order is to be paid. In this instance, the name is John Doe, as shown in FIGS. 18 and 18A. Having operated the user keyboard 18 to enter the payee's name, i.e., "John Doe," the user will next enter the amount of $500.00, as shown in window 72 in FIG. 18A. The service charge of $0.50 is shown so that the total amount needed for the purchase of the money is $500.50. As may best be seen in FIG. 18B, it is preferred to provide the purchaser of the money order with a number of options for payment including by cash, by credit card withdrawal from an account of the user, and by a smart card. Or the user may return to the money order, if he so desires. The flow chart for buying a money order is shown in FIG. 18B.

In a buy money order transaction, the process is entered via step 600 and the money order recipient's name is entered in a step 602 or if cancellation is desired, control is transferred to another transaction test step 604. Assuming that the recipient's name has been entered, the amount of the money order is entered in a step 606 and in a step 608 a method of payment is chosen causing prompts to occur via a cash payment screen 610, a credit card screen 612, a smart card payment screen 614 or a balance withdrawal screen 616. The particular transaction for payment is then processed in a step 618 and the money order is printed out in a step 620. A receipt is printed in a step 622 and the transaction test 604 is then made. If further transactions are to occur, the service option screen is displayed in a step 624. If not, a test is done in a step 626 to determine if the card is in the card reader. If it is, the card is ejected in a step 628 and the welcome screen is displayed in a step 630.

The buy money order transaction will be tagged and, through the banking network, a money order printer 76 (FIG. 1) will print the money order. The money order printer 76 is disposed, in this instance, side-by-side with the receipt printer 50, as is shown in FIGS. 1 and 3 and is connected to the computer 21 through the parallel communication device 51, as shown in FIG. 24. The printed money order is dispensed from a money order dispensing slot 78, which is adjacent to the receipt printing slot 72 in the front housing wall 16 of the apparatus 10. The illustrated money order printer may be similar to the receipt printer 50 and is available from Star Micronics America, Inc., Model MP3342F. It includes an automatic cutter.

As shown in FIG. 18C, the user screen display 20 will then display that $500.50 has been withdrawn from the user's account, and that the money order is being printed. Both a money order and a receipt will be issued from the money order slot 78 and the receipt slot 52, respectively.

Figure 19D:
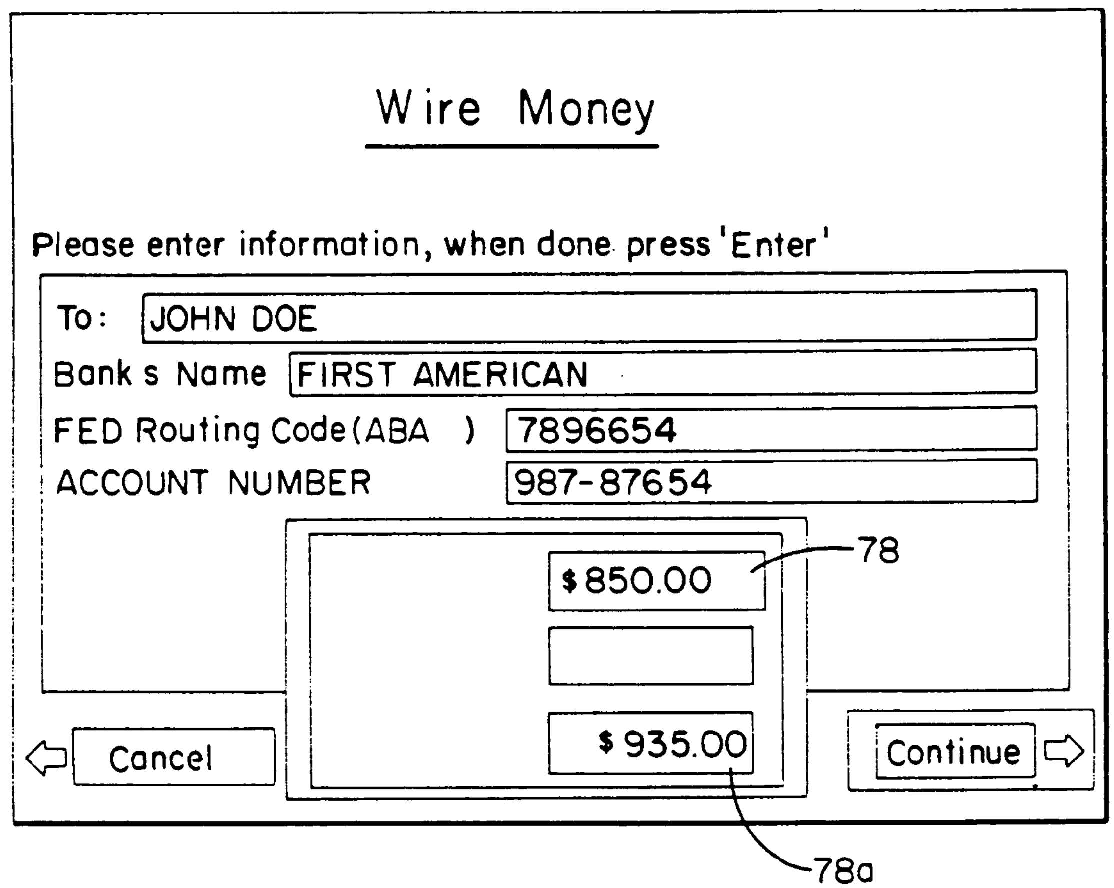
FIG. 19D shows a screen requesting the amount and shows a service charge.

If the user had selected the wire transfer option in FIG. 9 and had depressed the arrow key 27*a* for wire transfer, the screen of FIG. 19 would be displayed on the user's display 20 prompting the user to use the keyboard 18 to enter the name of the person to whom the money is to be wired. Then the screen display 20 would request the name of the bank, as shown in FIG. 19A, which will be entered, such as First American. The next request of the user is shown in FIG. 19B and that is for the Federal routing code or the routing for the bank for the transfer. The routing is to be typed in by the user using the keyboard. The number "7896654" has been typed in as the federal routing code in FIG. 19B. The account number of the receiver is then requested, as shown in FIG. 19C. The account number in this instance is shown as "987-87654" and has been typed in by the user using the keyboard 18.

Having entered the information for the wire transfer to a specific account, the screen display 20 requests the amount to be sent, which in this instance, as shown in window 78 is $850.00. A service charge of 10%, or $85.00 of the $850.00 amount charged is shown to the user bringing the transaction total to $935.00, as shown in window 78*a*. The flow chart for a wire transfer of money is shown in FIG. 19E.

The wire transfer process 640 is started with a step 642 for entering information related to the transfer related to the bank the transfer is to be made to as well as the account. In a step 644 the amount to be transferred is entered. In a step 646 the method of paying for the wire transfer is selected, causing control to transfer to a cash payment screen 648, to a credit card screen 650, to a smart card payment screen 652 or to a withdrawal screen 654. Following that, in a step 656 the selected payment transfer occurs and the wire transfer occurs via the modem 29 over the banking network. In a step 658 a receipt is printed and in a step 660 a test is made for whether another transaction is to occur. If it is, a service option screen is displayed in a step 662. If it is not, a test is made in a step 664 to determine if the card is in the reader. If so, the card is ejected in a step 666 and the welcome screen is displayed in a step 668.

Figure 19F:
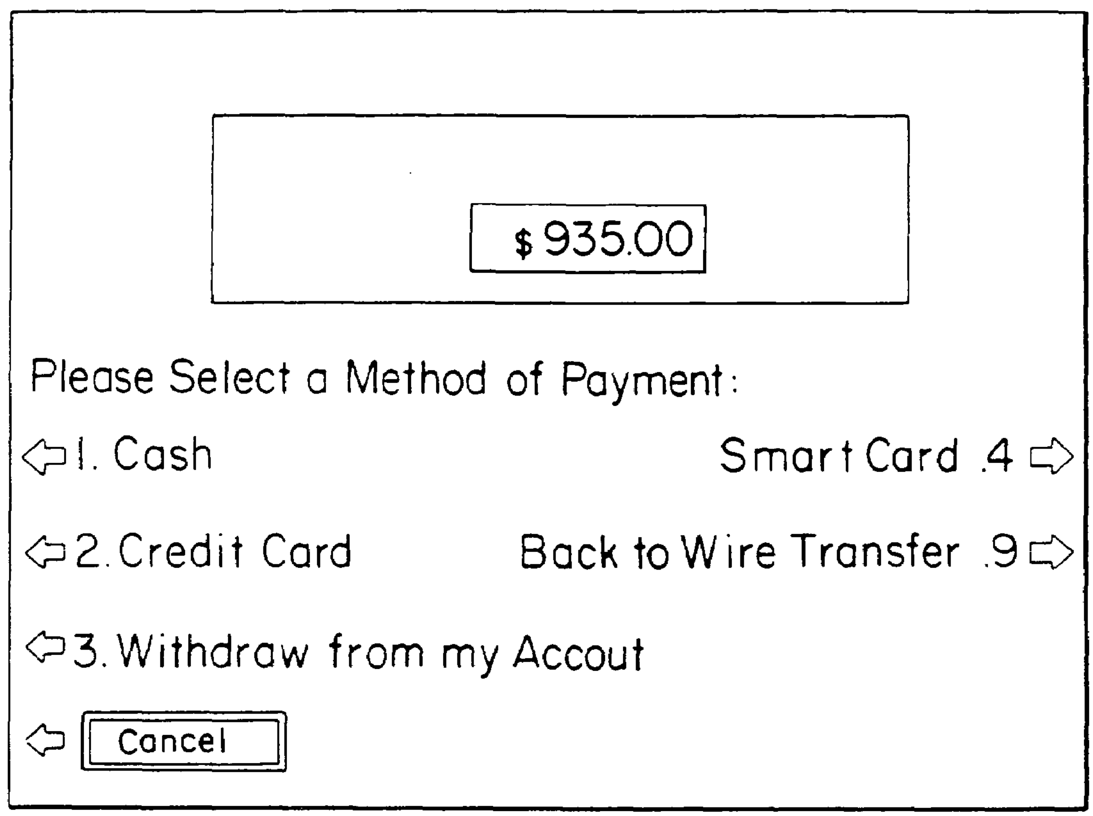
FIG. 19F shows the total of the transaction and requests a selection of the method of payment.

A request for the method of payment which can be any of four different payment methods, is shown in FIG. 19F. In this instance, the options of cash, credit card, withdrawal from my account, or smart card may be selected by operating the appropriate keypads 26 and 27 positioned alongside the display 20, shown in FIG. 19F. After selecting the appropriate method of payment, the machine is then connected over the banking network (FIG. 19E) to the bank to deposit $850.00 in John Doe's account no. 987-87654. The receipt printer 50 will cause a printout of the receipt showing a payment and wire transfer to John Doe of $850.00 and a total transaction fee of $935.00, the latter may be charged by credit card, smart card, or withdrawal from my account, as shown in FIG. 19E.

On the other hand, the user could have deposited cash of $935.00 in the cash acceptor slot 60. The machine 10 would then count the cash and hold it in the cash acceptor 34. Having finished the transaction, the credit card (if used for payment) would be ejected, as shown in FIG. 19E.

Returning again to the options available as shown in FIG. 9, if the operator had pressed the key 27*c* on the keypad 27 to select the "bill payments" option, then a bill option screen (FIG. 20) would have been shown on the user display 20. The bills which may be paid are listed on the display 20, viz., telephone, electric, gas, cable, water and credit cards. The operator will use one of the keypad buttons on keypads 26 and 27 to select from the screen of FIG. 4 the particular bill to be paid. In the alternative the bill payment selection may be made by touching the appropriately labeled region of the menu display on the touch screen display shown in FIG. 20J. It will be requested on the user display, as shown in FIG. 20A, to enter the amount for the bill selected, such as $129.67 for the telephone bill. Then, the telephone bill may be inserted into the scanning material insert slot 54 where the images of both sides of the bill will be captured. The particular bill payments have to be qualified with the user's account beforehand, and the particular bill has to be recognized so that the amount of the bill and the field specifying money owed can be located as well as the identity of the creditor company—the telephone company, in this instance. The verifier will read the customer's account number, the payee's account number, and the amount of the bill. The position of this data on the bill as well as the script, font, etc. will vary greatly. To aid in reading the bill, a keypad may be provided for operation by the user. Having manually identified for the processor 21 all of the fields on the image of bill, the interpretation of the field image is done in the same manner as analyzing a check or money order. The bill is verified, and if OK, the request is then stated as to the total amount to be paid for the transaction. The user then will receive the request to enter the amount to pay on the telephone bill, as shown in FIG. 20A, which in this instance, is $129.67. The service charge of $0.60 will be also displayed to the user on the user display 20 along with the total, which is shown in the window at the bottom of the screen 20. For instance, the total charge of $130.27 (FIG. 20A) to pay the particular telephone bill.

Figures 20B, 20C:
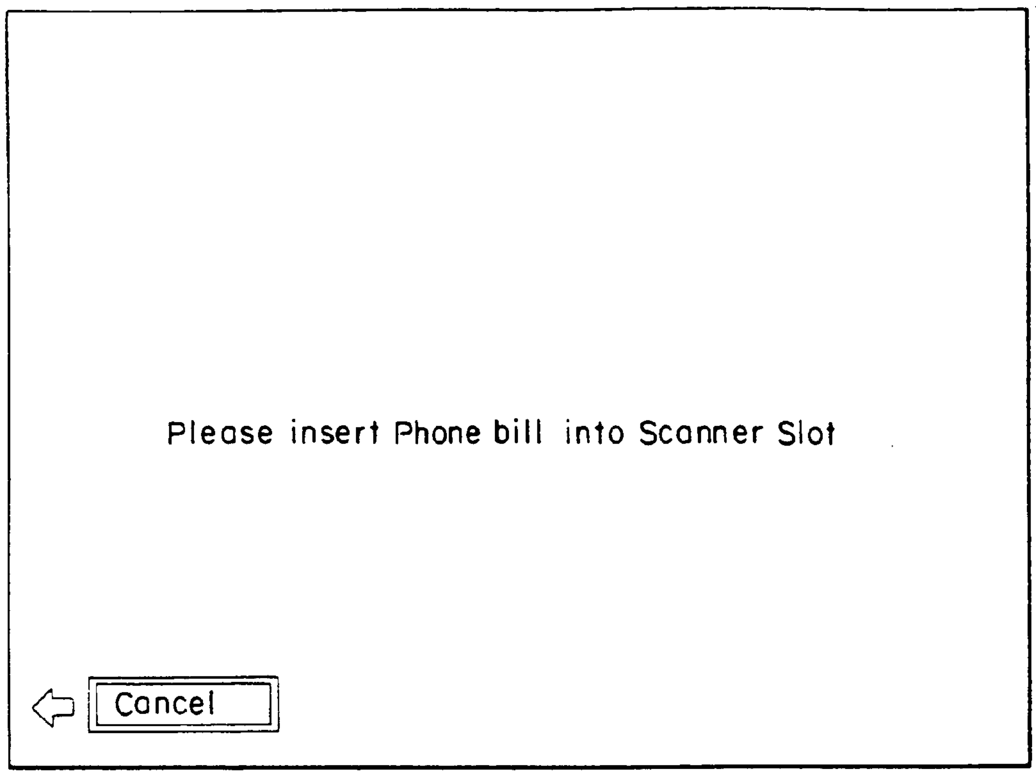
FIG. 20B shows a screen requesting entry of the telephone bill into the scanner slot.
FIG. 20C shows the selection of a gas bill for payment as well as a telephone bill.
Figures 20D, 20E:
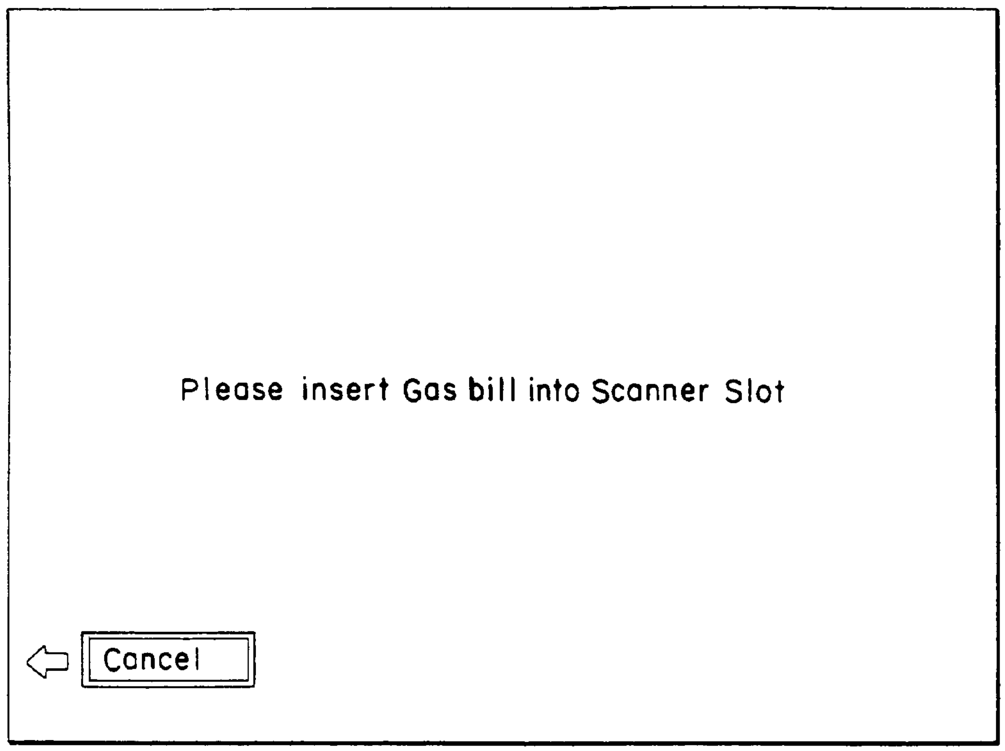
FIG. 20D requests insertion of the gas bill into the scanner slot.
FIG. 20E shows the payment for a credit card bill.

When paying a telephone bill the screen 20 will then interrogate the user as to whether she wishes to pay another bill via an inquiry, such as the inquiry shown in FIG. 20C wherein it is desired to pay a gas bill of $45.22. The sum of $45.22 is entered by the user using the keyboard 18. As shown in FIG. 20D, the user is then prompted to load the gas bill into the scanner slot 54. The gas bill will be read in the same manner as the telephone bill was read by the cameras 58 and 60. The magnetic or the other optical character recognition information on the bill will be analyzed to associate the payment of $45.22 to the appropriate account to the bill paying network. If the user also decides to pay a gas bill, the user will press "continue". Herein, the user decided to pay a credit card bill of $96.82 as shown in FIG. 20E for a third service charge of $0.60, which will bring the of the total service charges to $1.80. The total amount of the three bills, the telephone bill, the gas bill and the credit card bill plus the service charge will be $273.51.

Next, the method of payment is requested (FIG. 20F); and if the user elects to pay with a credit card, she will press the keypad button 26*b* and cause the screen (FIG. 20G) to be shown on the user panel 20, requesting that the user insert the credit card bill into the slot 54. The bill payments have been made over the bills payment network and the bills will have been collected in the receiver bin. This process is set forth as shown in FIG. 20H.

The bill payment process 720 is entered by selecting the type of bill such as telephone bill or electric bill, to be paid in a step 722. The bill is scanned and verified in a step 724 and the amount to be paid is entered manually in a step 726. A test is made in a step 728 to determine whether other bills are to be paid. If so, control is transferred back to step 722. If not, control is transferred to a step 730, testing for other transactions. A method of payment inquiry is made in a step 732 and in response thereto, a cash screen is displayed in a step 734, or a credit card payment screen is displayed in a step 736, or a smart card payment screen is displayed in a step 738, or a withdrawal screen is displayed in a step 740. After selecting the payment method, the funds are then transferred so that the bill is paid via modem connection in a step 742 and a receipt is printed out in a step 744. If another transaction is desired from step 730, the service option screen is displayed in a step 746. Otherwise, a test is made to determine if the card is in the card reader 22 in a step 748. The card is ejected in a step 750 and the welcome screen is displayed in a step 752.

When finished with the bill payment, the screen display 20 shows that $273.51 has been withdrawn from the account in FIG. 20H with a notation that "your bills are paid." As the flow chart for the bill payment shows in FIG. 20H, the receipt is printed by the receipt printer 50 which then ejects the receipt through the slot 52 to the user. The ATM card is then ejected from the card reader 22 back to the user.

Figure 7:
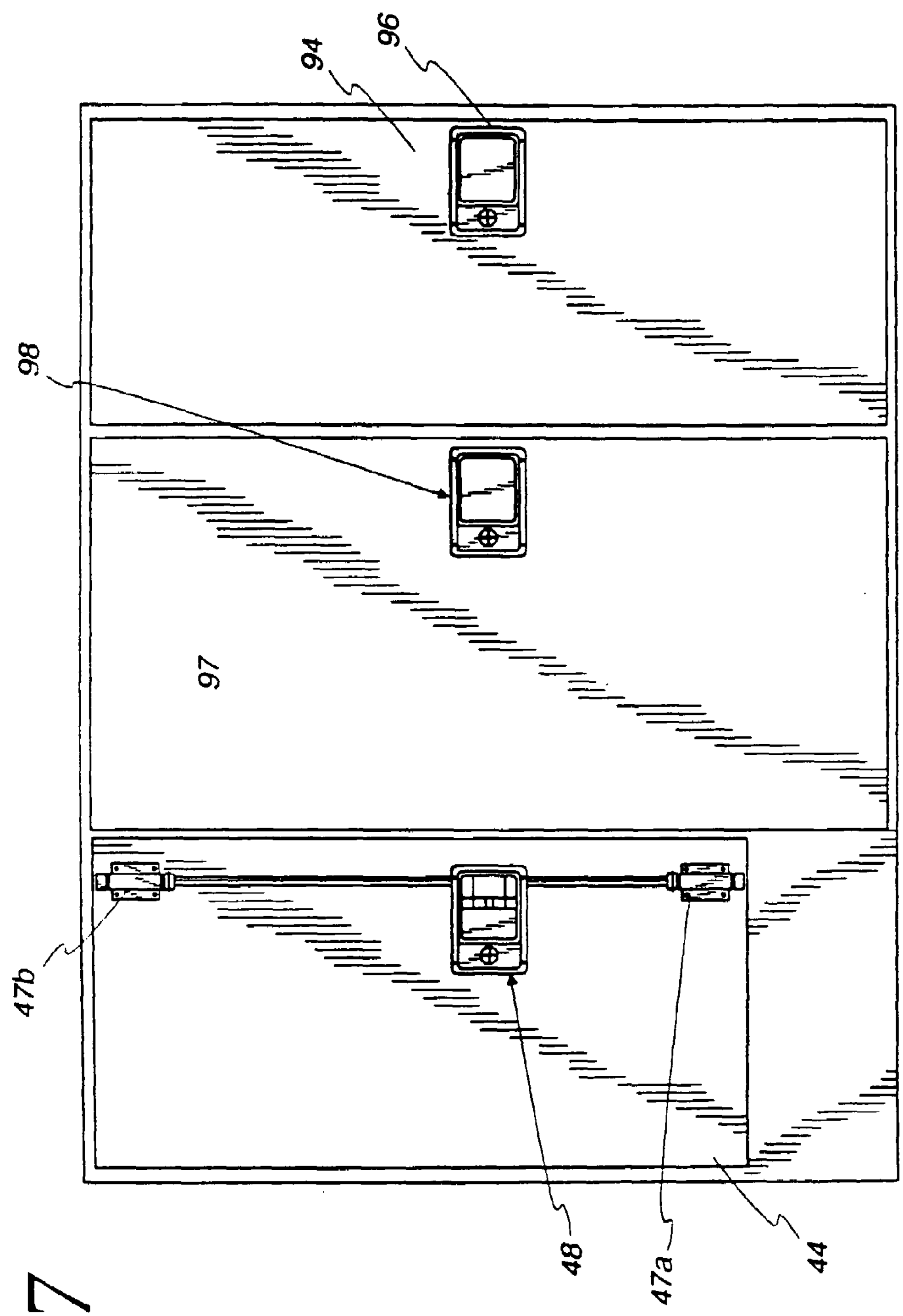
FIG. 7 is a rear view of the machine shown in FIG. 1.
Figure 21:
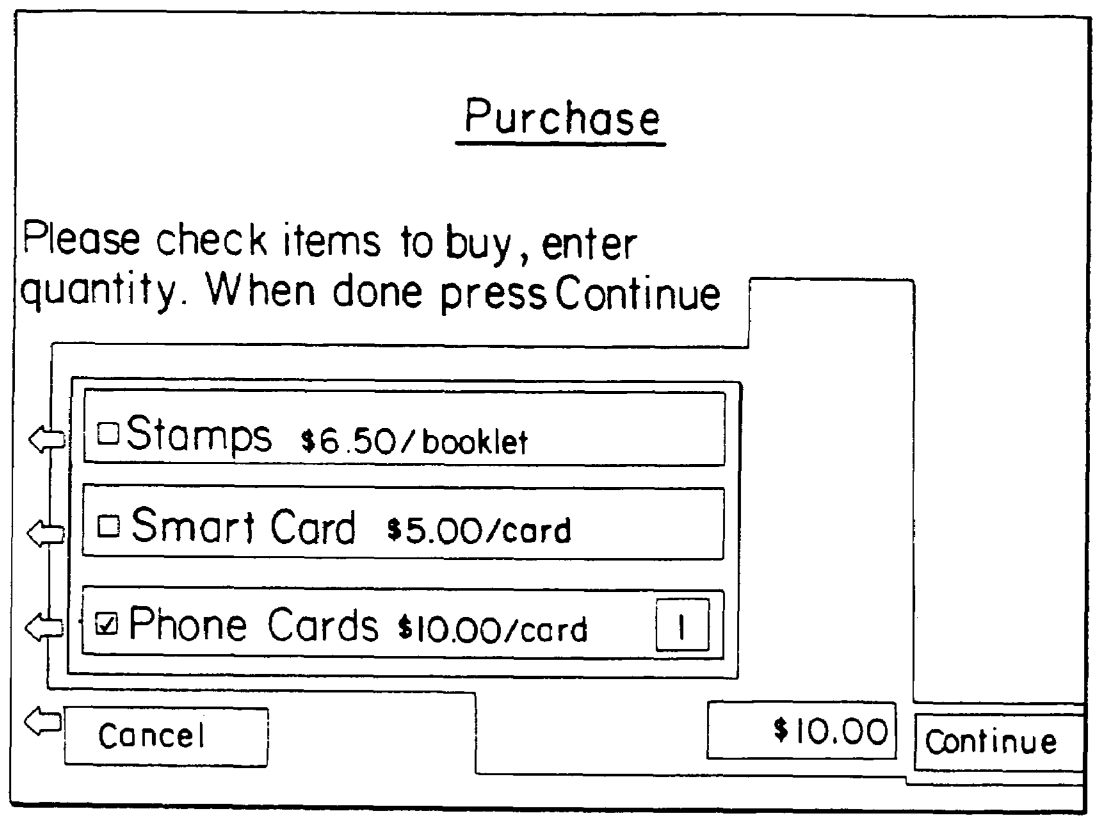
FIG. 21 shows a screen for purchase of items such as stamps, smart cards or telephone cards.

If the user had elected in FIG. 9 to buy lottery tickets, stamps or telephone calling cards, the purchase option would be selected by depressing the keypad button 27*d* to cause the purchase display screen of FIG. 21 to be present on the user display 20, which shows the option of buying stamps at $6.50 a booklet, a smart card at $5.00 a card, or a telephone card at $10.00 a card. Obviously, the number of items to be purchased could be enlarged to include lottery tickets or other end user items, which could be dispensed easily through purchasing goods dispensing slots 84, 85 and 86 shown in FIGS. 1 and 6 below three goods dispenser units comprising a lottery ticket dispenser 87, a stamp dispenser 88, a telephone calling card dispenser 89 and a smart card transaction vendor or handler 89*a*, all connected to the digital I/O board 62*b* via the resistor network 62*a* for communication with the computer 21. The disposed goods receiving slots 84, 85 and 86 are located in the front wall 16 of the housing 12, and the dispensers for the lottery tickets, stamps, telephone cards or smart card are mounted on dispenser support rails 90, as best seen in FIG. 3. The dispenser support rails 90 allow for sliding movement of the dispensers so that they can be accessed through a rear service door 94 (FIG. 7). The rear service door 94 has its own security lock 96 for denying unauthorized access to the interior of the housing 12 and to the goods dispensers 87, 88, 89 and 89*a*. A central door 97 having a security lock 98 can be opened to access the central portion of the machine 10 having the checks and the bills 66, the cameras 58 and 60, etc. While a variety of goods dispensers could be used, the illustrated dispensers are card dispensers which are made by Asahi Seiko USA, Inc., Model CD 1000. Manifestly, goods dispensers may be used other than those card dispensers herein described by way of example.

Figures 21H, 21I:
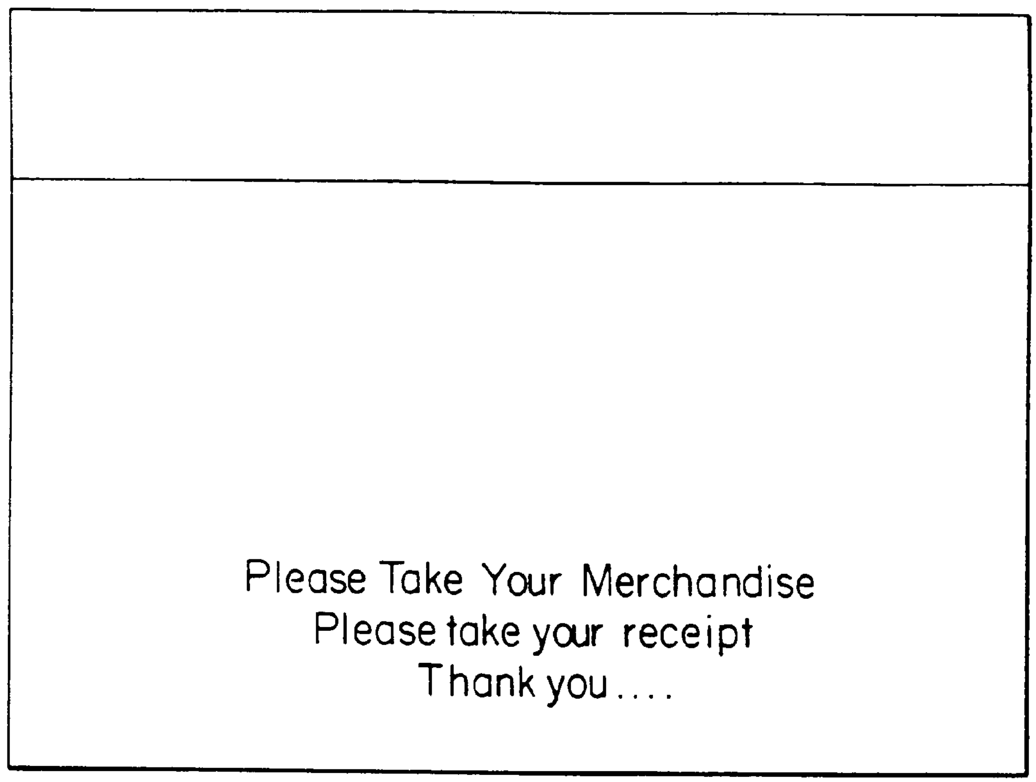
FIG. 21H shows that the total of $25.00 has been paid and shows a message on the screen to take the merchandise.
FIG. 21I is a touch screen display version of the screen shown in FIG. 21.

As shown in FIG. 21, the user may select one or more of the various items to be purchased. A telephone card may be selected by pushing the key 26*c* to select one $10.00 card. By pressing the "continue" button, the user is then provided with a screen display, as shown in FIG. 21B for buying smart cards or stamps. In the alternative the touch screen display shown in FIG. 21I can be used to make the selection by touching the appropriately labeled region of the screen display. In this instance, a three telephone calling card at $10.00 a card and three smart cards at $5.00 per card; have been selected by operating keypad button 26*b* to result in a grand total of $25.00 in purchases. The next screen to be shown on the display 20 prompts the user to select the method of payment for the $25.00 purchase. The user will then operate one of the keypads to select by cash, credit, withdrawal from account or smart card as a payment mode, as shown in FIG. 21C.

In this instance, the operator has decided to pay with cash and has punched the arrow key 26*a* on the keypad 26. The screen shown in FIG. 21D will then be provided on the display 20 requesting the insertion of the cash into the cash acceptor slot 60. The cash is then verified as counted, FIG. 21E shows that the user has inserted only $20.00, which has been accepted by the cash acceptor 64 and counted. The screen will then show to the user in FIG. 21F that the payment of $21.00 is insufficient for the total transaction of $25.00. If the user only inserts another $3.00, the transaction screen will show that the payment is still $1.00 short, as shown in FIG. 21G wherein the transaction is $25.00. If another dollar bill is inserted into the machine 10, then the user will see the screen shown in FIG. 21H, which will inform the user to take his merchandise with him. Dispensing of the merchandise occurs as shown in the flow chart of FIG. 21A, and the machine control 21 operates the receipt printer 50 to print a receipt for the user which will be dispensed at the dispensing receipt slot 52.

In order to make a purchase, the purchase process is entered in a step 770. The item to be purchased, such as smart card balance, telephone calling card, stamps or lottery tickets are selected in a step 772, or if desired, the transaction can be cancelled, causing control to be transferred to another transaction test step 774. When an item is chosen to be purchased such as a lottery ticket, the quantity of the item is prompted for in a step 776 and entered, and a test is made in a step 778 as to whether another purchase is to be made. If it is, control is transferred back to step 772.

If not, in a step 780 the method of payment is selected, causing a cash payment screen to be displayed in a step 782 or a credit card screen to be displayed in a step 784, or a smart card payment screen to be displayed in a step 786 or a withdrawal screen to be displayed in a step 788, following which the funds are accepted and the merchandise, such as the lottery ticket, is dispensed, in a step 790. The receipt is printed in a step 792 and another transaction is tested for in the step 774. If another transaction is desired, the service options display screen is displayed in a step 794. If it is not, a test is made to determine if the card is in the card reader 22 in a step 796. The card is ejected in a step 798 and the welcome screen is displayed in a step 800.

Figure 22:
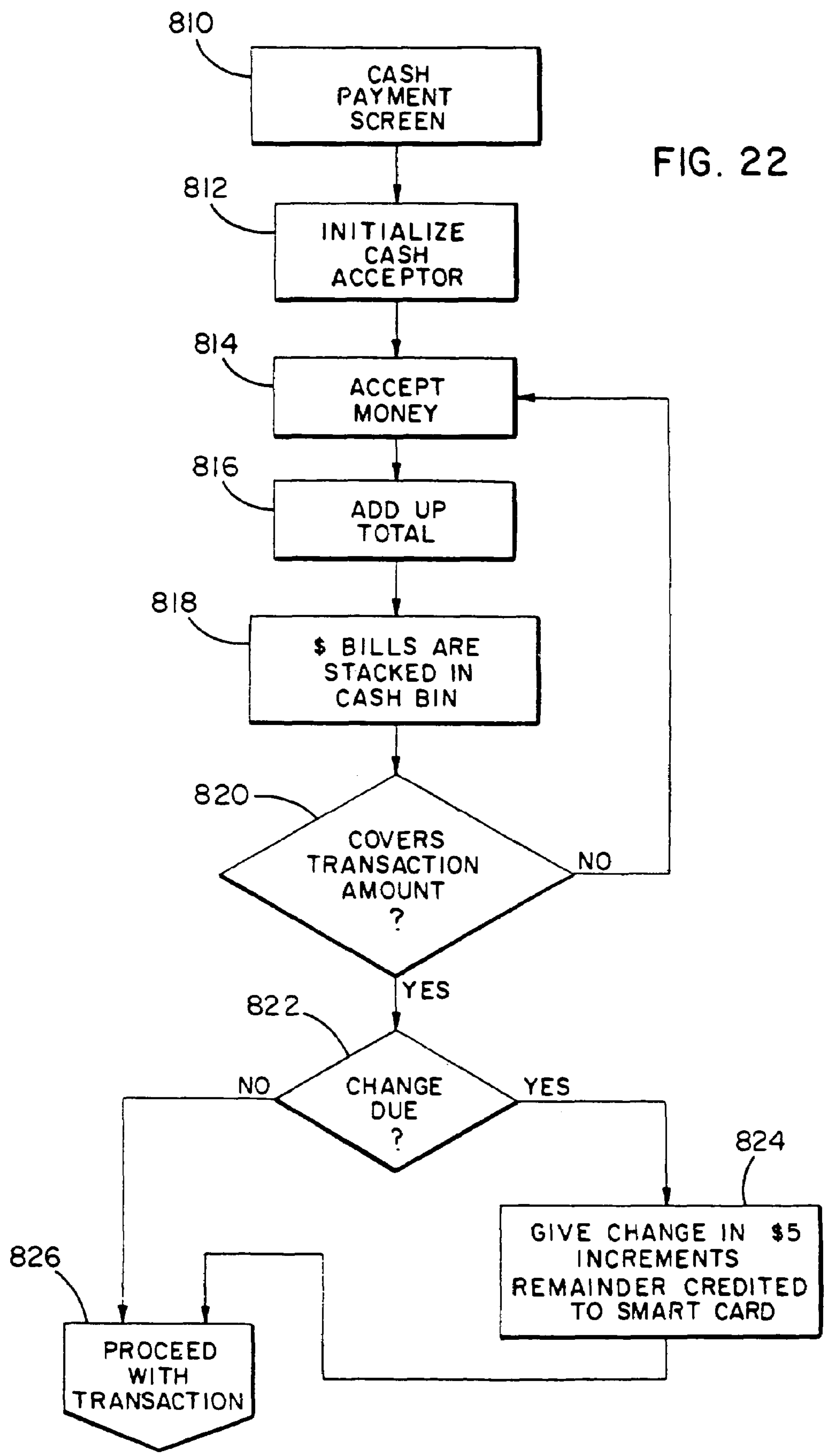
FIG. 22 is a flow chart showing the various operations with respect to cash payment.

As above described herein, it is preferred not to have any coins or coin changers in the machine; and to provide $5.00 bills as the lowest denomination bills that will be paid out in change. Usually, the cash payment process will follow the flow chart shown in FIG. 22.

In order to effect a cash payment for one of the transactions, such as the purchase of lottery tickets, transfer of a balance into the smart card or into a checking account or the like, the process is entered in a step 810 and the cash acceptor is initialized in a step 812. The currency is accepted in a step 814 and is totaled in a step 816. The accepted bills are stacked in the holding area in a step 818 and a test is made to determine whether the total covers the transaction amount in a step 820. If it does not, more money is accepted in a step 814. If the transaction is covered a determination is made in a step 822 whether change is due. If change is due, it is given in $5.00 increments with the remainder credited to the smart card in a step 824 and the transaction proceeds in a step 826.

Figure 23:
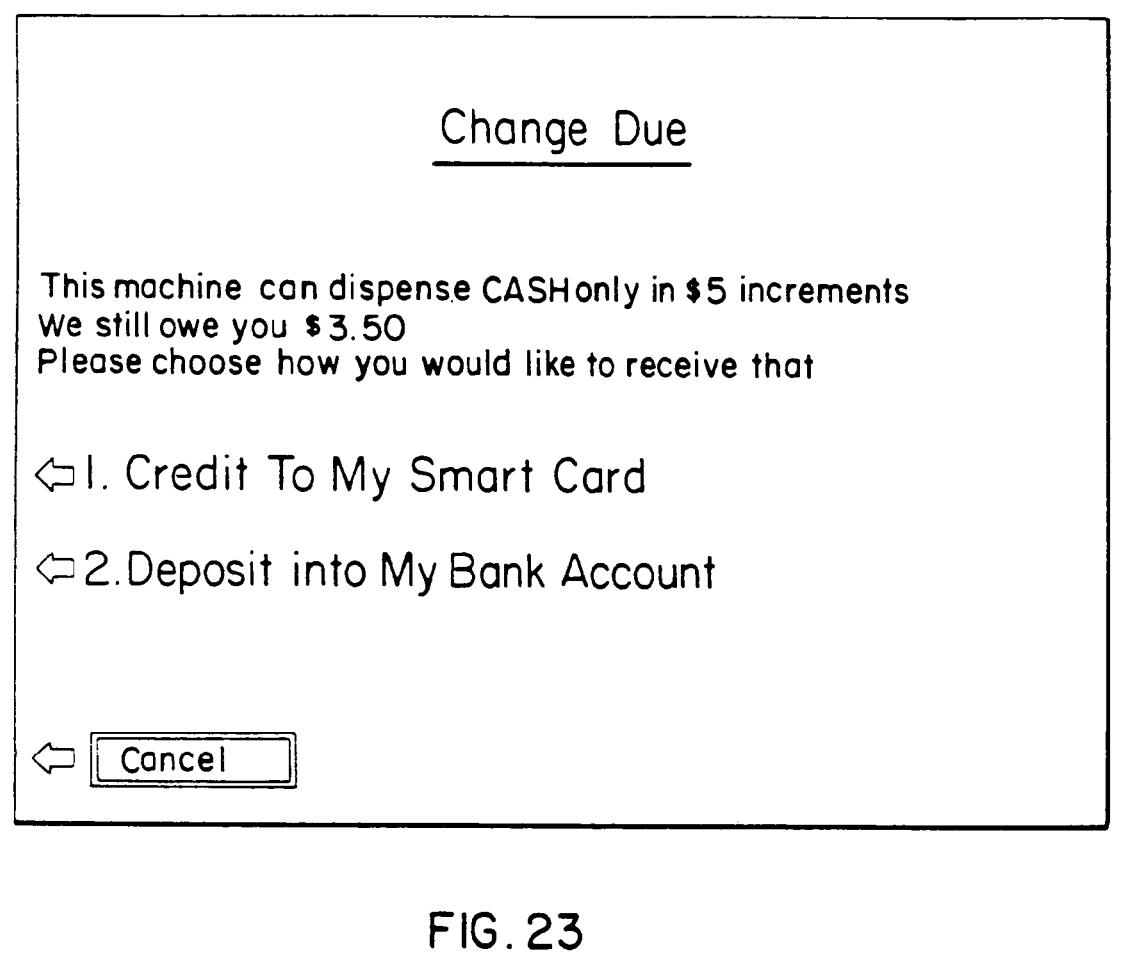

The $5.00 and $20.00 dollar bills available for change are stacked in the four cash bins. If the payment calculation shows that the cash tendered is sufficient for the transaction and that change is due, the change will be in cash in $5.00 increments by operation of the cash dispenser. Alternatively, any remaining change of less than $5.00 will be credited to a smart card or to a bank account to avoid the necessity of storing and handling small denomination bills and coins. The option will be exercised by the user with respect to change as shown on the screen display (FIG. 23). The user can insert a smart card into the card slot 14, and the smart card writer 89*a* (FIG. 1) will write the change by increasing the balance on the smart card, and then return the smart card to the user. If the user wants to deposit the change into her account, the user will operate arrow key 26*b* to cause the deposit transaction to occur over the banking network.

Figure 26:
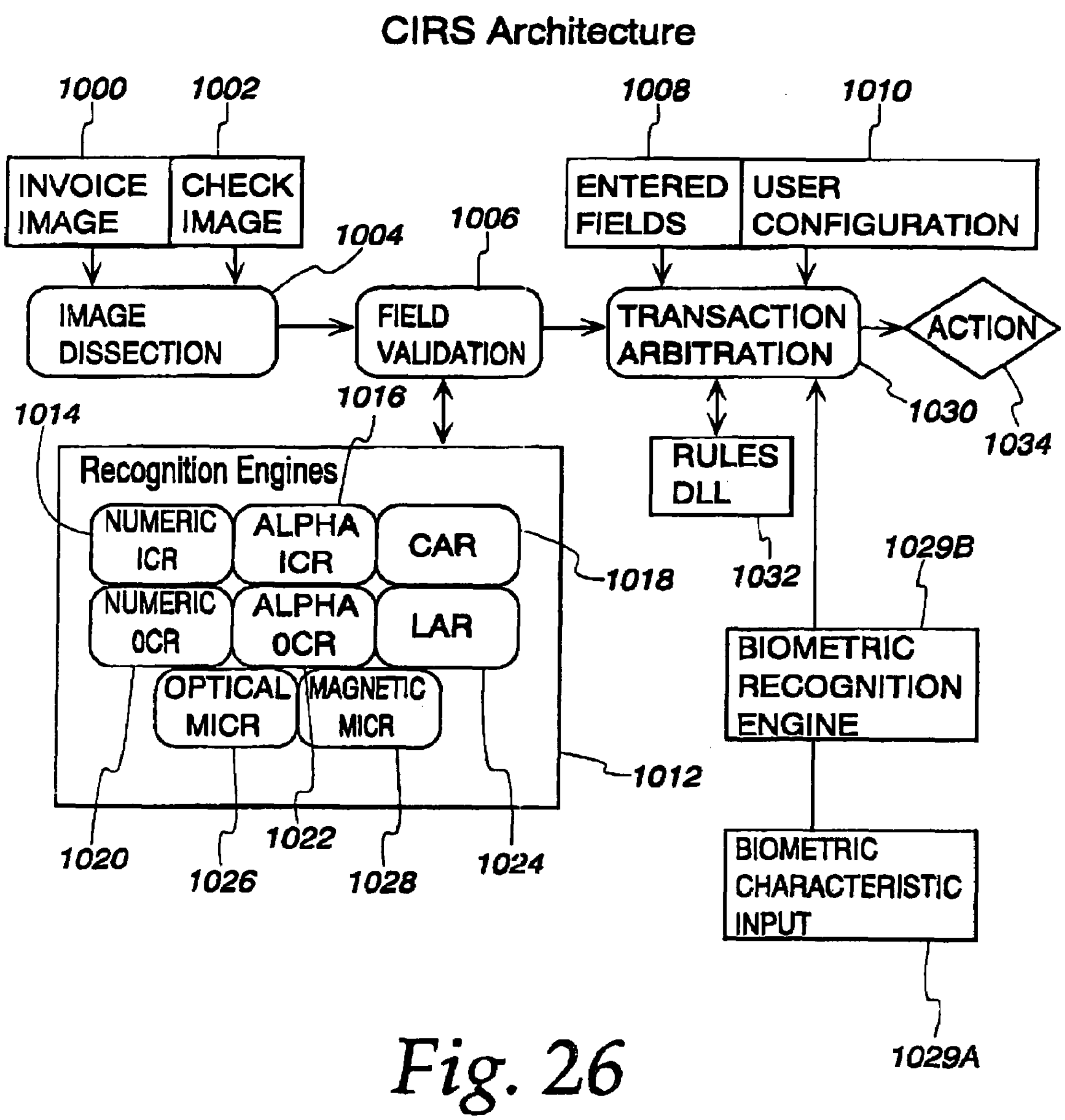
FIG. 26 is a flow diagram showing details of the overall operation of the processor for generalized document handling.

Referring now to FIG. 26, in general, the system architecture as far as the document processing is set forth therein. An invoice image is captured in a step 1000 and a check image may be captured in a step 1002. The images are dissected in a step 1006 and a test is made to determine whether the fields within the image, such as the courtesy amount field or the legal amount field in a check or other image character recognition fields, for instance on bills, are valid, that is, can be interpreted as representing valid amount information or the like. Validation may proceed by selection from a variety of recognition engines, such as a numeric image character recognition engine in a step 1014, an alphabetical image character recognition engine in a step 1016, a courtesy amount recognition engine in a step 1018, a numeric optical character recognition engine in a step 1020, an alphabetic optical character recognition engine in a step 1022, a legal amount recognition engine in a step 1024, an optical magnetic ink character engine in a step 1026, or a magnetic ink character engine in a step 1028. The various recognition engines that have thus been selected pass their results, for instance, in terms of confidence levels, to the field validation step 1006. The field validation step then inputs information to a transaction arbitration step 1030. The transaction arbitration step 1030 may also receive entered field information from the step 1008 or other user-entered information such as user configuration information. Such user configuration information might include an ATM card number, an account number, a PIN number, or biometric data which is supplied to the transaction arbitration engine. The information is acted upon in accordance with rules in a rules DLL in a step 1032. An action, such as payment of a bill or dispensing of cash, takes place in a step 1034.

Neural-network ICR engines trained from scratch by exposing the engine to a character training set consisting of thousands of discreet images of characters that point to their ASCII values. The ICR engine is then required to recognize a new set of characters that are not part of the new training set. Character images that are incorrectly recognized by the engine are assimilated into the original training set and the engine is retrained on the new set. This process is repeated until the accuracy of the engine meets certain predefined standards on arbitrary collections of real world image data, which standards are based upon comparable performance by professional data entry personnel.

There are a number of character recognition engines that could be employed by CIRS. The ICR engines that could currently be used by CIRS include FieldScript and CheckScript, v2.2, by Parascript (Colorado Springs, Colo.) for LAR; Quickstrokes v2.4, by Mitek (San Diego, Calif.); OrboCAR v2.13, by OrboGraph (Israel) for CAR, and Wordscan Plus, 1998 edition, by Caere for OCR of machine print.

Figure 27:
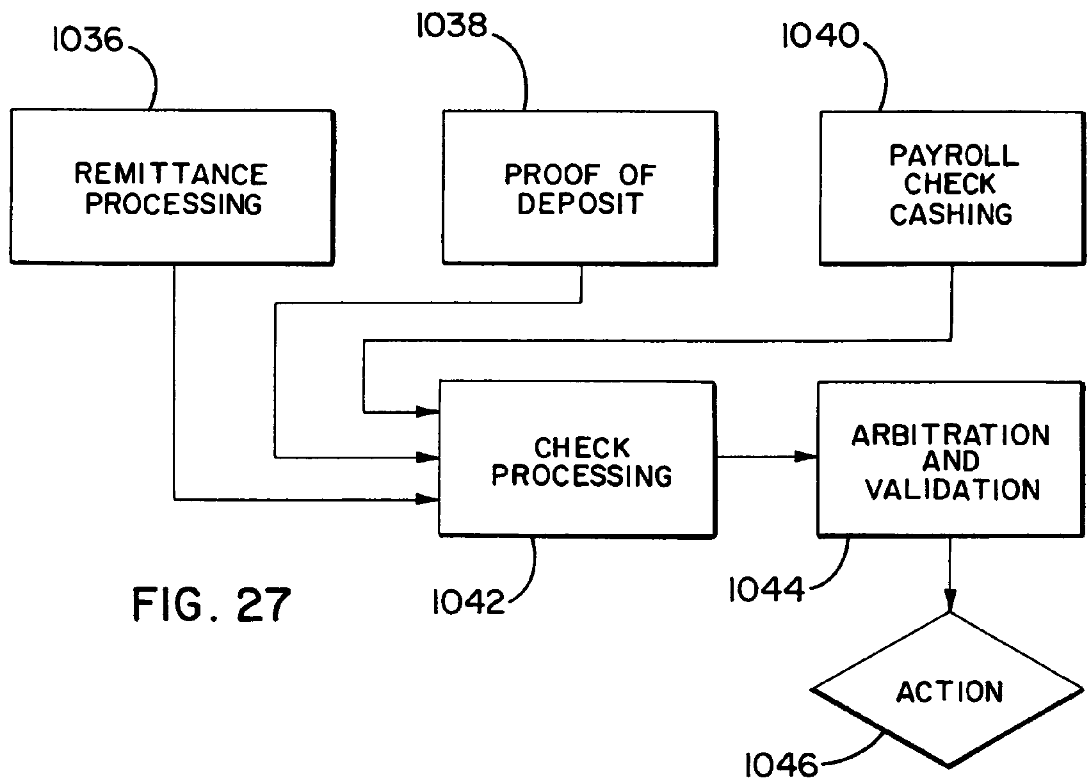
FIG. 27 is a flow diagram showing generalized flows for various types of document processing involving checks.

Referring now to FIG. 27, in general, the types of transactions that may be performed by the apparatus 10 are set forth therein. All of these transactions relate to check processing. Remittance processing involving automated payment of a bill can occur in step a 1036. The remittance processing is followed by check processing in a step 1042. Arbitration and validation follows check processing in a step 1044. An action such as payment of the bill occurs in a step 1046. Proof of deposit may occur in a step 1038. Following which, check processing occurs in step 1042. The arbitration and validation step 1044, and the action step 1046 are then performed. Likewise, a payroll check may be cashed in a step 1040 involving check processing in step 1042. The arbitration and validation of the check processing information occurs in step 1044. The payroll in action step 1046 next takes place.

Figure 28:
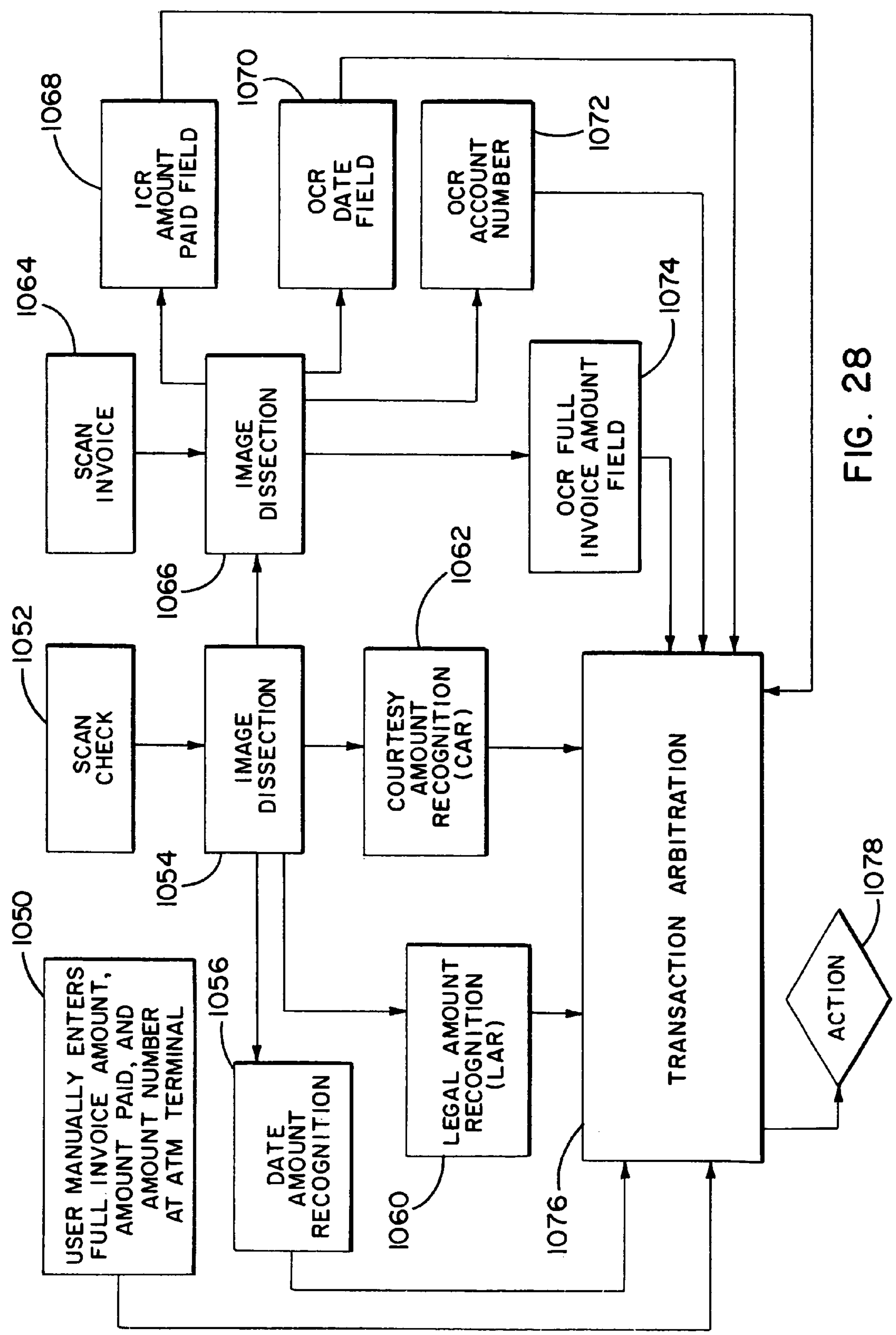
FIG. 28 is a generalized flow diagram showing steps related to processor operation related to remittance processing or bill payment.

Remittance processing details are more specifically shown in FIG. 28 wherein, in a step 1050, a user would be prompted to manually enter a full invoice amount, an amount to be paid and an account number at the apparatus 10. That information would be passed to a transaction arbitration step 1076. In addition, the check would be optically and magnetically scanned in a step 1052 to produce imaging of the front and back of the check as well as magnetic MICR information. The images from the check and the magnetic information would be dissected in a step 1054. Date amount recognition takes place in a step 1056. Legal amount recognition occurs in a step 1060. Courtesy amount recognition occurs in a step 1062. Each of those last three steps would then pass their results in terms of a confidence level or an output to the transaction arbitration step 1076. If an invoice is to be processed as part of the remittance, the invoice document is optically scanned in a step 1064 and the image is dissected in a step 1066. The image character recognition amount paid field is interpreted in a step 1068. The optical character recognition date field is interpreted in a step 1070. The account number, as sensed by optical character recognition in a step 1072, has its information passed to the transaction arbitration step 1076. In addition, the full invoice amount field is optical character recognized in step 1074, and that information is passed to the transaction arbitration step which then acts upon it and pays the bill in step 1078.

Figure 29:
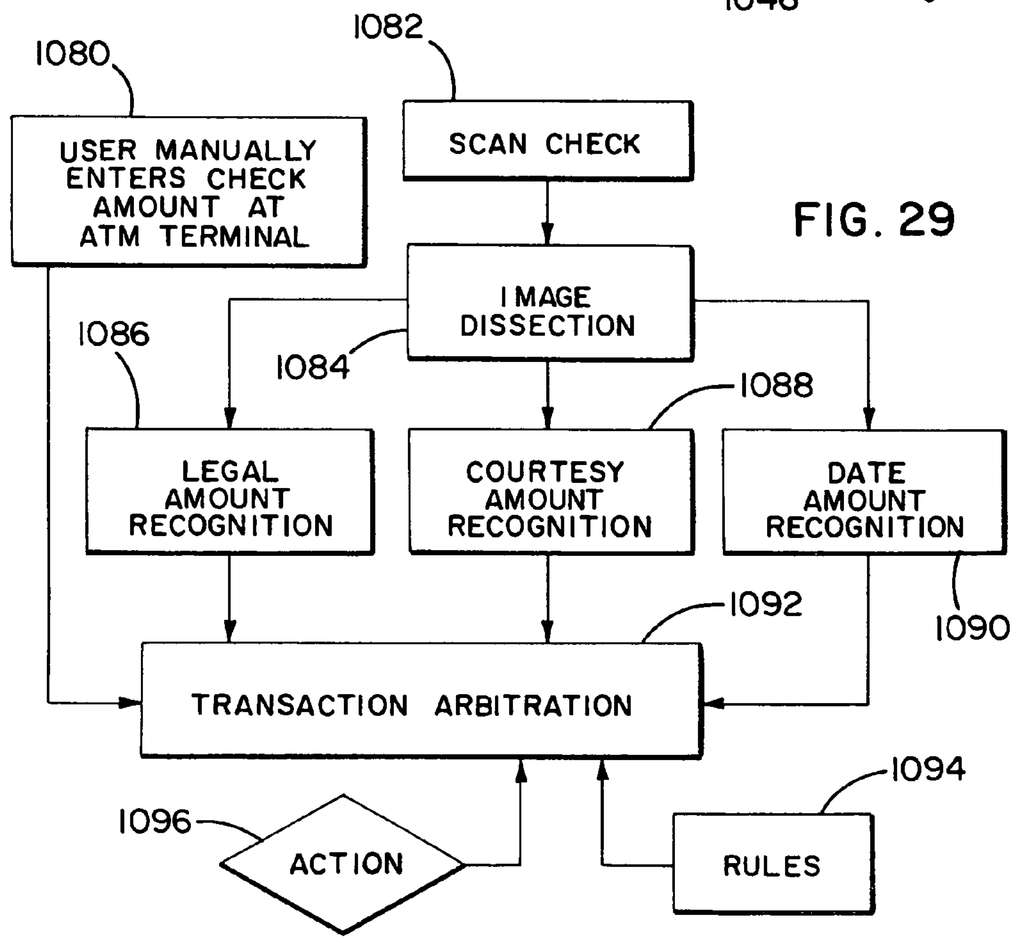
FIG. 29 is a generalized flow diagram for depositing a check.

Proof of deposit processing is performed as shown in FIG. 29. In a step 1080 the user is prompted to enter manually the amount of a check at the apparatus 10. The check is image scanned in a step 1082. The check image is dissected in a step 1084. Legal amount recognition takes place in a step 1086. Courtesy amount recognition takes place in a step 1088. Date recognition would take place in a step 1090. The results of steps 1086-1090 are passed to a transaction arbitration step 1092. The transaction arbitration step 1092 would then act in accordance with rules set forth in the rules module 1094. Action such as depositing funds and issuing a proof of deposit occur in a step 1096.

Figure 30:
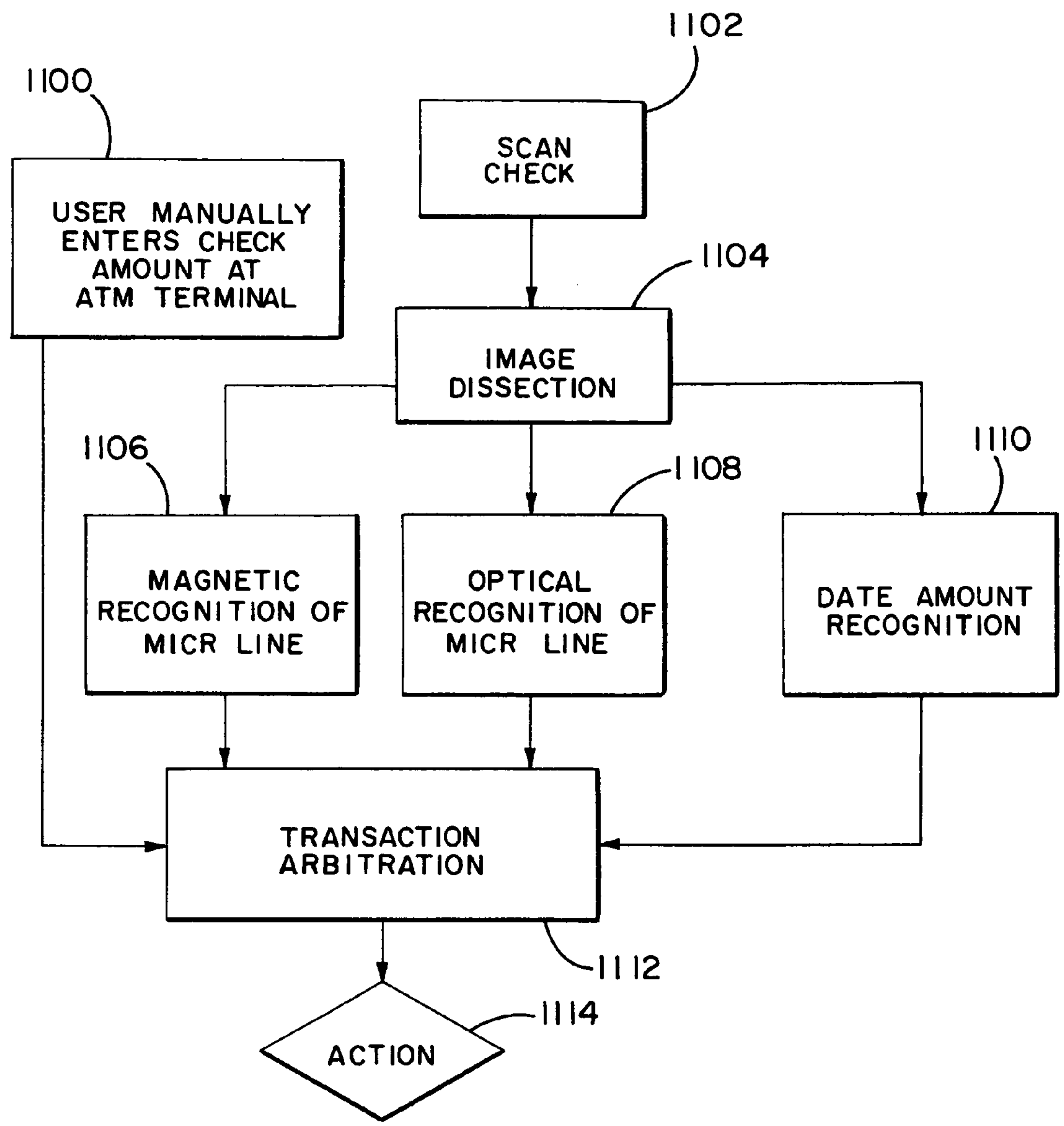
FIG. 30 is a generalized flow diagram for the processor when cashing a payroll check.

As shown in FIG. 30, a payroll check may be cashed. In a step 1100, the user is prompted to enter the check amount into the apparatus 10. The entered amount is passed to a transaction arbitrator step 1112. In a step 1102, the check is optically scanned and in step 1104 an image of the check is dissected. In a step 1106 there is a magnetic recognition of the MICR line, for instance, to determine the bank number, the account number, and even in some instances the amount of the check. There is also optical recognition of the MICR line in a step 1108 and a date amount recognition in a step 1110. However, that information is passed to the transaction arbitration step 1112. Following step 1112, action, for instance, payment of funds, is taken in a step 1114.

Figure 31:
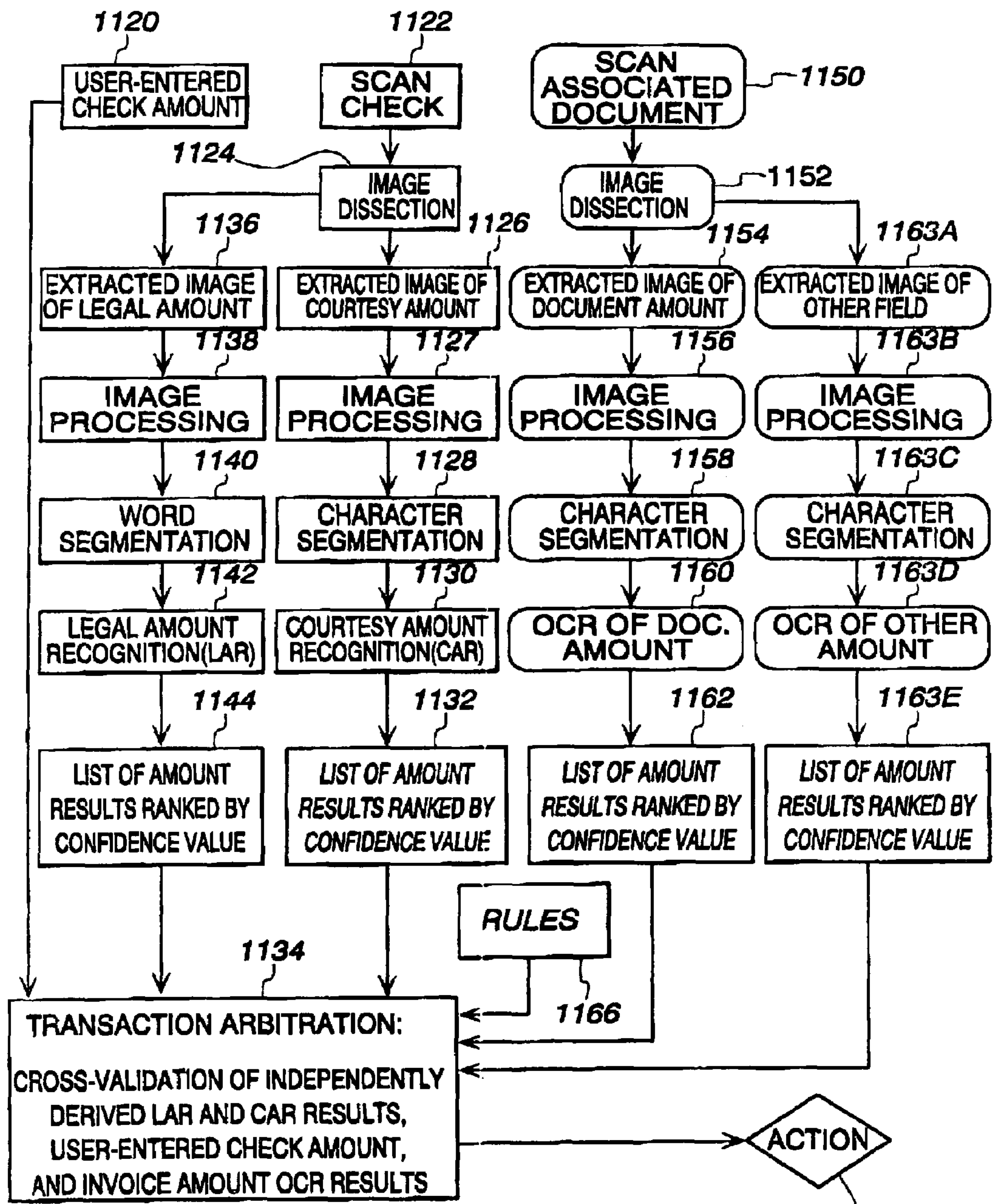
FIG. 31 is a generalized flow diagram for character amount recognition (CAR) and legal amount recognition (LAR) for an instrument being processed.

As shown in FIG. 31, details are set forth for the legal amount recognition and courtesy amount recognition arbitration procedures. A user enters the check amount in a step 1120. There is a cross-validation in a transaction arbitration step 1134.

A check is optically scanned in a step 1122 and its image is dissected in a step 1124. The portion of the check image related to the courtesy amount is extracted in a step 1126 by way of bounding box recognition techniques set forth below. In a step 1127 the image is processed, including by way of character segmentation in a step 1128, and courtesy amount recognition values and associated confidence levels in output in a step 1130. The multiple courtesy amount recognition values may be output in step 1132 ranked according to their respective confidence levels. That information is passed to the transaction arbitration step 1134.

In a similar fashion, the legal amount is extracted after image dissection in a step 1136. The image is processed in a step 1138, including via word segmentation in a step 1140, and the legal amount recognition conclusion is generated in step 1142. Multiple legal amount recognition values, together with their respective confidence levels, are transmitted in a step 1144 to the transaction arbitration step 1134. In a step 1150 an associated document, which may be a bill or invoice to be paid, will be optically scanned. The bill or invoice image will be dissected in a step 1152, and the image of the document amount is indicated possibly by a bounding box and extracted in step 1154. The document amount would be processed, including by character segmentation in a step 1158 and optical character recognition of the document amount in the step 1160. Document amount results are ranked by confidence level and transferred in a step 1162 to the transaction arbitration step 1134.

In addition, after the associated document has been scanned, other amounts might be extracted required by the transaction and passed to the arbitration step 1134. The image would be extracted in step **1163*a*. The image would be processed in step 1163*b*. Character recognition would occur in step 1163*c*. Optical character recognition of other fields would occur in step 1163*d*. The resulting amounts or character strings would be ranked by confidence value in step 1163*e*. The arbitration step would act in accordance with various rules as to confidence levels and the like in step 1166 and take action, for instance, related to payment of an amount in a step 1168**.

Figure 32:
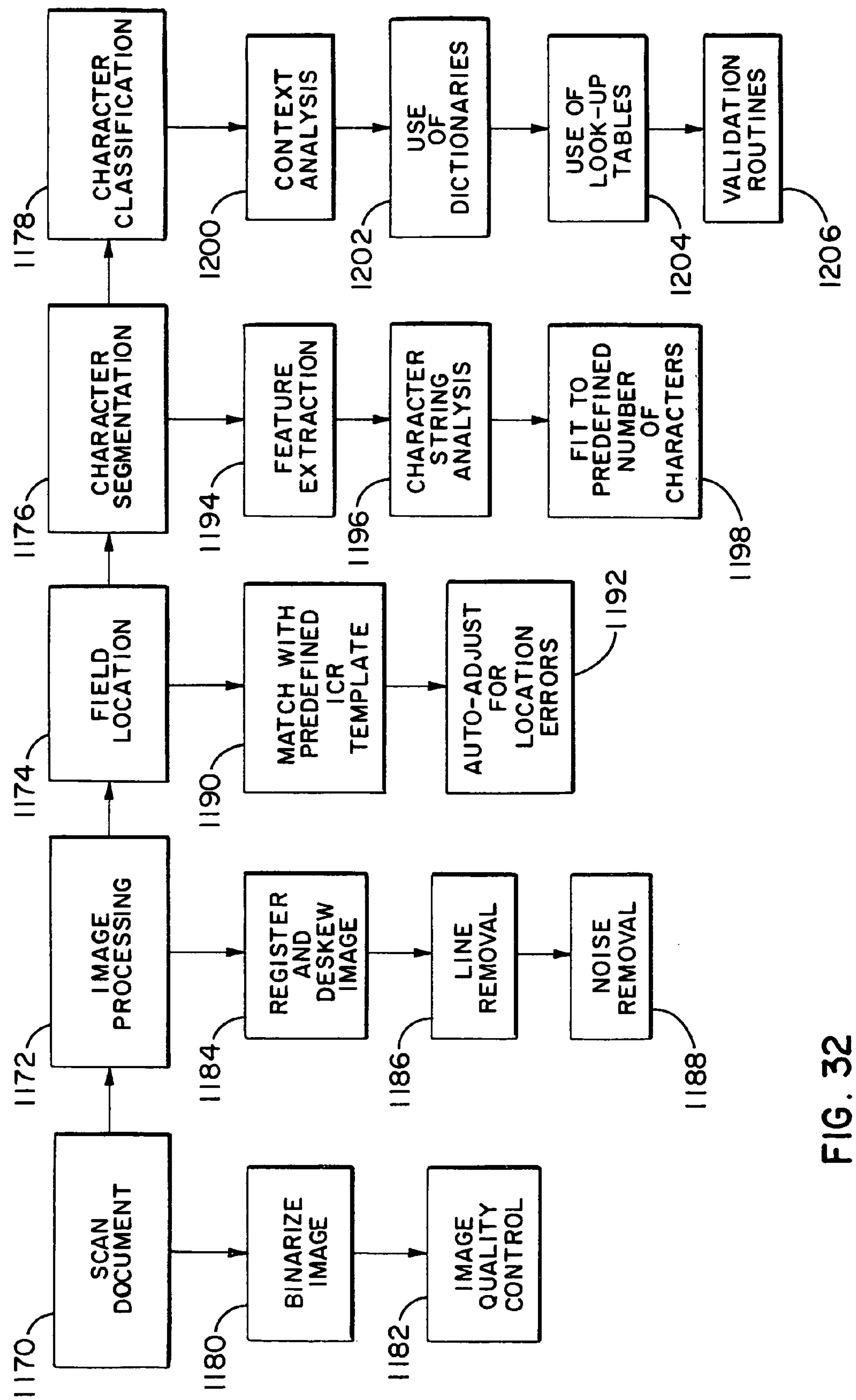
FIG. 32 provides details of processor operation for image character recognition of the type including CAR and LAR.

As shown in FIG. 32, the image character recognition process occurs at a step 1170 in which the document is scanned, its image is processed in a step 1172, and relevant fields are located in a step 1174. Characters are segmented in a step 1176 and characters are classified in a step 1178. The document is scanned in the step 1170 by digitizing the image in a step 1180. During the image processing step 1172, the image is registered and deskewed in a step 1184. Extraneous lines are removed in step 1186 and noise is removed in step 1188. In order to determine the field location, whether by bounding boxes or the like, the field is matched in some instances with a predefined image character recognition template in a step 1190. In order to perform the character segmentation step 1176, features are extracted in a step 1194, a character string analysis is made in step 1196 and a best fit to a predefined number of characters is determined in step 1198. In order to perform character classification, context analysis is performed in step 1200, including by the use of dictionaries in step 1202 and look-up tables in a step 1204, which information is then relied upon by validation routines in step 1206.

In order to generate a bounding box a bounding box procedure 1300 causes the processor, through the touch screen, to prompt the user to point to the beginning of a field such as a character amount field, a legal amount field, or some other field in a step 1302. Pointing at the touch screen causes the touch screen to signal the processor as to the X and Y coordinates of the point in a step 1304. In a step 1306 the processor is prompted to point to the end of the particular field. In a step 1308 the system records the X and Y coordinates of the end field point identified. In a step 1310 the X and Y coordinates of the initial point and the end point are used to define a region for an initial bounding box. In the step 1312 a pixel analysis routine to be described hereinafter determines whether significant portions of characters, strokes or the like extend outside the preliminary bounding box region. In a step 1314 the bounding box is then drawn on the screen and the user is prompted by the processor with a query as to whether they are satisfied with the bounds of the bounding box in a step 1316. If they are not, control is transferred back to step 1302. If they are, the bounding box is adopted in a step 1318 to define the region of interest to be operated upon by a recognition engine or recognition software which performs optical character recognition, image character recognition, CAR recognition or the LAR recognition.

Figure 34:
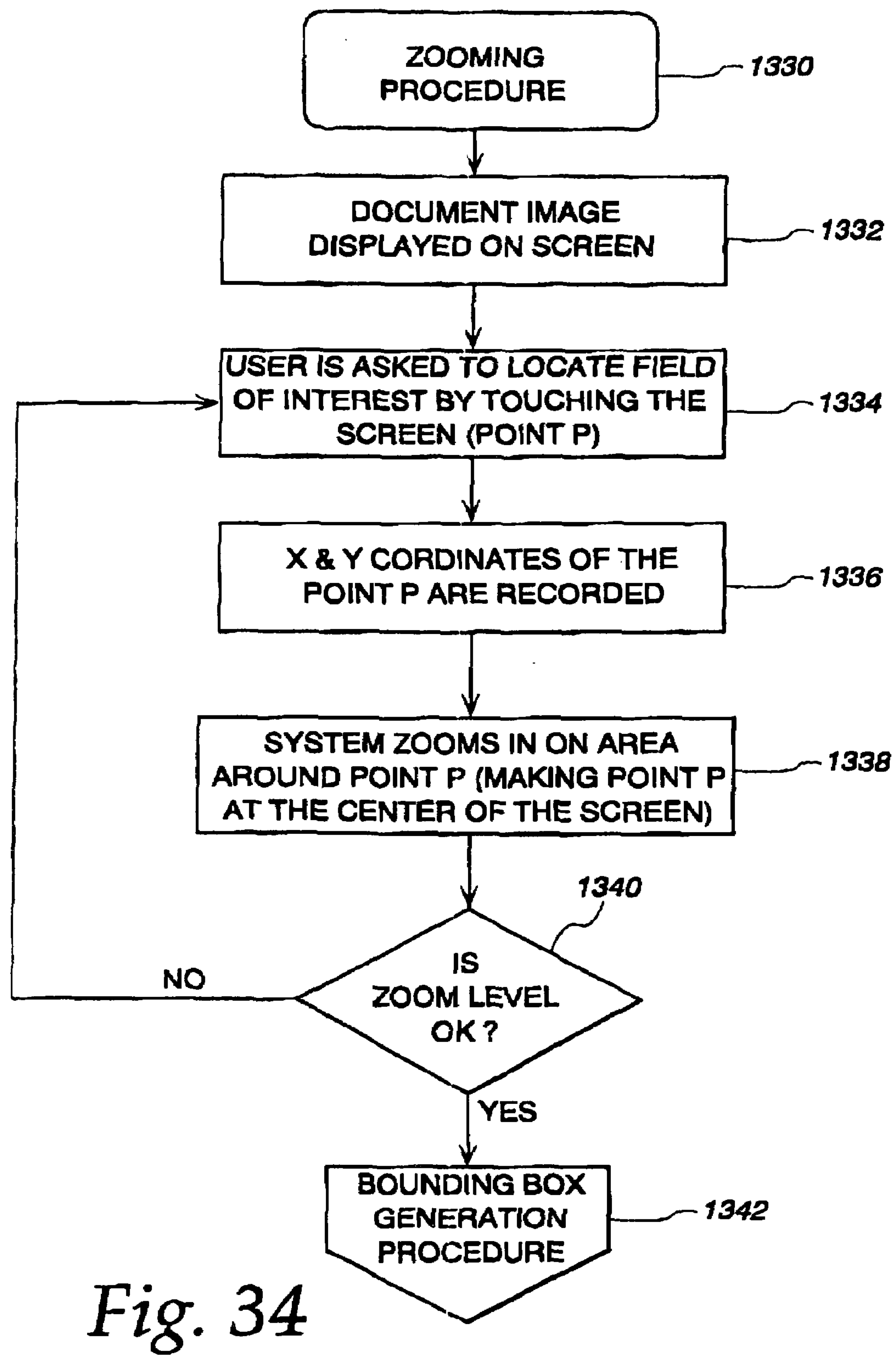
FIG. 34 is a flow diagram for zooming an image in the bounding box.

The bounding box may also be adjusted by a zooming procedure, as set forth in a zooming procedure 1330 shown in FIG. 34, in that procedure a document image is displayed on the touch screen in a step 1332. In a step 1334 the user is prompted to locate the field of interest by touching the screen. In a step 1336 the X and Y coordinates of the point touch are recorded in RAM. In a step 1338 the displayed image zooms in on the area around the point magnifying it. A test is made in a step 1340 to determine whether the zoom level is OK. If the user touches the screen further the process loops back to a step 1334 causing further zooming to take place. For instance the first zoom might magnify 1.8 times, the next zoom by 1.1, and successive zooms by smaller amounts so that there is a quasi-asymptotic approach without significant overshoot. Following completion of the zoom the bounding box procedure 1300 is entered by a step 1342.

Figure 33:
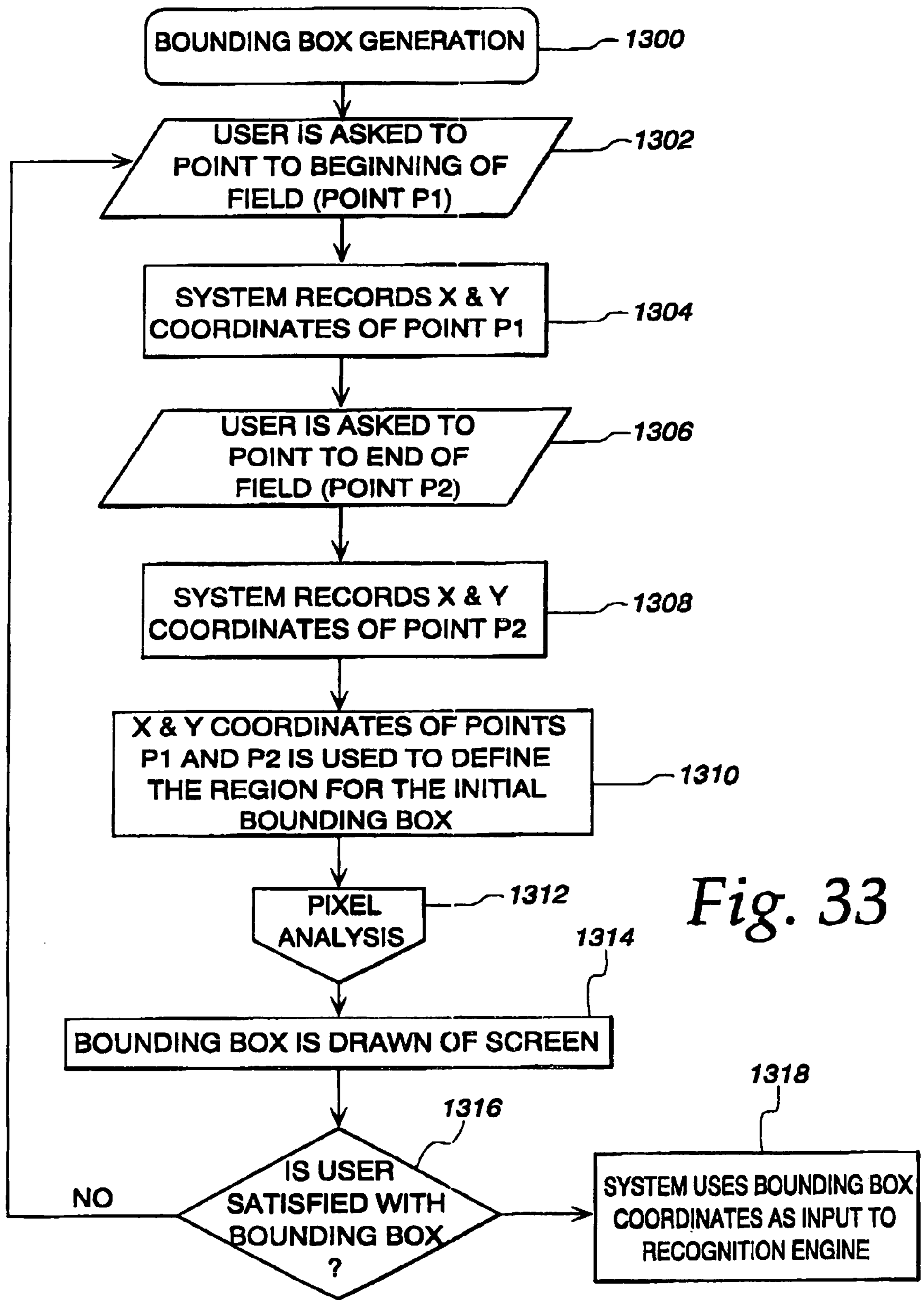
FIG. 33 is a flow diagram for generating a bounding box.
Figure 35:
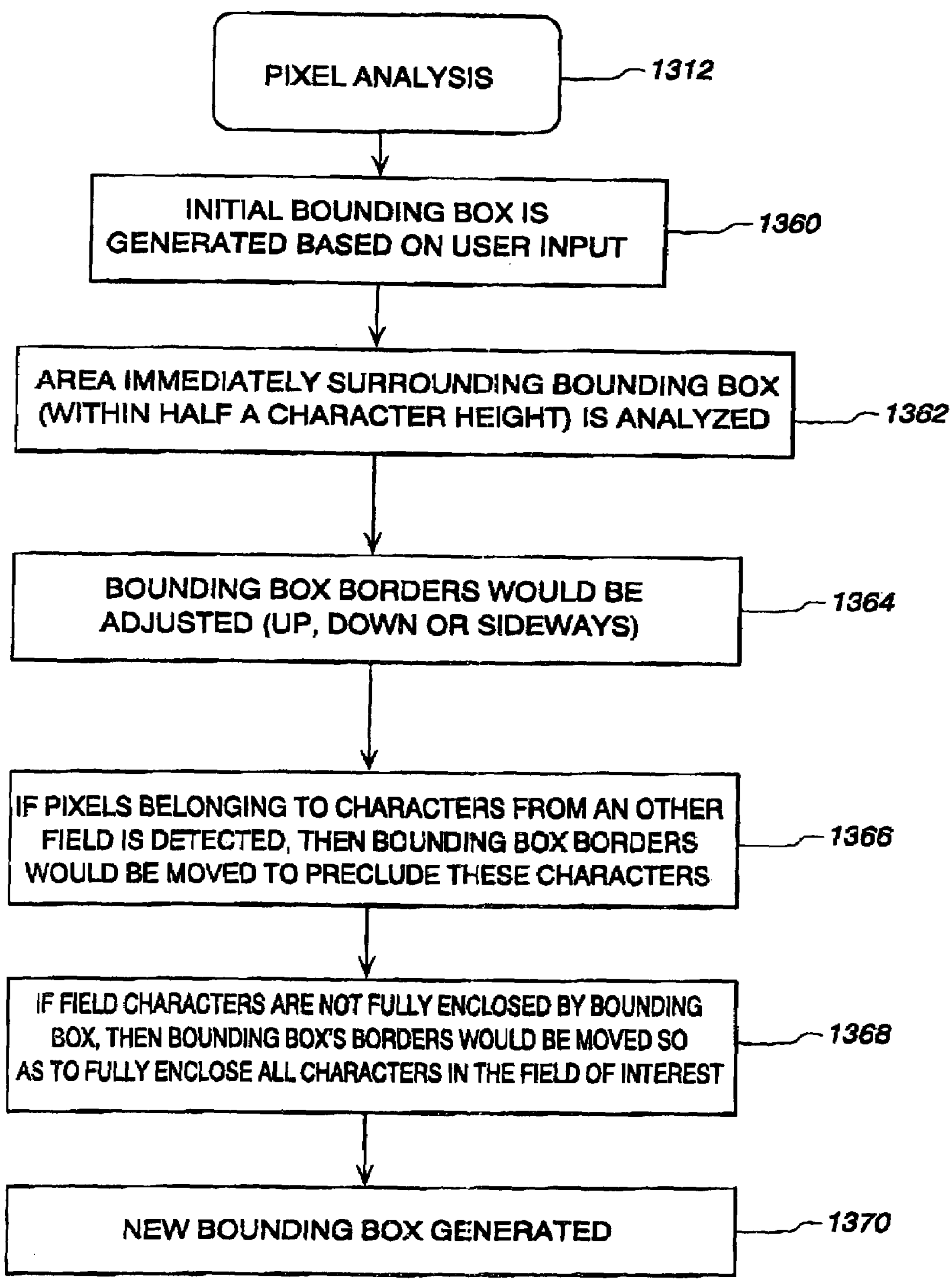
FIG. 35 is a flow diagram for the bounding box.

In order to perform the pixel analysis step 1312, as is shown in FIG. 35, the initial bounding box is generated on the basis of the user input as represented by a step 1360. In a step 1362 the area immediately surrounding the bounding box within half a character height is analyzed to determine whether portions of characters, cursive strokes or the like extend outside the bounding box region. If so, the bounding box borders are adjusted in a step 1364 to include the extraneous stroke portions within a somewhat larger bounding box. If there is a characteristic of characters which would be from a different field, as detected in a step 1366, the bounding box borders would be shifted to preclude inclusion of those characters within the field of interest. A test is made in a step 1368 to determine if field characters are not fully enclosed by the bounding box and then the borders would be moved so as to fully enclose all character in the field of interest in that step. The new bounding box would then be generated in the step 1370 and control would be transferred to step 1314 on FIG. 33 to draw the bounding box on the screen.

Figure 36:
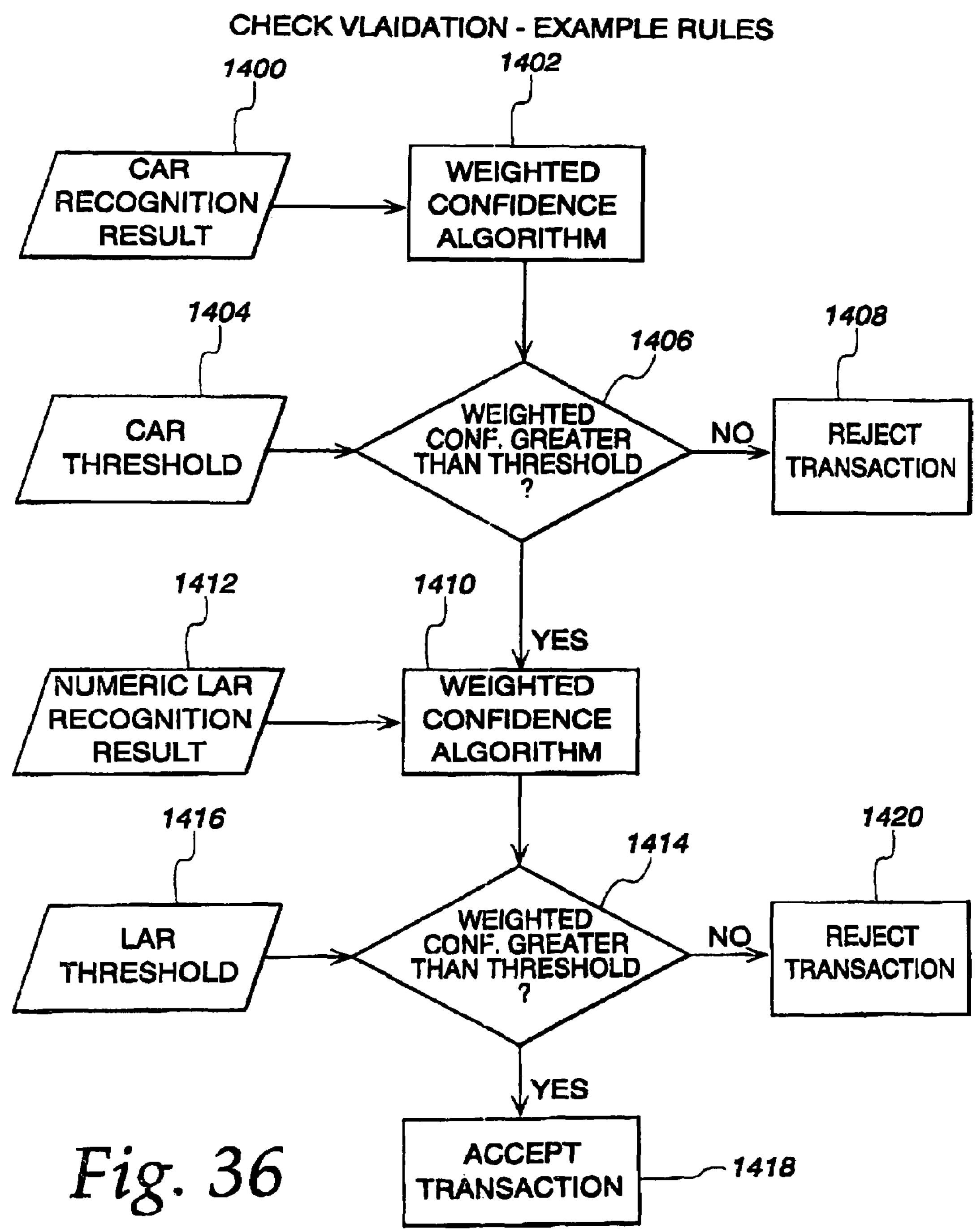
FIG. 36 is a generalized flow diagram for check validation using rules.

Transaction arbitration for any of the above steps takes place as a result of the rules DLL which was provided and is depended thereon. Although variety of transaction arbitration sets of rules can be created for various environments, in one embodiment of the instant application, as is best shown in FIG. 36, the courtesy address recognition result in a step 1400 is passed to a rate of confidence algorithm in step 1402 which operates on it. The courtesy amount recognition threshold value for the confidence from the step 1404 is passed to a step to determine whether the weight of confidence is greater than threshold value in a step 1406. If it is not, the transaction is rejected in step 1408 and no further action is taken. If it is, control is passed to a step 1410 where rate of confidence algorithm is applied which receives the CAR recognition and CAR threshold as well as the numeric LAR recognition result related to the confidence level in the step 1412. If the overall confidence value is greater than the threshold in the step 1414 when taking into account the legal amount recognition threshold from step 1416, the transaction is accepted in a step 1418. If not, it is rejected in a step 1420.

---

```
Description of Payroll Check Cashing Routine
CIRS_ACTION CIRS_Rules_Payroll (
    CIRS_ENTERED     *pEntered;  // Fields entered by
                                    the user.
    CIRS_CHECK       *pCheck;    // Check image
                                    recognition.
    CIRS_CONFIG      *pConfig)   // Application
                                    specific parameters.
{
        CIRS_RESULT          MagMICR, OptMICR,
                             CheckDate;
        int                  i, found;
        int                  Dollars, Cents;
// Establish the list of candidates which pass
threshold, for each field.
    CIRS_FilterByConf (&MagMICR, pCheck->MagMICR,
pConfig->Check.MagMICR.Thresh);
    CIRS_FilterByConf (&OptMICR, pCheck->OptMICR,
pConfig->Check.OptMICR.Thresh);
    CIRS_FilterByConf (&CheckDate , pCheck->Date,
pConfig->Check.Date.Thresh);
// Reject the transaction if there isn't at least one
candidate for each field.
    if (MagMICR.CandidateCount <= 0) return
(CIRS_ACTION_BAD_CHECK_IMAGE);
    if (OptMICR.CandidateCount <= 0) return
(CIRS_ACTION_BAD_CHECK_IMAGE);
    if (CheckDate.CandidateCount <= 0) return
(CIRS_ACTION_BAD_CHECK_IMAGE
// At least one good date candidate must be within the
last 30 days.
    found = FALSE;
    for (i = 0; i < CheckDate.CandidateCount; i++) {
        if ((CheckDate.Candidates(i).Value.Date.Date
< time (NULL) &&
                (CheckDate.Candidates(i).Value.Date.Date
> (time (NULL) - 60*60*24*30))) {
            found = TRUE;
            break;
            }
    }
    if (! found) return (CIRS_ACTION_BAD_CHECK_DATE);
// At least one good candidate from the Optical MICR
result must match the Magnetic MICR.
    Dollars =
MagMICR.Candidates(0).Value.Amount.Dollars;
    Cents = MagMICR.Candidates(0).Value.Amount.Cents;
    found = FALSE;
    for (i = 0; i < OptMICR.CandidateCount; i++) {
        if
((OptMICR.Candidates(i).Value.Amount.Dollars ==
Dollars) &&
    (OptMICR.Candidates(i).Value.Amount.Cents ==
Cents)) {
            found = TRUE;
            break;
            }
    }
    if (! found) return (CIRS_ACTION_BAD_CHECK_MICR);
// Check the MICR amount and account against the
database.
```

-continued

```
    if (! CIRS_ValidateMICR (MagMICR.Candidates(0),
pEntered->Cash.Dollars))
        return (CIRS_ACTION_BAD_CHECK_MICR);
// Transaction is acceptable.
    return (CIRS_ACTION_ACCEPT);
}
```

Description of Remittance Processing Routine for Bill Payment

The Rules DLL complies to the following API definition:

```
// Confidence level for a char, word or field result.
typedef U16                 CIRS_CONF;          // 0-1000.
// Dollar amount field.
typedef struct {
    U16                     Dollars;            // 0-9, 999.
    U8                      Cents;              // 0-99.
    CIRS_CONF               Conf;               // Amount confidence.
} CIRS_AMOUNT;
// Generic account field. May contain any application-specific
characters, but would typically be digits.
typedef char                CIRS_ACCOUNT[20];
// CIRS specific date field.
typedef struct {
    time_t                  Date;
    CIRS_CONF               Conf;               // Date confidence.
} CIRS_DATE;
// Image location coordinates for a char, word or field result.
Measured in pixels. Coordinate systems
// interpolation between devices is performed in the Field
Validation Module.
typedef struct {
    U16                     x, y, dx, dy;       // Device specific.
} CIRS_SEGMENT;
// A single character returned from a recognition engine.
typedef struct {
    char                    Value;              // [0-9A-Za-z{punct}].
    CIRS_SEGMENT            Segment;            // Character location.
    CIRS_CONF               Conf;               // Character
                                                   confidence.
} CIRS_CHAR;
// A single word returned from a recognition engine.
typedef struct {
    CIRS_CHAR               *Chars;             // List of characters.
    U8                      CharCount;          // Number of chars in
                                                   word.
    CIRS_SEGMENT            Segment;            // Word location.
    CIRS_CONF               Conf;               // Word confidence.
} CIRS_WORD;
// A single recognition candidate for a field.
typedef struct {
    CIRS_WORD               *Words;             // List of words.
    U8                      WordCount;          // Number of words in
                                                   field.
    CIRS_SEGMENT            Segment;            // Field location.
    CIRS_CONF               Conf;               // Field confidence.
    union {                                     // Alternate
                                                   representations.
    CIRS_AMOUNT             Amount;             // Only one of these
                                                   will exist,
    CIRS_ACCOUNT            Account;            // determined by the
                                                   data type
    CIRS_DATE               Date;               // of the field.
    } Value;
} CIRS_CANDIDATE;
// A complete recognition result for a field.
typedef struct {
    CIRS_CANDIDATE          *Candidates;        // List of candidates.
    U16                     CandidateCount;     // Number of
                                                   candidates.
} CIRS_REC_RESULT;
// Complete set of fields entered by the user at the system
console.
```

-continued

```
typedef struct {
    CIRS_AMOUNT         Invoice;        // Entered Invoice
                                           Amount.
    CIRS_AMOUNT         Paid;           // Entered Paid
                                           Amount.
    CIRS_ACCOUNT        Account;        // Entered Account.
} CIRS_ENTERED;
// Complete set of fields recognized from a check image.
typedef struct {
    CIRS_REC_RESULT     CAR;            // Check CAR.
    CIRS_REC_RESULT     LAR;            // Check LAR.
    CIRS_REC_RESULT     Date;           // Check Date.
    CIRS_REC_RESULT     Account;        // Check Account.
} CIRS_CHECK;
// Complete set of fields recognized from an invoice image.
typedef struct {
    CIRS_REC_RESULT     Amount;         // Invoice Amount.
    CIRS_REC_RESULT     Paid;           // Invoice Paid
                                           Amount.
    CIRS_REC_RESULT     Date;           // Invoice Date.
    CIRS_REC_RESULT     Account;        // Invoice Account.
} CIRS_INVOICE;
// All actions which can be returned from the Rules DLL.
typedef CIRS_ACTION int;
typedef enum {
    CIRS_ACTION_ACCEPT,                 // Good transaction.
    CIRS_ACTION_REJECT,                 // Generic failed
                                           transaction.
    CIRS_ACTION_BAD_CHECK_IMAGE,        // Check image is
                                           poor.
    CIRS_ACTION_BAD_CHECK_CAR,          // CAR can't be
                                           validated.
    CIRS_ACTION_BAD_CHECK_LAR,          // LAR can't be
                                           validated.
    CIRS_ACTION_BAD_CHECK_DATE,         // Check Date can't be
                                           validated.
    CIRS_ACTION_BAD_CHECK_ACCT,         // Check Acct can't be
                                           validated.
    CIRS_ACTION_BAD_INVOICE_            // Invoice image
    IMAGE,                                 is poor.
    CIRS_ACTION_BAD_INVOICE_            // Invoice Amt can't be
    AMOUNT,                                validated.
    CIRS_ACTION_BAD_INVOICE_PAID,       // Invoice Paid can't be
                                           validated.
    CIRS_ACTION_BAD_INVOICE_DATE,       // Invoice Date can't
                                           be validated.
    CIRS_ACTION_BAD_INVOICE_ACCT        // Invoice Acct can't
                                           be
} CIRS_ACTIONS;
// Confidence threshold used for validating fields. Threshold
values are determined experimentally,
// based on a large set of sample images. Threshold values are
customized for each application.
typedef struct {
    CIRS_CONF           Thresh;         // 0-1000.
} CIRS_CONF_CONFIG;
// Set of thresholds for all fields on a check image.
typedef struct {
    CIRS_CONF_CONFIG        CAR;
    CIRS_CONF_CONFIG        LAR;
    CIRS_CONF_CONFIG        Date;
    CIRS_CONF_CONFIG        Account;
} CIRS_CHECK_CONFIG;
// Set of thresholds for all fields on an invoice image.
typedef struct {
    CIRS_CONF_CONFIG        Amount;
    CIRS_CONF_CONFIG        Paid;
    CIRS_CONF_CONFIG        Date;
    CIRS_CONF_CONFIG        Account;
} CIRS_INVOICE_CONFIG;
// Complete set of application specific thresholds.
typedef struct {
    CIRS_CHECK_CONFIG       Check;
    CIRS_INVOICE_CONFIG     Invoice;
} CIRS_CONFIG;
// Single Rules DLL entry-point.
extern CIRS_ACTION CIRS_Rules (
    CIRS_ENTERED        *pEntered;      // Fields entered by the
                                           user.
```

-continued

```
    CIRS_CHECK       *pCheck;     // Check image recognition.
    CIRS_INVOICE     *pInvoice;   // Invoice image
                                     recognition.
    CIRS_CONFIG      *pConfig);   // Application specific
                                     parameters.
```

To facilitate the implementation of the Rules DLL, an API is provided which supports a basic set of CIRS related functions. The definition of the CIRS Support API follows:

```
void CIRS_FilterByConf (
    CIRS_REC_RESULT     *pOutResult,
    CIRS_REC_RESULT     InResult,
    CIRS_CONF           Thresh);
Remittance Processing
CIRS_ACTION CIRS_Rules (
    CIRS_ENTERED     *pEntered;   // Fields entered by the
                                     user.
    CIRS_CHECK       *pCheck;     // Check image recognition.
    CIRS_INVOICE     *pInvoice;   // Invoice image
                                     recognition.
    CIRS_CONFIG      *pConfig)    // Application specific
                                     parameters.
{
    CIRS_RESULT                   CAR, LAR, CheckDate,
                                  CheckAcct, InvPaid,
                                  InvAcct;
    int                           i, found;
// Establish the list of candidates which pass threshold, for each
field.
    CIRS_FilterByConf (&CAR, pCheck->CAR,
pConfig->Check.CAR.Thresh);
    CIRS_FilterByConf (&LAR, pCheck->LAR,
pConfig->Check.LAR.Thresh);
    CIRS_FilterByConf (&CheckDate , pCheck->Date,
pConfig->Check.Date.Thresh);
    CIRS_FilterByConf (&CheckAcct , pCheck->Account,
pConfig->Check.Account.Thresh);
    CIRS_FilterByConf (&InvPaid , pInvoice->Paid,
pConfig->Invoice.Paid.Thresh);
    CIRS_FilterByConf (&InvAcct , pInvoice->Account,
pConfig->Invoice.Account.Thresh);
// Reject the transaction if there isnÆt at least one candidate
for each field.
    if (CAR.CandidateCount <= 0) return
(CIRS_ACTION_BAD_CHECK_IMAGE);
    if (LAR.CandidateCount <= 0) return
(CIRS_ACTION_BAD_CHECK_IMAGE);
    if (CheckDate.CandidateCount <= 0) return
(CIRS_ACTION_BAD_CHECK_IMAGE
    if (CheckAcct.CandidateCount <= 0) return
(CIRS_ACTION_BAD_CHECK_IMAGE);
    if (InvPaid.CandidateCount <= 0) return (CIRS_ACTION_BAD_
INVOICE _IMAGE);
    if (InvAcct.CandidateCount <= 0) return (CIRS_ACTION_BAD_
INVOICE _IMAGE);
    // At least one good date candidate must be within the last
15-days.
    found = FALSE;
    for (i = 0; i < CheckDate.CandidateCount; i++) {
        if ((CheckDate.Candidates(i).Value.Date.Date < time
(NULL) &&
            (CheckDate.Candidates(i).Value.Date.Date > (time
(NULL) û 60*60*24*15))) {
            found = TRUE;
            break;
        }
    }
    if (! found) return (CIRS_ACTION_BAD_CHECK_DATE);
// At least one good candidate from the CAR field must match the
Entered Paid Amount.
```

-continued

```
    found = FALSE;
    for (i = 0; i < CAR.CandidateCount; i++) {
        if (CAR.Candidates(i).Value.Amount.Dollars ==
Entered.Dollars) {
            found = TRUE;
            break;
        }
    }
    if (! found) return (CIRS_ACTION_BAD_CHECK_CAR);
// At least one good candidate from the LAR field must match the
Entered Paid Amount.
    found = FALSE;
    for (i = 0; i < LAR.CandidateCount; i++) {
        if (LAR.Candidates(i).Value.Amount.Dollars ==
Entered.Dollars) {
            found = TRUE;
            break;
        }
    }
    if (! found) return (CIRS_ACTION_BAD_CHECK_LAR);
// At least one good candidate from the Invoice Paid field must
match the Entered Paid Amount.
    found = FALSE;
    for (i = 0; i < InvPaid.CandidateCount; i++) {
        if (InvPaid.Candidates(i).Value.Amount.Dollars ==
Entered.Dollars) {
            found = TRUE;
            break;
        }
    }
    if (! found) return (CIRS_ACTION_BAD_INVOICE_PAID);
    // Transaction is acceptable.
    return (CIRS_ACTION_ACCEPT);
}
// Confidence level for a Char, word or field result.
typedef U16             CIRS_CONF;      // 0-1000.
// Dollar amount field.
typedef struct {
    U16           Dollars;          // 0-9,999.
    U8            Cents;        // 0-99.54.
The Rules DLL Complies to the following API definition:
// Confidence level for a Char, word or field result.
typedef U16             CIRS_CONF;      // 0-1000.
// Dollar amount field.
typedef struct {
    U16           Dollars;          // 0-9,999.
    U8            Cents;        // 0-99.
    CIRS_CONF     Conf;             // Amount
confidence.
} CIRS_AMOUNT;
// Generic account field. May contain any
application-specific characters, but would typically be
digits.
typedef char            CIRS_ACCOUNT[20];
// CIRS specific date field.
typedef struct {
    time_t              Date;
    CIRS_CONF           Conf;               // Date
confidence.
} CIRS_DATE;
// Image location coordinates for a char, word or field
result. Measured in pixels. Coordinate systems
// interpolation between devices is performed in the
Field Validation Module.
typedef struct {
    U16                 x, y, dx, dy;   // Device specific.
} CIRS_SEGMENT;
// A singe character returned from a recognition
engine.
typedef struct {
    char                Value;          //
[0-9A-Za-z{punct}].
    CIRS_SEGMENT        Segment;            // Character
location.
    CIRS_CONF           Conf;               // Character
confidence.
} CIRS_CHAR;
// A single word returned from a recognition engine.
```

-continued

```
typedef struct {
    CIRS_CHAR          *Chars;        // List of
characters.
    U8                 CharCount;     // Number of
chars in
                                      word.
    CIRS_SEGMENT       Segment;       // Word
location.
    CIRS_CONF          Conf;          // Word
confidence.
} CIRS_WORD;
// A single recognition candidate for a field.
typedef struct {
    CIRS_WORD          *Words;        // List of words.
    U8                 WordCount;     // Number of
words in
                                      field.
    CIRS_SEGMENT       Segment;       // Field
location.
    CIRS_CONF          Conf;          // Field
confidence.
    union {                           // Alternate
                                      representations.
        CIRS_AMOUNT        Amount;        // Only
one of these
                                      will exist,
    CIRS_ACCOUNT       Account;       // determined
by the
                                      data type
    CIRS_DATE          Date;          // of the
field.
    } Value;
} CIRS_CANDIDATE;
// A complete recognition result for a field.
typedef struct {
    CIRS_CANDIDATE     *Candidates;   // List of
candidates.
    U16                CandidateCount; // Number of
candidates.
} CIRS_REC_RESULT;
// Complete set of fields entered by the user at the
system console.
typedef struct {
    CIRS_AMOUNT        Invoice;       // Entered
Invoice
                                      Amount.
    CIRS_AMOUNT        Paid;          //
Entered Paid Amount.
    CIRS_AMOUNT        Cash;          //
Entered Check Amount.
    CIRS_ACCOUNT       Account;       // Entered
Account.
} CIRS_ENTERED;
// Complete set of fields recognized from a check
image.
typedef struct {
    CIRS_REC_RESULT    CAR;           //
Check CAR.
    CIRS_REC_RESULT    LAR;           //
Check LAR.
    CIRS_REC_RESULT    Date;          //
Check Date.
    CIRS_REC_RESULT    Account;       //
Check Account.
    CIRS_REC_RESULT    MagMICR;       //
Check Amount.
    CIRS_REC_RESULT    OptMICR;       //
Check Amount.
} CIRS_CHECK;
// Complete set of fields recognized from an invoice
image.
typedef struct {
    CIRS_REC_RESULT    Amount;        //
Invoice Amount.
    CIRS_REC_RESULT    Paid;          //
Invoice Paid Amount.
    CIRS_REC_RESULT    Date;          //
Invoice Date.
```

-continued

```
    CIRS_REC_RESULT    Account;       //
Invoice Account.
} CIRS_INVOICE;
// All actions which can be returned from the Rules
DLL.
typedef CIRS_ACTION int;
typedef enum {
    CIRS_ACTION_ACCEPT,               // Good transaction.
    CIRS_ACTION_REJECT,               // Generic failed
                                      transaction.
    CIRS_ACTION_BAD_CHECK_IMAGE,  // Check image
is poor.
    CIRS_ACTION_BAD_CHECK_CAR,        // CAR
can't be
                                      validated.
    CIRS_ACTION_BAD_CHECK_LAR,        // LAR
can't be
                                      validated.
    CIRS_ACTION_BAD_CHECK_DATE,       // Check
Date can't be
                                      validated.
    CIRS_ACTION_BAD_CHECK_ACCT,       // Check
Acct can't be
                                      validated.
    CIRS_ACTION_BAD_CHECK_MICR,       // Check
MICR can't be
                                      validated.
    CIRS_ACTION_BAD_CHECK_FRAUD,      // Possibly
fraudulent
                                      check.
    CIRS_ACTION_BAD_INVOICE_IMAGE,    // Invoice
image is
                                      poor.
    CIRS_ACTION_BAD_INVOICE_AMOUNT,   // Invoice Amt
can't be
                                      validated.
    CIRS_ACTION_BAD_INVOICE_PAID,     // Invoice Paid
can't be
                                      validated.
    CIRS_ACTION_BAD_INVOICE_DATE,     // Invoice Date
can't be
                                      validated.
    CIRS_ACTION_BAD_INVOICE_ACCT      // Invoice Acct
can't be
                                      validated.
} CIRS_ACTIONS;
// Confidence threshold used for validating fields.
Threshold values are determined experimentally,
// based on a large set of sample images. Threshold
values are customized for each application.
typedef struct {
    CIRS_CONF          Thresh;        // 0-1000.
} CIRS_CONF_CONFIG;
// Set of thresholds for all fields on a check image.
typedef struct {
    CIRS_CONF_CONFIG   CAR;
    CIRS_CONF_CONFIG   LAR;
    CIRS_CONF_CONFIG   Date;
    CIRS_CONF_CONFIG   Account;
CIRS_CONF_CONFIG   MagMICR;
    CIRS_CONF_CONFIG   OptMICR;
    CIRS_AMOUNT        MaxCashed;
} CIRS_CHECK_CONFIG;
// Set of thresholds for all fields on an invoice
image.
typedef struct {
    CIRS_CONF_CONFIG   Amount;
    CIRS_CONF_CONFIG   Paid;
    CIRS_CONF_CONFIG   Date;
    CIRS_CONF_CONFIG   Account;
} CIRS_INVOICE_CONFIG;
// Complete set of application and user-specific
parameters.
typedef struct {
    CIRS_CHECK_CONFIG  Check;
    CIRS_INVOICE_CONFIG Invoice;
} CIRS_CONFIG;
// Entry point for rules related to remittance
processing.
```

-continued

```
extern CIRS_ACTION CIRS_Rules_Remittance (
    CIRS_ENTERED        *pEntered;     // Fields entered by
the user.
    CIRS_CHECK          *pCheck;       // Check image
recognition.
    CIRS_INVOICE        *pInvoice;     // Invoice image
recognition.
    CIRS_CONFIG         *pConfig);     // Application
specific
                                       parameters.
// Entry point for rules related to payroll check
cashing..
extern CIRS_ACTION CIRS_Rules_payroll (
    CIRS_ENTERED        *pEntered;     // Fields entered by
the user.
    CIRS_CHECK          *pCheck;       // Check image
recognition.
    CIRS_CONFIG         *pConfig);     // Application
specific
                                       parameters.
// Entry point for rules related to proof of deposit..
extern CIRS_ACTION CIRS_Rules_POD (
    CIRS_ENTERED        *pEntered;     // Fields entered by
the user.
    CIRS_CHECK          *pCheck;       // Check image
recognition.
    CIRS_CONFIG         *pConfig);     // Application
specific
                                       parameters.
```

To facilitate the implementation of the Rules DLL, an API is provided which supports a basic set of CIRS related functions. The definition of the CIRS Support API follows:

```
void CIRS_FilterByConf (
    CIRS_REC_RESULT     *pOutResult,
    CIRS_REC_RESULT     InResult,
    CIRS_CONF           Thresh);
void CIRS_SortByConf (
    CIRS_REC_RESULT     *pOutResult,
    CIRS_REC_RESULT     InResult);
int CIRS_ValidateMICR (
    CIRS_CANDIDATE      MICR,
    CIRS_AMOUNT         Amount);
Remittance Processing
CIRS_ACTION CIRS_Rules_Remittance (
    CIRS_ENTERED    *pEntered;   // Fields entered by the user.
    CIRS_CHECK      *pCheck;     // Check image recognition.
    CIRS_INVOICE    *pInvoice;   // Invoice image recognition.
    CIRS_CONFIG     *pConfig)    // Application specific
                                    parameters.
{
    CIRS_RESULT                  CAR, LAR, CheckDate,
                                 CheckAcct, InvPaid, InvAcct;
    int                          i, found;
// Establish the list of candidates which pass threshold, for each
field.
    CIRS_FilterByConf (&CAR, pCheck->CAR,
pConfig->Check.CAR.Thresh);
    CIRS_FilterByConf (&LAR, pCheck->LAR,
pConfig->Check.LAR.Thresh);
    CIRS_FilterByConf (&CheckDate , pCheck->Date,
pConfig->Check.Date.Thresh);
    CIRS_FilterByConf (&CheckAcct , pCheck->Account,
pConfig->Check.Account.Thresh);
    CIRS_FilterByConf (&InvPaid , pInvoice->Paid,
pConfig->Invoice.Paid.Thresh);
    CIRS_FilterByConf (&InvAcct , pInvoice->Account,
pConfig->Invoice.Account.Thresh);
// Reject the transaction if there isnÆt at least one candidate
for each field.
    if (CAR.CandidateCount <= 0) return
(CIRS_ACTION_BAD_CHECK_IMAGE);
    if (LAR.CandidateCount <= 0) return
```

-continued

```
(CIRS_ACTION_BAD_CHECK_IMAGE);
    if (CheckDate.CandidateCount <= 0) return
(CIRS_ACTION_BAD_CHECK_IMAGE
    if (CheckAcct.CandidateCount <= 0) return
(CIRS_ACTION_BAD_CHECK_IMAGE);
    if (InvPaid.CandidateCount <= 0) return (CIRS_ACTION_BAD_
INVOICE_IMAGE);
    if (InvAcct.CandidateCount <= 0) return (CIRS_ACTION_BAD_
INVOICE_IMAGE);
// At least one good date candidate must be within the last
15-days.
    found = FALSE;
    for (i = 0; i < CheckDate.CandidateCount; i++) {
        if ((CheckDate.Candidates(i).Value.Date.Date < time
(NULL) &&
            (CheckDate.Candidates(i).Value.Date.Date > (time
(NULL) û 60*60*24*15))) {
            found = TRUE;
            break;
        }
    }
    if (! found) return (CIRS_ACTION_BAD_CHECK_DATE);
// At least one good candidate from the CAR field must match the
Entered Paid Amount.
    found = FALSE;
    for (i = 0; i < CAR.CandidateCount; i++) {
        if (CAR.Candidates(i).Value.Amount.Dollars ==
pEntered->Paid.Dollars) {
            found = TRUE;
            break;
        }
    }
    if (! found) return (CIRS_ACTION_BAD_CHECK_CAR);
// At least one good candidate from the LAR field must match the
Entered Paid Amount.
    found = FALSE;
    for (i = 0; i < LAR.CandidateCount; i++) {
        if (LAR.Candidates(i).Value.Amount.Dollars ==
pEntered->Paid.Dollars) {
            found = TRUE;
            break;
        }
    }
    if (! found) return (CIRS_ACTION_BAD_CHECK_LAR);
// At least one good candidate from the Invoice Paid field must
match the Entered Paid Amount.
    found = FALSE;
    for (i = 0; i < InvPaid.CandidateCount; i++) {
        if (InvPaid.Candidates(i).Value.Amount.Dollars ==
pEntered->Paid.Dollars) {
            found = TRUE;
            break;
        }
    }
    if (! found) return (CIRS_ACTION_BAD_INVOICE_PAID);
// Transaction is acceptable.
    return (CIRS_ACTION_ACCEPT);
}
Payroll Check Cashing
CIRS_ACTION CIRS_Rules_Payroll (
    CIRS_ENTERED    *pEntered;   // Fields entered by the user.
    CIRS_CHECK      *pCheck;     // Check image recognition.
    CIRS_CONFIG     *pConfig)    // Application specific
                                    parameters.
{
    CIRS_RESULT                  MagMICR, OptMICR,
                                 CheckDate;
    int                          i, found;
    int                          Dollars, Cents;
// Establish the list of candidates which pass threshold, for each
field.
    CIRS_FilterByConf (&MagMICR, pCheck->MagMICR,
pConfig->Check.MagMICR.Thresh);
    CIRS_FilterByConf (&OptMICR, pCheck->OptMICR,
pConfig->Check.OptMICR.Thresh);
    CIRS_FilterByConf (&CheckDate , pCheck->Date,
pConfig->Check.Date.Thresh);
```

-continued

```
// Reject the transaction if there isnÆt at least one candidate
for each field.
      if (MagMICR.CandidateCount <= 0) return
(CIRS_ACTION_BAD_CHECK_IMAGE);
      if (OptMICR.CandidateCount <= 0) return
(CIRS_ACTION_BAD_CHECK_IMAGE);
      if (CheckDate.CandidateCount <= 0) return
(CIRS_ACTION_BAD_CHECK_IMAGE
// At least one good date candidate must be within the last 30
days.
      found = FALSE;
      for (i = 0; i < CheckDate.CandidateCount; i++) {
            if ((CheckDate.Candidates(i).Value.Date.Date < time
(NULL) &&
                  (CheckDate.Candidates(i).Value.Date.Date > (time
(NULL) u 60*60*24*30))) {
                  found = TRUE;
                  break;
            }
      }
      if (! found) return (CIRS_ACTION_BAD_CHECK_DATE);
// At least one good candidate from the Optical MICR result must
match the Magnetic MICR.
      Dollars = MagMICR.Candidates(0).Value.Amount.Dollars;
      Cents = MagMICR.Candidates(0).Value.Amount.Cents;
      found = FALSE;
      for (i = 0; i < OptMICR.CandidateCount; i++) {
            if ((OptMICR.Candidates(i).Value.Amount.Dollars ==
Dollars) &&
      (OptMICR.Candidates(i).Value.Amount.Cents == Cents)) {
                  found = TRUE;
                  break;
            }
      }
      if (! found) return (CIRS_ACTION_BAD_CHECK_MICR);
// Check the MICR amount and account against the database.
      if (! CIRS_ValidateMICR (MagMICR.Candidates(0),
pEntered->Cash.Dollars))
            return (CIRS_ACTION_BAD_CHECK_MICR);
// Transaction is acceptable.
      return (CIRS_ACTION_ACCEPT);
}
```

Proof of Deposit

```
CIRS_ACTION CIRS_Rules_POD (
      CIRS_ENTERED      *pEntered;      // Fields entered by the user.
      CIRS_CHECK        *pCheck;        // Check image recognition.
      CIRS_CONFIG       *pConfig)       // Application specific
                                           parameters.
{
      CIRS_RESULT       CAR, LAR, CheckDate;
      int               i, found;
      int               BestCAR, BestLAR;
// Establish the list of candidates which pass threshold, for each
field.
      CIRS_FilterByConf (&CAR, pCheck->CAR,
pConfig->Check.CAR.Thresh);
      CIRS_FilterByConf (&LAR, pCheck->LAR,
pConfig->Check.LAR.Thresh);
      CIRS_FilterByConf (&CheckDate , pCheck->Date,
pConfig->Check.Date.Thresh);
// Reject the transaction if there isnÆt at least one candidate
for each field.
      if (CAR.CandidateCount <= 0) return
(CIRS_ACTION_BAD_CHECK_IMAGE);
      if (LAR.CandidateCount <= 0) return
(CIRS_ACTION_BAD_CHECK_IMAGE);
      if (CheckDate.CandidateCount <= 0) return
(CIRS_ACTION_BAD_CHECK_IMAGE
// At least one good date candidate must be within the last 30
days.
      found = FALSE;
      for (i = 0; i < CheckDate.CandidateCount; i++) {
```

-continued

```
            if ((CheckDate.Candidates(i).Value.Date.Date < time
(NULL) &&
                  (CheckDate.Candidates(i).Value.Date.Date > (time
(NULL) û 60*60*24*30))) {
                  found = TRUE;
                  break;
            }
      }
      if (! found) return (CIRS_ACTION_BAD_CHECK_DATE);
// At least one good candidate from the CAR field must match the
Entered Amount.
      found = FALSE;
      for (i = 0; i < CAR.CandidateCount; i++) {
            if (CAR.Candidates(i).Value.Amount.Dollars ==
pEntered->Paid.Dollars) {
                  found = TRUE;
                  BestCAR = i;
                  break;
            }
      }
      if (! found) return (CIRS_ACTION_BAD_CHECK_CAR);
// At least one good candidate from the LAR field must match the
Entered Amount.
      found = FALSE;
      for (i = 0; i < LAR.CandidateCount; i++) {
            if (LAR.Candidates(i).Value.Amount.Dollars ==
pEntered->Paid.Dollars) {
                  found = TRUE;
                  BestLAR = i;
                  break;
            }
      }
      if (! found) return (CIRS_ACTION_BAD_CHECK_LAR);
// Detect possible check tampering.
      if ((CAR.Candidates(BestCAR).Conf > CarFraudMin) &&
            (LAR.Candidates(BestLAR).Conf –
LAR.Candidates(BestLAR).Words(0).Conf >
      LarFraudSpread))
      return (CIRS_ACTION_BAD_CHECK_FRAUD);
// Transaction is acceptable.
      return (CIRS_ACTION_ACCEPT);
```

Proof of Deposit

```
CIRS_ACTION CIRS_Rules_Payroll (
      CIRS_ENTERED      *pEntered;      // Fields entered by the user.
      CIRS_CHECK        *pCheck;        // Check image recognition.
      CIRS_CONFIG       *pConfig)       // Application specific
                                           parameters.
{
      CIRS_RESULT       MagMICR, OptMICR, CheckDate;
      int               i, found;
      int               Dollars, Cents;
// Establish the list of candidates which pass threshold, for each
field.
      CIRS_FilterByConf (&MagMICR, pCheck->MagMICR,
pConfig->Check.MagMICR.Thresh);
      CIRS_FilterByConf (&OptMICR, pCheck->OptMICR,
pConfig->Check.OptMICR.Thresh);
      CIRS_FilterByConf (&CheckDate , pCheck->Date,
pConfig->Check.Date.Thresh);
// Reject the transaction if there isn't at least one candidate
for each field.
      if (MagMICR.CandidateCount <= 0) return
(CIRS_ACTION_BAD_CHECK_IMAGE);
      if (OptMICR.CandidateCount <= 0) return
(CIRS_ACTION_BAD_CHECK_IMAGE);
      if (CheckDate.CandidateCount <= 0) return
(CIRS_ACTION_BAD_CHECK_IMAGE
// At least one good date candidate must be within the last 30
days.
      found = FALSE;
      for (i = 0; i < CheckDate.CandidateCount; i++) {
            if ((CheckDate.Candidates(i).Value.Date.Date < time
```

-continued

```
(NULL) &&
            (CheckDate.Candidates(i).Value.Date.Date > (time
(NULL) - 60*60*24*30))) {
            found = TRUE;
            break;
        }
    }
    if (! found) return (CIRS__ACTION__BAD__CHECK__DATE);
// At least one good candidate from the Optical MICR result must
match the Magnetic MICR.
    Dollars = MagMICR.Candidates(0).Value.Amount.Dollars;
    Cents = MagMICR.Candidates(0).Value.Amount.Cents;
    found = FALSE;
    for (i = 0; i < OptMICR.CandidateCount; i++) {
        if ((OptMICR.Candidates(i).Value.Amount.Dollars ==
Dollars) &&
    (OptMICR.Candidates(i).Value.Amount.Cents == Cents)) {
            found = TRUE;
            break;
        }
    }
    if (! found) return (CIRS__ACTION__BAD__CHECK__MICR);
// Check the MICR amount and account against the database.
    if (! CIRS__ValidateMICR (MagMICR.Candidates(0),
pEntered->Cash.Dollars))
        return (CIRS__ACTION__BAD__CHECK__MICR);
// Transaction is acceptable.
    return (CIRS__ACTION__ACCEPT);
```

It will be appreciated that although various aspects of the invention have been described with respect to specific embodiments, alternatives and modifications will be apparent from the present disclosure, which are within the spirit and scope of the present invention as set forth in the following claims.

What is claimed is:

1. An automated machine for an automated document handling system for making bank deposits with a monetary document comprising:

a card reader for a card having an intelligence associated therewith for identifying a system user as a qualified user;

a document scanner for scanning the monetary document;

a processor for receiving input from the document scanner and generating an image thereof;

a document reader in the machine for the monetary document from which a deposit is being made;

a display device coupled to the processor for displaying the image from the scanned monetary document to the system user; and an acceptance of deposit indicator operable by the processor after qualification of the user and validity of the document to indicate proof of deposit to the system user, wherein the processor reviews images from a legal amount recognition (LAR) line and a courtesy amount recognition (CAR) line and ascertains an apparent signature from the document image in order to validate the document.

2. The machine in accordance with claim 1 further comprising:

a magnetic ink character recognition (MICR) reader for reading a MICR amount line on the document.

3. The machine in accordance with claim 1 wherein a locating device is provided to define coordinates on the image and the device is operable by the user to locate areas on the document image for the processor to review.

4. The machine in accordance with claim 3 wherein the locating device comprises a touch screen and the user touches the screen at areas on the document image for at least one of a CAR line, LAR line, date line, MICR line, name line, address line or any combination thereof.

5. The machine in accordance with claim 4 wherein the processor comprises an arbitrator for comparing results from an analysis of at least one of the CAR line, LAR line, the user-entered amount or any combination thereof.

6. The machine in accordance with claim 1, the machine further comprising intelligent character recognition (ICR) engines that specialize in recognition of a particular portion of the document image;

a CAR engine that provides confidence levels with respect to the CAR line; and a LAR engine that provides confidence levels with respect to the LAR line.

7. The machine in accordance with claim 1, further comprising an entering device coupled to the processor for the system user to enter an amount to be deposited.

8. The machine in accordance with claim 1, wherein the information read from the monetary document is sufficient to complete a banking transaction.

* * * * *

UNITED STATES PATENT AND TRADEMARK OFFICE

CERTIFICATE OF CORRECTION

PATENT NO. : 7,653,600 B2
APPLICATION NO. : 10/889453
DATED : January 26, 2010
INVENTOR(S) : Gustin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1506 days.

Signed and Sealed this

Twenty-third Day of November, 2010

David J. Kappos
*Director of the United States Patent and Trademark Office*